US012747697B1

(12) United States Patent
Li et al.

(10) Patent No.: US 12,747,697 B1
(45) Date of Patent: Sep. 29, 2026

(54) COOLING OF COMPONENTS

(71) Applicant: ROLLS-ROYCE plc, London (GB)

(72) Inventors: Haidong Li, Bristol (GB); Caner H Helvaci, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 19/443,735

(22) Filed: Jan. 8, 2026

(30) Foreign Application Priority Data

Oct. 6, 2025 (GB) ...................................... 2516604

(51) Int. Cl.
*F02C 7/18* (2006.01)
*F02C 7/36* (2006.01)

(52) U.S. Cl.
CPC .................. *F02C 7/18* (2013.01); *F02C 7/36* (2013.01); *F05D 2260/232* (2013.01)

(58) Field of Classification Search
CPC ...... F02C 7/18; F02C 7/36; F01D 5/08; F01D 25/12; F05D 2260/20; F05D 2260/221; F05D 2260/232; F05D 2270/306; F05D 2270/3061; F05D 2270/3062
See application file for complete search history.

(56) References Cited

U.S. PATENT DOCUMENTS

| | | | | |
|---|---|---|---|---|
| 5,192,190 | A | 3/1993 | Ferleger et al. | |
| 5,203,676 | A | 4/1993 | Ferleger et al. | |
| 5,236,307 | A | 8/1993 | Ng et al. | |
| 5,277,549 | A | 1/1994 | Chen et al. | |
| 5,352,092 | A | 10/1994 | Ferleger et al. | |
| 5,480,285 | A | 1/1996 | Patel et al. | |
| 5,524,341 | A | 6/1996 | Ferleger et al. | |
| 10,458,427 | B2 | 10/2019 | McGill et al. | |
| 11,371,354 | B2 | 6/2022 | Nolcheff et al. | |
| 11,486,253 | B2 | 11/2022 | Goodhand | |
| 12,378,891 | B2 | 8/2025 | Lawniczek et al. | |
| 2008/0206065 | A1 | 8/2008 | Yamashita et al. | |
| 2011/0268578 | A1 | 11/2011 | Praisner et al. | |
| 2013/0340406 | A1 | 12/2013 | Gallagher et al. | |
| 2014/0271119 | A1* | 9/2014 | Lebel | F01D 5/08 415/118 |
| 2017/0058742 | A1* | 3/2017 | Zhang | F01N 3/2066 |
| 2020/0095885 | A1 | 3/2020 | Shin et al. | |
| 2020/0173373 | A1* | 6/2020 | Ferns | F02C 9/00 |
| 2021/0062657 | A1 | 3/2021 | Haller et al. | |
| 2022/0268216 | A1* | 8/2022 | Townes | F02C 3/107 |

FOREIGN PATENT DOCUMENTS

SE 509299 C2 1/1999

OTHER PUBLICATIONS 20, 2026 Notice of Allowance received in U.S. Appl. No. 19/443,799.

* cited by examiner

*Primary Examiner* — Sang K Kim
(74) *Attorney, Agent, or Firm* — Oliff PLC

(57) ABSTRACT

A geared gas turbine engine is shown. It comprises a high pressure turbine configured to drive a compressor and a low pressure turbine configured to drive a propulsor via a reduction gearbox. The high pressure turbine comprises a turbine stage, and the turbine stage comprises a set of nozzle guide vanes, NGVs, and a plurality of turbine blades downstream of the set of NGVs. A ratio, $\varepsilon_1$, of a cooling mass flow for cooling the plurality of turbine blades of the turbine stage and a throat mass flow of the set of NGVs of turbine stage is between 0.040 and 0.075 at cruise conditions.

20 Claims, 9 Drawing Sheets

COOLING OF COMPONENTS

FIELD

This disclosure relates to cooling of components in gas turbine engines.

BACKGROUND

Amongst other things, gas turbine engines may be used to power aircraft. In such an installation, a gas turbine engine may comprise an air intake, a fan, one or more compressors, a combustor, one or more turbines, and an exhaust nozzle. Air entering the air intake is compressed by the compressor, mixed with fuel and then fed into the combustor, where combustion of the air-fuel mixture occurs. The high temperature and high energy exhaust fluids are then fed to the turbine, where the energy of the fluids is converted to mechanical energy to drive the compressor and the fan to provide propulsive thrust.

The one or more turbines may comprise first and second turbine sections, sometimes called the high pressure turbine and the low pressure turbine. The high pressure turbine is coupled with the compressor through a first interconnecting shaft, while the low pressure turbine is coupled with the fan through a second interconnecting shaft. Another design includes a reduction gearbox between the low pressure turbine and the fan, whereby the fan rotates at a lower rotational speed than the low pressure turbine, which may improve engine efficiency. Still other designs include three turbine sections, two compressor sections and three interconnecting shafts.

Operating conditions of the turbine, particularly the high pressure turbine, are challenging. The resulting stresses may result in components of the high pressure turbine, for example the high pressure turbine disc(s), being the most life-limited components of a gas turbine engine and may therefore define the overall engine Time Before Overhaul (TBO). Improving the operational life of the high pressure turbine is therefore desirable.

SUMMARY

According to an aspect, there is a geared gas turbine engine comprising a high pressure turbine configured to drive a compressor and a low pressure turbine configured to drive a propulsor via a reduction gearbox, wherein:

- the high pressure turbine comprises a turbine stage, the turbine stage comprising a turbine blade;
- the turbine blade comprises an aerofoil having a leading edge, a trailing edge, a pressure surface extending between the leading edge and the trailing edge, and a suction surface extending between the leading edge and the trailing edge opposite the pressure surface;
- the aerofoil extends chordwise between the leading edge and the trailing edge, extends spanwise between an inner radius and an outer radius, and defines a camber line that is a locus of points half-way between the pressure surface and the suction surface;
- the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and

- the turbine blade has a thickness to chord ratio at a 100 percent spanwise position, $\tau_{tip}$, of between 0.11 and 0.18.

In another embodiment, the turbine blade has a thickness to chord ratio at a 100 percent spanwise position, $\tau_{tip}$, of between 0.20 and 0.34.

According to another aspect, there is a method of operating a geared gas turbine engine comprising a high pressure turbine configured to drive a compressor and a low pressure turbine configured to drive a propulsor via a reduction gearbox, the high pressure turbine comprising a turbine stage, the turbine stage comprising a turbine blade, the method comprising:

- operating the geared gas turbine engine at cruise conditions, wherein a speed of rotation of the high pressure turbine at cruise conditions is between 14000 rpm and 25000 rpm,
- wherein the turbine blade has a thickness to chord ratio at a 100 percent spanwise position, $\tau_{tip}$, of between 0.11 and 0.18.

In another embodiment, the speed of rotation of the high pressure turbine at cruise conditions is between 11000 rpm and 18500 rpm, and the turbine blade has a thickness to chord ratio at a 100 percent spanwise position, $\tau_{tip}$, of between 0.20 and 0.34.

According to another aspect, there is a geared gas turbine engine comprising a high pressure turbine configured to drive a compressor and a low pressure turbine configured to drive a propulsor via a reduction gearbox, wherein:

- the high pressure turbine comprises a turbine stage, the turbine stage comprising a turbine blade;
- the turbine blade comprises an aerofoil having a leading edge, a trailing edge, a pressure surface extending between the leading edge and the trailing edge, and a suction surface extending between the leading edge and the trailing edge opposite the pressure surface;
- the aerofoil extends chordwise between the leading edge and the trailing edge, extends spanwise between an inner radius and an outer radius of the turbine blade, and defines a camber line that is a locus of points half-way between the pressure surface and the suction surface;
- the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and
- the turbine stage has a loading parameter, $\lambda = dH/U^2$, dH being an amount work done by the turbine stage per unit mass flow, and U being a mean blade speed of the turbine blade,
- at cruise conditions, a product of $\lambda$ and a thickness to chord ratio at a 100 percent spanwise position, $\tau_{tip}$, is between 0.15 and 0.30.

In another embodiment, the product of $\lambda$ and the thickness to chord ratio at the 100 percent spanwise position, $\tau_{tip}$, is between 0.27 and 0.60.

According to another aspect, there is a geared gas turbine engine comprising a high pressure turbine configured to drive a compressor and a low pressure turbine configured to drive a propulsor via a reduction gearbox, wherein:

- the high pressure turbine comprises a turbine stage, the turbine stage comprising a turbine blade;

the turbine blade comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius of the turbine blade, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and the turbine blade has a thickness to chord ratio at a 50 percent spanwise position, $\tau_{mid}$, of between 0.19 and 0.29.

In another embodiment, the turbine blade has a thickness to chord ratio at a 50 percent spanwise position, $\tau_{mid}$, of between 0.28 and 0.46.

According to another aspect, there is a method of operating a geared gas turbine engine comprising a high pressure turbine configured to drive a compressor and a low pressure turbine configured to drive a propulsor via a reduction gearbox, the high pressure turbine comprising a turbine stage, the turbine stage comprising a turbine blade, the method comprising:

operating the geared gas turbine engine at cruise conditions, wherein a speed of rotation of the high pressure turbine at cruise conditions is between 14000 rpm and 25000 rpm, wherein the turbine blade has a thickness to chord ratio at a 50 percent spanwise position, $\tau_{mid}$, of between 0.19 and 0.29

In another embodiment, the speed of rotation of the high pressure turbine at cruise conditions is between 11000 rpm and 18500 rpm, and the turbine blade has a thickness to chord ratio at a 50 percent spanwise position, $\tau_{mid}$, of between 0.28 and 0.46.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage comprising a turbine blade;

the turbine blade comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius of the turbine blade, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and the turbine stage has a loading parameter, $\lambda = dH/U^2$, dH being an amount work done by the turbine stage per unit mass flow, and U being a mean blade speed of the turbine blade, at cruise conditions, a product of $\lambda$ and a thickness to chord ratio at a 50 percent spanwise position of the turbine blade, $\tau_{mid}$, is between 0.24 and 0.52.

In another embodiment, the product of $\lambda$ and the thickness to chord ratio at a 50 percent spanwise position of the turbine blade, $\tau_{mid}$, is between 0.36 and 0.82.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage comprising a turbine blade;

the turbine blade comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius of the turbine blade, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and the turbine blade has a thickness to chord ratio at a 0 percent spanwise position, $\tau_{hub}$, of between 0.24 and 0.38.

In another embodiment, the turbine blade has a thickness to chord ratio at a 0 percent spanwise position, $\tau_{hub}$, of between 0.36 and 0.60.

According to another aspect, there is a method of operating a geared gas turbine engine comprising a high pressure turbine configured to drive a compressor and a low pressure turbine configured to drive a propulsor via a reduction gearbox, the high pressure turbine comprising a turbine stage, the turbine stage comprising a turbine blade, the method comprising:

operating the geared gas turbine engine at cruise conditions, wherein a speed of rotation of the high pressure turbine at cruise conditions is between 14000 rpm and 25000 rpm, wherein the turbine blade has a thickness to chord ratio at a 0 percent spanwise position, $\tau_{hub}$, of between 0.24 and 0.38.

In another embodiment, the speed of rotation of the high pressure turbine at cruise conditions is between 11000 rpm and 18500 rpm, and the turbine blade has a thickness to chord ratio at a 0 percent spanwise position, $\tau_{hub}$, of between 0.36 and 0.60.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage comprising a turbine blade;

the turbine blade comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius of the turbine blade, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and the turbine stage has a loading parameter, $\lambda=dH/U^2$, dH being an amount work done by the turbine stage per unit mass flow, and U being a mean blade speed of the turbine blade, at cruise conditions, a product of $\lambda$ and a thickness to chord ratio at a 0 percent spanwise position, $\tau_{hub}$, is between 0.31 and 0.69.

In another embodiment, the product of $\lambda$ and the thickness to chord ratio at a 0 percent spanwise position, $\tau_{hub}$, is between 0.47 and 1.08.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage, the first turbine stage comprising a first turbine blade and the second turbine stage comprising a second turbine blade;

each of the first turbine blade and the second turbine blade comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, extends spanwise between an inner radius and an outer radius, and defines a camber line that is a locus of points half-way between the pressure surface and the suction surface;

each of the first turbine blade and the second turbine blade has, for each respective spanwise position of the respective aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface;

the first turbine blade has a thickness to chord ratio at a 100 percent spanwise position of $\tau_{tip}$, and the second turbine blade has a thickness to chord ratio at a 100 percent spanwise position of $\tau_{tip,2}$; and a ratio, $\tau_{tip}/\tau_{tip,2}$, is between 0.89 and 1.49.

In another embodiment, the ratio, $\tau_{tip}/\tau_{tip,2}$, is between 1.17 and 1.91.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage, the first turbine stage comprising a first turbine blade and the second turbine stage comprising a second turbine blade;

each of the first turbine blade and the second turbine blade comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, extends spanwise between an inner radius and an outer radius, and defines a camber line that is a locus of points half-way between the pressure surface and the suction surface;

each of the first turbine blade and the second turbine blade has, for each respective spanwise position of the respective aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface;

the first turbine blade has a thickness to chord ratio at a 0 percent spanwise position of $\tau_{hub}$, and the second turbine blade has a thickness to chord ratio at a 100 percent spanwise position of $\tau_{hub,2}$; and a ratio, $\tau_{hub}/\tau_{hub,2}$ is between 0.65 and 1.13.

In another embodiment, the ratio, $\tau_{hub}/\tau_{hub,2}$ is between 0.91 and 1.69.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage, the first turbine stage comprising a first turbine blade and the second turbine stage comprising a second turbine blade;

each of the first turbine blade and the second turbine blade comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, extends spanwise between an inner radius and an outer radius, and defines a camber line that is a locus of points half-way between the pressure surface and the suction surface;

each of the first turbine blade and the second turbine blade has, for each respective spanwise position of the respective aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface;

each of the first turbine blades has a solidity at the 0 percent spanwise position of $\sigma_{hub}$, and each of the second turbine blades has a solidity at the 0 percent spanwise position of $\sigma_{hub,2}$; and a ratio, $\sigma_{hub}/\sigma_{hub,2}$, is between 0.68 and 1.23.

In another embodiment, the ratio, $\sigma_{hub}/\sigma_{hub,2}$, is between 0.72 and 1.14.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage;

the first turbine stage comprise a number, $N_T$, of first turbine blades, and the second turbine stage comprises a second number, $N_{T2}$, of second turbine blades;

each turbine blade of the first turbine blades and the second turbine blades comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, extends spanwise between an inner radius and an outer radius, and defines a camber line that is a locus of points half-way between the pressure surface and the suction surface;

each turbine blade of the first turbine blades and the second turbine blades has, for each respective spanwise position of the respective aerofoil, a respective thickness, the thickness being a maximum diameter of a circle that is centred on the camber line and has a circumference that is tangent to the pressure surface and to the suction surface;

the first turbine stage has a first blade pitch, s, equal to $2\pi$ multiplied by a ratio of a mean radius of the first turbine blades and $N_T$, and the second turbine stage has a second blade pitch, $s_2$, equal to $2\pi$ multiplied by a ratio of a mean radius of the second turbine blades and $N_{T2}$;

a ratio of a thickness to blade pitch ratio, $\tau_{tip}/s$, of the first turbine stage at a 100 percent spanwise position of the first turbine blades and a thickness to blade pitch ratio, $\tau_{tip,2}/s_2$, of the second turbine stage at a 100 percent spanwise position of the second turbine blades is between 0.78 and 1.45.

In another embodiment, the ratio of the thickness to blade pitch ratio, $\tau_{tip}/s$, of the first turbine stage at a 100 percent spanwise position of the first turbine blades and a thickness to blade pitch ratio, $\tau_{tip,2}/s_2$, of the second turbine stage at a 100 percent spanwise position of the second turbine blades is between 1.06 and 1.82.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage;

the first turbine stage comprise a number, $N_T$, of first turbine blades, and the second turbine stage comprise a second number, $N_{T2}$, of second turbine blades;

each turbine blade of the first turbine blades and the second turbine blades comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, extends spanwise between an inner radius and an outer radius, and defines a camber line that is a locus of points half-way between the pressure surface and the suction surface;

each turbine blade of the first turbine blades and the second turbine blades has, for each respective spanwise position of the respective aerofoil, a respective thickness, the thickness being a maximum diameter of a circle that is centred on the camber line and has a circumference that is tangent to the pressure surface and to the suction surface;

the first turbine stage has a first blade pitch, s, equal to $2\pi$ multiplied by a ratio of a mean radius of the first turbine blades and $N_T$, and the second turbine stage has a second blade pitch, $s_2$, equal to $2\pi$ multiplied by a ratio of a mean radius of the second turbine blades and $N_{T2}$;

a ratio of a thickness to blade pitch ratio, $t_{mid}/s$, of the first turbine stage at a 50 percent spanwise position of the first turbine blades and a thickness to blade pitch ratio, $t_{mid,2}/s_2$, of the second turbine stage at a 50 percent spanwise position of the second turbine blades is between 0.93 and 1.64.

In another embodiment, the ratio of the thickness to blade pitch ratio, $t_{mid}/s$, of the first turbine stage at a 50 percent spanwise position of the first turbine blades and the thickness to blade pitch ratio, $t_{mid,2}/s_2$, of the second turbine stage at the 50 percent spanwise position of the second turbine blades is between 1.03 and 1.97.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage;

the first turbine stage comprises a number, $N_T$, of first turbine blades, and the second turbine stage comprises a second number, $N_{T2}$, of second turbine blades;

each turbine blade of the first turbine blades and the second turbine blades comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, extends spanwise between an inner radius and an outer radius, and defines a camber line that is a locus of points half-way between the pressure surface and the suction surface;

each turbine blade of the first turbine blades and the second turbine blades has, for each respective spanwise position of the respective aerofoil, a respective thickness, the thickness being a maximum diameter of a circle that is centred on the camber line and has a circumference that is tangent to the pressure surface and to the suction surface;

the first turbine stage has a first blade pitch, s, equal to $2\pi$ multiplied by a ratio of a mean radius of the first turbine blades and $N_T$, and the second turbine stage has a second blade pitch, $s_2$, equal to $2\pi$ multiplied by a ratio of a mean radius of the second turbine blades and $N_{T2}$;

a ratio of a thickness to blade pitch ratio, $t_{hub}/s$, of the first turbine stage at a 0 percent spanwise position of the first turbine blades and a thickness to blade pitch ratio, $t_{hub,2}/s_2$, of the second turbine stage at a 0 percent spanwise position of the second turbine blades is between 0.60 and 1.10.

In another embodiment, the ratio of the thickness to blade pitch ratio, $t_{hub}/s$, of the first turbine stage at the 0 percent spanwise position of the first turbine blades and the thickness to blade pitch ratio, $t_{hub,2}/s_2$, of the second turbine stage at the 0 percent spanwise position of the second turbine blades is between 0.77 and 1.67.

According to another aspect, there is a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a turbine stage, the turbine stage comprising a turbine blade;

the turbine blade comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, and extends spanwise between an inner radius and an outer radius of the turbine blade;

the turbine blade has, for each respective spanwise position of the aerofoil, a respective chord length, the chord length being a straight line distance between the leading edge and the trailing edge;

a radial distance from the engine axis of rotation to the inner radius of the turbine blade is equal to a turbine hub radius, $R_{HT1}$, and a radial distance from the engine axis of rotation to the outer radius of the turbine blade is equal to a turbine tip radius, $R_{T1}$;

a blade height, $h_1$, of the turbine blade is equal to $R_{T1}-R_{HT1}$; and an aspect ratio, $AR_1$, of the turbine blade, equal to the blade height, $h_1$, divided by the chord length at a 100 percent spanwise position of the turbine blade is between 0.67 and 1.33.

In another embodiment, the aspect ratio, $AR_1$, of the turbine blade, equal to the blade height, $h_1$, divided by the chord length at a 100 percent spanwise position of the turbine blade is between 0.55 and 1.05.

According to another aspect, there is a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a first turbine stage and a second turbine stage downstream of the first turbine stage, the first turbine stage comprising a first turbine blade and the second turbine stage comprising a second turbine blade;

each of the first turbine blade and the second turbine comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, and extends spanwise between an inner radius and an outer radius;

each turbine blade of the first turbine blade and the second turbine blade has, for each respective spanwise position of the respective aerofoil, a respective chord length, the chord length being a straight line distance between the leading edge and the trailing edge;

a radial distance from the engine axis of rotation to the inner radius of the second turbine blade is equal to a second turbine hub radius, $R_{HT2}$, and a radial distance from the engine axis of rotation to the outer radius of the second turbine blade is equal to a second turbine tip radius, $R_{T2}$;

a blade height, $h_2$, of the second turbine blade is equal to $R_{T2}-R_{HT2}$; and an aspect ratio, $AR_2$, of the second turbine blade, equal to the blade height, $h_2$, of the second turbine blade divided by the chord length at a 100 percent spanwise position of the second turbine blade is between 1.17 and 2.21.

In another embodiment, the aspect ratio, $AR_2$, of the second turbine blade, equal to the blade height, $h_2$, of the second turbine blade divided by the chord length at a 100 percent spanwise position of the second turbine blade is between 1.04 and 1.90.

According to another aspect, there is a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a first turbine stage and a second turbine stage downstream of the first turbine stage, the first turbine stage comprising a first turbine blade and the second turbine stage comprising a second turbine blade;

each of the first turbine blade and the second turbine comprises a respective aerofoil having a leading edge, a trailing edge, a pressure surface extending between the leading edge and the trailing edge, and a suction surface extending between the leading edge and the trailing edge opposite the pressure surface;

each respective aerofoil extends chordwise between the leading edge and the trailing edge, and extends spanwise between an inner radius and an outer radius;

each turbine blade of the first turbine blade and the second turbine blade has, for each respective spanwise position of the respective aerofoil, a respective chord length, the chord length being a straight line distance between the leading edge and the trailing edge;

a radial distance from the engine axis of rotation to the inner radius of the first turbine blade is equal to a first turbine hub radius, $R_{HT1}$, and a radial distance from the engine axis of rotation to the outer radius of the first turbine blade is equal to a first turbine tip radius, $R_{T1}$;

a radial distance from the engine axis of rotation to the inner radius of the second turbine blade is equal to a second turbine hub radius, $R_{HT2}$, and a radial distance from the engine axis of rotation to the outer radius of the second turbine blade is equal to a second turbine tip radius, $R_{T2}$;

a blade height, $h_2$, of the first turbine blade is equal to $R_{T1}-R_{HT1}$;

a blade height, $h_2$, of the second turbine blade is equal to $R_{T2}-R_{HT2}$;

the first turbine blade has a first aspect ratio, $AR_1$, equal to the blade height, $h_1$, of the first turbine blade divided by the chord length at a 100 percent spanwise position of the first turbine blade;

the second turbine blade has a second aspect ratio, $AR_2$, equal to the blade height, $h_2$, of the second turbine blade divided by the chord length at a 100 percent spanwise position of the second turbine blade; and a ratio of the first aspect ratio and the second aspect ratio, $AR_1/AR_2$, is between 0.40 and 0.79.

In another embodiment, the ratio of the first aspect ratio and the second aspect ratio, $AR_1/AR_2$, is between 0.39 and 0.66.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage comprising a turbine blade;

the turbine stage has a loading parameter, $\lambda$, where $\lambda=dH/U^2$, dH being an amount of work done by the turbine stage per unit mass flow, and U being a mean blade speed of the turbine blade;

the turbine stage has a speed parameter, $\mu$, where $\mu=U/\sqrt{T}$, U being the mean blade speed of the turbine blade, and T being an inlet temperature of the turbine stage; and when measured at cruise conditions, $\lambda$ is between 1.30 and 1.80 and $\mu$ is between 10.7 $ms^{-1}K^{-0.5}$ and 12.0 $ms^{-1}K^{-0.5}$.

According to another aspect, there is a method of operating a geared gas turbine engine comprising a high pressure turbine configured to drive a compressor and a low pressure turbine configured to drive a propulsor via a reduction gearbox, the high pressure turbine comprising a turbine stage, the turbine stage comprising a turbine blade, the method comprising:

operating the geared gas turbine engine at cruise conditions, wherein at the cruise conditions, a loading parameter, $\lambda$, of the turbine stage is between 1.30 and 1.80, and a speed parameter, $\mu$, of the turbine stage is between 10.7 and 12.0, where $\lambda=dH/U^2$ and $\mu=U/\sqrt{T}$, dH being an amount work done by the turbine stage per unit mass flow, U being a mean blade speed of the turbine blade, and T being an inlet temperature of the turbine stage.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage comprising a turbine blade;

the turbine blade comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface;

a sum, $\tau_{tip}+\tau_{mid}$, of a thickness to chord ratio, $\tau_{tip}$, at a 100 percent spanwise position of the turbine blade, and a thickness to chord ratio, $\tau_{mid}$, at a 50 percent spanwise position of the turbine blade is between 0.30 and 0.46; and the turbine stage has a loading parameter, $\lambda$, where $\lambda=dH/U^2$, dH being an amount work done by the turbine stage per unit mass flow, and U being a mean blade speed of the turbine blade, $\lambda$ being between 1.30 and 1.80 measured at cruise conditions.

In another embodiment, the sum, $\tau_{tip}+\tau_{mid}$, is between 0.50 and 0.78, while the loading parameter, $\lambda$, is between 1.30 and 1.80 measured at cruise conditions.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage comprising a turbine blade;

the turbine blade comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface;

a sum, $\tau_{tip}+\tau_{mid}$, of a thickness to chord ratio, $\tau_{tip}$, at a 100 percent spanwise position of the turbine blade, and a thickness to chord ratio, $\tau_{mid}$, at a 50 percent spanwise position of the turbine blade is between 0.30 and 0.46; and the turbine stage has a speed parameter, $\mu$, where $\mu=U/\sqrt{T}$, U being a mean blade speed of the turbine blade, and T being an inlet temperature of the turbine stage, $\mu$ being between 10.7 $ms^{-1}K^{-0.5}$ and 12.0 $ms^{-1}K^{-0.5}$ measured at cruise conditions.

In another embodiment, the sum, $\tau_{tip}+\tau_{mid}$, is between 0.50 and 0.78, while the speed parameter, $\mu$, is between 10.7 $ms^{-1}K^{-0.5}$ and 12.0 $ms^{-1}K^{-0.5}$ measured at cruise conditions.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades;

each respective turbine blade of the turbine stage comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective thickness, the thickness being a maximum diameter of a circle that is centred on the camber line and has a circumference that is tangent to the pressure surface and to the suction surface; and a ratio of the thickness of the turbine blades at a 100 percent spanwise position and a blade pitch, s, of the turbine stage is between 0.13 and 0.21, s being equal to 2π multiplied by a ratio of a mean radius of the turbine blades and $N_T$.

In another embodiment, the ratio of the thickness of the turbine blades at the 100 percent spanwise position and the blade pitch, s, of the turbine stage is between 0.24 and 0.42.

According to another aspect, there is a method of operating a geared gas turbine engine comprising a high pressure turbine configured to drive a compressor and a low pressure turbine configured to drive a propulsor via a reduction gearbox, the high pressure turbine comprising a turbine stage having a number, $N_T$, of turbine blades, the method comprising:

operating the geared gas turbine engine at cruise conditions, wherein a speed of rotation of the high pressure turbine at cruise conditions is between 14000 rpm and 25000 rpm, wherein a ratio of a thickness of the turbine blades at a 100 percent spanwise position and a blade pitch, s, of the turbine stage is between 0.13 and 0.21, s being equal to 2π multiplied by a ratio of a mean radius of the turbine blades and $N_T$.

In another embodiment, the speed of rotation of the high pressure turbine at cruise conditions is between 11000 rpm and 18500 rpm, and the ratio of the thickness of the turbine blades at the 100 percent spanwise position and the blade pitch, s, of the turbine stage is between 0.24 and 0.42.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades; and the turbine stage has a loading parameter, $\lambda = dH/U^2$, dH being an amount work done by the turbine stage per unit mass flow, and U being a mean blade speed of each turbine blade of the turbine stage, at cruise conditions, a product of λ and a blade pitch, s, of the turbine stage is between 32 mm and 66 mm, s being equal to 2π multiplied by a ratio of a mean radius of the turbine blades and $N_T$.

In another embodiment, the product of λ and the blade pitch, s, of the turbine stage is between 43 mm and 100 mm, According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades;

each respective turbine blade of the turbine stage comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective thickness, the thickness being a maximum diameter of a circle that is centred on the camber line and has a circumference that is tangent to the pressure surface and to the suction surface; and a ratio of the thickness of the turbine blades at a 50 percent spanwise position and a blade pitch, s, of the turbine stage is between 0.21 and 0.35, s being equal to 2π multiplied by a ratio of a mean radius of the turbine blades and $N_T$.

In another embodiment, the ratio of the thickness of the turbine blades at the 50 percent spanwise position and the blade pitch, s, of the turbine stage is between 0.29 and 0.50.

According to another aspect, there is a method of operating a geared gas turbine engine comprising a high pressure turbine configured to drive a compressor and a low pressure turbine configured to drive a propulsor via a reduction gearbox, the high pressure turbine comprising a turbine stage, having a number, $N_T$, of turbine blades, the method comprising:

operating the geared gas turbine engine at cruise conditions, wherein a speed of rotation of the high pressure turbine at cruise conditions is between 14000 rpm and 25000 rpm, wherein a ratio of a thickness of the turbine blades at a 50 percent spanwise position and a blade pitch, s, of the turbine stage is between 0.21 and 0.35, s being equal to 2π multiplied by a ratio of a mean radius of the turbine blades and $N_T$.

In another embodiment, the speed of rotation of the high pressure turbine at cruise conditions is between 11000 rpm and 18500 rpm, and the ratio of the thickness of the turbine blades at the 50 percent spanwise position and the blade pitch, s, of the turbine stage is between 0.29 and 0.50.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage, the second turbine stage having a number, $N_{T2}$, of turbine blades; and the second turbine stage has a loading parameter, $\lambda_2 = dH_2/U_2^2$, $dH_2$ being an amount work done by the second turbine stage per unit mass flow, and U being a mean blade speed of each turbine blade of the second turbine stage, at cruise conditions, a product of $\lambda_2$ and a blade pitch, $s_2$, of the second turbine stage is between 23 mm and 49 mm, $s_2$ being equal to 2π multiplied by a ratio of a mean radius of the second turbine blades and $N_{T2}$.

In another embodiment, the product of $\lambda_2$ and the blade pitch, $s_2$, of the second turbine stage is between 33 mm and 69 mm.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades;

each respective turbine blade of the turbine stage comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective thickness, the thickness being a maximum diameter of a circle that is centred on the camber line and has a circumference that is tangent to the pressure surface and to the suction surface; and a ratio of the thickness of the turbine blades at a 0 percent spanwise position and a blade pitch, s, of the turbine stage is between 0.24 and 0.42, s being equal to $2\pi$ multiplied by a ratio of a mean radius of the turbine blades and $N_T$.

In another embodiment, the ratio of the thickness of the turbine blades at the 0 percent spanwise position and the blade pitch, s, of the turbine stage is between 0.32 and 0.58.

According to another aspect, there is a method of operating a geared gas turbine engine comprising a high pressure turbine configured to drive a compressor and a low pressure turbine configured to drive a propulsor via a reduction gearbox, the high pressure turbine comprising a turbine stage, having a number, $N_T$, of turbine blades, the method comprising:

operating the geared gas turbine engine at cruise conditions, wherein a speed of rotation of the high pressure turbine at cruise conditions is between 14000 rpm and 25000 rpm, wherein a ratio of a thickness of the turbine blades at a 0 percent spanwise position and a blade pitch, s, of the turbine stage is between 0.24 and 0.42, s being equal to $2\pi$ multiplied by a ratio of a mean radius of the turbine blades and $N_T$.

In another embodiment, the speed of rotation of the high pressure turbine at cruise conditions is between 11000 rpm and 18500 rpm, and the ratio of the thickness of the turbine blades at the 0 percent spanwise position and the blade pitch, s, of the turbine stage is between 0.32 and 0.58.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades;

the turbine stage has a speed parameter, $\mu=U/\sqrt{T}$, U being the mean blade speed of the turbine blade, and T being an inlet temperature of the turbine stage; and at cruise conditions, a ratio of a blade pitch, s, and $\mu$ is between 1.7 $msK^{0.5}$ and 4.7 $msK^{0.5}$, s being equal to $2\pi$ multiplied by a ratio of a mean radius of the turbine blades and $N_T$.

In another embodiment, the ratio of the blade pitch, s, and the speed parameter, $\mu$ is between 2.7 $msK^{0.5}$ and 5.2 $msK^{0.5}$.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades;

each respective turbine blade of the turbine stage comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and a product of a thickness to chord ratio at a 100 percent spanwise position, $\tau_{tip}$, of the turbine blades and a blade pitch, s, of the turbine stage is between 2.9 mm and 6.0 mm, s being equal to $2\pi$ multiplied by a ratio of a mean radius of the turbine blades and $N_T$.

In another embodiment, the product of the thickness to chord ratio at the 100 percent spanwise position, $\tau_{tip}$, of the turbine blades and the blade pitch, s, of the turbine stage is between 8.6 mm and 15.4 mm.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades;

each respective turbine blade of the turbine stage comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and a product of a thickness to chord ratio at a 50 percent spanwise position, $\tau_{mid}$, of the turbine blades and a blade pitch, s, of the turbine stage is between 5.6 mm and 9.8 mm, s being equal to $2\pi$ multiplied by a ratio of a mean radius of the turbine blades and $N_T$.

In another embodiment, the product of the thickness to chord ratio at the 50 percent spanwise position, $\tau_{mid}$, of the turbine blades and the blade pitch, s, of the turbine stage is between 10.9 mm and 22.4 mm.

According to another aspect, there is a geared gas turbine engine comprising a high pressure turbine configured to drive a compressor and a low pressure turbine configured to drive a propulsor via a reduction gearbox, wherein:

the high pressure turbine comprises a turbine stage, the turbine stage having a number, $N_T$, of turbine blades;

each respective turbine blade of the turbine stage comprises an aerofoil having a leading edge, a trailing edge, a pressure surface extending between the leading edge and the trailing edge, and a suction surface extending between the leading edge and the trailing edge opposite the pressure surface;

the aerofoil extends chordwise between the leading edge and the trailing edge, extends spanwise between an inner radius and an outer radius, and defines a camber line that is a locus of points half-way between the pressure surface and the suction surface;

the turbine blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and a product of a thickness to chord ratio at a 0 percent spanwise position, $\tau_{hub}$, of the turbine blades and a blade pitch, s, of the turbine stage is between 6.7 mm and 13.0 mm, s being equal to $2\pi$ multiplied by a ratio of a mean radius of the turbine blades and $N_T$.

In another embodiment, the product of the thickness to chord ratio at the 0 percent spanwise position, $\tau_{hub}$, of the turbine blades and the blade pitch, s, of the turbine stage is between 15.4 mm and 26.4 mm.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage, the first turbine stage comprising a first turbine blade and the second turbine stage comprising a second turbine blade;

the first turbine blade comprises a first aerofoil extending spanwise between an inner radius of the first turbine blade and an outer radius of the first turbine blade;

the second turbine blade comprises a second aerofoil extending spanwise between an inner radius of the second turbine blade and an outer radius of the second turbine blade;

when measured at cruise conditions, the first turbine blade has an angle of attack, $\alpha_{1,mid}$, between 10 degrees and 58 degrees measured at a 50 percent spanwise position of the first turbine blade, and the second turbine blade has an angle of attack, $\alpha_{2,mid}$, between −10 degrees and 40 degrees measured at a 50 percent spanwise position of the second turbine blade.

In another embodiment, when measured at cruise conditions, the first turbine blade has an angle of attack, $\alpha_{1,mid}$, between 27 degrees and 51 degrees, and the second turbine blade has an angle of attack, $\alpha_{2,mid}$, between 20 degrees and 30 degrees.

According to another aspect, there is a method of operating a geared gas turbine engine comprising a high pressure turbine configured to drive a compressor and a low pressure turbine configured to drive a propulsor via a reduction gearbox, the high pressure turbine comprising a first turbine stage comprising a first turbine blade and a second turbine stage comprising a second turbine blade, the method comprising:

operating the geared gas turbine engine at cruise conditions, wherein:

the first turbine blade comprises a first aerofoil extending spanwise between an inner radius of the first turbine blade and an outer radius of the first turbine blade;

the second turbine blade comprises a second aerofoil extending spanwise between an inner radius of the second turbine blade and an outer radius of the second turbine blade;

at the cruise conditions, the first turbine blade has an angle of attack, $\alpha_{1,mid}$, between 10 degrees and 58 degrees measured at a 50 percent spanwise position of the first turbine blade, and the second turbine blade has an angle of attack, $\alpha_{2,mid}$, between −10 degrees and 40 degrees measured at a 50 percent spanwise position of the second turbine blade.

In another embodiment, when measured at cruise conditions, the first turbine blade has an angle of attack, $\alpha_{1,mid}$, between 27 degrees and 51 degrees, and the second turbine blade has an angle of attack, $\alpha_{2,mid}$, between 20 degrees and 30 degrees.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage;

the first turbine stage comprises a first turbine blade comprising a first aerofoil, the first aerofoil having a leading edge, a trailing edge, a pressure surface extending between the leading edge and the trailing edge, and a suction surface extending between the leading edge and the trailing edge opposite the pressure surface;

the first aerofoil extends spanwise between an inner radius and an outer radius, extends chordwise between the leading edge and the trailing edge, and defines a camber line that is a locus of points half-way between the pressure surface and the suction surface;

the first turbine stage blade has, for each respective spanwise position of the first aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface;

when measured at cruise conditions, the first turbine blade has an angle of attack, $\alpha_{1,mid}$, between 10 degrees and 58 degrees measured at a 50 percent spanwise position of the first turbine blade, the half-span position being half a spanwise distance between the base and the tip of the first turbine blade; and a sum, $\tau_{tip}+\tau_{hub}$, of a thickness to chord ratio at a 100 percent spanwise position of the first turbine blade, $\tau_{tip}$, and a thickness to chord ratio a 0 percent spanwise position of the first turbine blade, $\tau_{hub}$, IS between 0.35 and 0.56.

In another embodiment, when measured at cruise conditions, the first turbine blade has an angle of attack, $\alpha_{1,mid}$, between 27 degrees and 51 degrees, and the sum, $\tau_{tip}+\tau_{hub}$, of the thickness to chord ratio at the 100 percent spanwise position of the first turbine blade, $\tau_{tip}$, and the thickness to chord ratio a 0 percent spanwise position of the first turbine blade, $\tau_{hub}$, is between 0.58 and 0.93.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage, the first turbine stage comprising a first turbine blade and the second turbine stage comprising a second turbine blade;

the first turbine blade comprises a first aerofoil extending spanwise between an inner radius of the first turbine blade and an outer radius of the first turbine blade;

the second turbine blade comprises a second aerofoil extending spanwise between an inner radius of the second turbine blade and an outer radius of the second turbine blade;

a ratio, $\alpha_{2,mid}/\alpha_{1,mid}$, of an angle of attack, $\alpha_{2,mid}$, at a 50 percent spanwise position of the second turbine blade and an angle of attack, $\alpha_{1,mid}$, at a 50 percent spanwise position of the first turbine blade is between 0.22 and 0.92 when measured at cruise conditions.

In another embodiment, the ratio, $\alpha_{2,mid}/\alpha_{1,mid}$, of the angle of attack, $\alpha_{2,mid}$, at the 50 percent spanwise position of the second turbine blade and the angle of attack, $\alpha_{1,mid}$, at the 50 percent spanwise position of the first turbine blade is between 0.60 and 0.93 when measured at cruise conditions.

According to another aspect, there is a method of operating a geared gas turbine engine comprising a high pressure turbine configured to drive a compressor and a low pressure turbine configured to drive a propulsor via a reduction gearbox, the high pressure turbine comprising a first turbine stage comprising a first turbine blade and a second turbine stage comprising a second turbine blade, the method comprising:

operating the geared gas turbine engine at cruise conditions, wherein:

the first turbine blade comprises a first aerofoil extending spanwise between an inner radius of the first turbine blade and an outer radius of the first turbine blade;

the second turbine blade comprises a second aerofoil extending spanwise between an inner radius of the second turbine blade and an outer radius of the second turbine blade;

at the cruise conditions, a ratio, $\alpha_{2,mid}/\alpha_{1,mid}$, of an angle of attack, $\alpha_{2,mid}$, at a 50 percent spanwise position of the second turbine blade and an angle of attack, $\alpha_{1,mid}$, at a 50 percent spanwise position of the first turbine blade is between 0.22 and 0.92.

In another embodiment, the ratio, $\alpha_{2,mid}/\alpha_{1,mid}$, of the angle of attack, $\alpha_{2,mid}$, at the 50 percent spanwise position of the second turbine blade and the angle of attack, $\alpha_{1,mid}$, at the 50 percent spanwise position of the first turbine blade is between 0.60 and 0.93 when measured at cruise conditions.

According to another aspect, there is a geared gas turbine engine comprising a high pressure turbine configured to drive a compressor and a low pressure turbine configured to drive a propulsor via a reduction gearbox, wherein:

the high pressure turbine comprises a first turbine stage and a second turbine stage downstream of the first turbine stage, the first turbine stage comprising a first turbine blade and the second turbine stage comprising a second turbine blade;

the first turbine blade comprises a first aerofoil extending spanwise between an inner radius of the first turbine blade and an outer radius of the first turbine blade;

the second turbine blade comprises a second aerofoil extending spanwise between an inner radius of the second turbine blade and an outer radius of the second turbine blade;

a ratio, $\alpha_{1,mid}/\alpha_{2,mid}$, of an angle of attack, $\alpha_{1,mid}$, at a 50 percent spanwise position of the second turbine blade and an angle of attack, $\alpha_{2,mid}$, at a 50 percent spanwise position of the first turbine blade is between −1.04 and 4.50 when measured at cruise conditions.

In another embodiment, the ratio, $\alpha_{1,mid}/\alpha_{2,mid}$, of an angle of attack, $\alpha_{1,mid}$, at a 50 percent spanwise position of the second turbine blade and an angle of attack, $\alpha_{2,mid}$, at a 50 percent spanwise position of the first turbine blade is between 1.04 and 1.60 when measured at cruise conditions.

According to another aspect, there is a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a turbine stage, the turbine stage comprising a turbine blade extending spanwise from an inner radius to an outer radius, a radial distance from the engine axis of rotation to the inner radius being equal to a turbine hub radius, $R_{HT1}$, and a radial distance from engine axis of rotation to the outer radius of the turbine blade being equal to a turbine tip radius, $R_{T1}$, wherein a turbine hub-to-tip ratio, $R_{HT1}/R_{T1}$, is between 0.50 and 0.92 and a speed of rotation of the high pressure turbine at cruise conditions is between 14000 rpm and 25000 rpm.

In another embodiment, the speed of rotation of the high pressure turbine at cruise conditions is between 11000 rpm and 18500 rpm, and the turbine hub-to-tip ratio, $R_{HT1}/R_{T1}$, is between 0.60 and 0.94.

According to another aspect, there is a method of operating a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation, the high pressure turbine comprises a turbine stage, the turbine stage comprising a turbine blade extending spanwise from an inner radius to an outer radius, a radial distance from the engine axis of rotation to the inner radius of the turbine blade being equal to a turbine hub radius, $R_{HT1}$, and a radial distance from the engine axis of rotation to the outer radius of the turbine blade being equal to a turbine tip radius, $R_{T1}$, the method comprises operating the geared gas turbine engine at cruise conditions, wherein, at cruise conditions, a turbine hub-to-tip ratio, $R_{HT1}/R_{T1}$, is between 0.50 and 0.92 and a speed of rotation of the high pressure turbine at cruise conditions is between 14000 rpm and 25000 rpm.

In another embodiment, the speed of rotation of the high pressure turbine at cruise conditions is between 11000 rpm and 18500 rpm, and the turbine hub-to-tip ratio, $R_{HT1}/R_{T1}$, is between 0.60 and 0.94.

According to another aspect, there is a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a turbine stage, the turbine stage comprising a turbine blade extending spanwise from an inner radius to an outer radius, a radial distance from the engine axis of rotation to the inner radius of the turbine blade being equal to a turbine hub radius, $R_{HT1}$, and a radial distance from the engine axis of rotation to the outer radius of the turbine blade being equal to a turbine tip radius, $R_{T1}$;

the turbine blade comprises an aerofoil extending spanwise between the inner radius and the outer radius of the turbine blade, extending chordwise between the leading edge and the trailing edge, and defining a camber line that is a locus of points half-way between the pressure surface and the suction surface;

the turbine stage blade has, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface; and a turbine hub-to-tip ratio, $R_{HT1}/R_{T1}$, is between 0.50 and 0.92 and a sum, $\tau_{tip}+\tau_{mid}$, of a thickness to chord ratio at a 100 percent spanwise position of the turbine blade, $\tau_{tip}$, and a thickness to chord ratio a 50 percent spanwise position of the first turbine blade, $\tau_{mid}$, is between 0.30 and 0.46.

In another embodiment, the turbine hub-to-tip ratio, $R_{HT1}/R_{T1}$, is between 0.60 and 0.94, and the sum, $\tau_{tip}+\tau_{mid}$, of the thickness to chord ratio at the 100 percent spanwise position of the turbine blade, $\tau_{tip}$, and the thickness to chord ratio the 50 percent spanwise position of the first turbine blade, $\tau_{mid}$, is between 0.50 and 0.78.

According to another aspect, there is a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a turbine stage, the turbine stage comprising a turbine blade extending spanwise from an inner radius to an outer radius, a radial distance from the engine axis of rotation to the inner radius of the turbine blade being equal to a turbine hub radius, $R_{HT1}$, and a radial distance from engine axis of rotation to the outer radius of the turbine blade being equal to a turbine tip radius, $R_{T1}$; and the compressor comprises a compressor stage, the compressor comprising a compressor blade extending spanwise from an inner radius to an outer radius, a radial distance from the engine axis of rotation to the inner radius of the compressor blade being equal to a compressor hub radius, $R_{HC1}$, and a radial distance from engine axis of rotation to the outer radius of the compressor blade being equal to a compressor tip radius, $R_{C1}$, a turbine hub-to-tip ratio, $R_{HT1}/R_{T1}$, of the high pressure turbine is between 0.60 and 0.94, a compressor hub-to-tip ratio, $R_{HC1}/R_{C1}$, of the compressor is between 0.36 and 0.62, and a speed of rotation of a shaft connecting the high pressure turbine and the compressor is between 13000 rpm and 21000 rpm at cruise conditions.

In another embodiment, the speed of rotation of the high pressure turbine at cruise conditions is between 10000 rpm and 17500 rpm, the turbine hub-to-tip ratio, $R_{HT1}/R_{T1}$, of the high pressure turbine is between 0.65 and 0.95, a compressor hub-to-tip ratio, $R_{HC1}/R_{C1}$, of the compressor is between 0.38 and 0.64.

According to another aspect, there is a method of operating a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a turbine stage, the turbine stage comprising a turbine blade extending spanwise from an inner radius to an outer radius, a radial distance from the engine axis of rotation to the inner radius being equal to a turbine hub radius, $R_{HT1}$, and a radial distance from engine axis of rotation to the outer radius the turbine blade being equal toa turbine tip radius, $R_{T1}$;

the compressor comprises a compressor stage, the compressor comprising a compressor blade extending spanwise from an inner radius to an outer radius, a radial distance from the engine axis of rotation to the inner radius being equal to a compressor hub radius, $R_{HC1}$, and a radial distance from engine axis of rotation to the outer radius the compressor blade being equal to $R_{HC}$;

a turbine hub-to-tip ratio, $R_{HT1}/R_{T1}$, of the high pressure turbine is between 0.60 and 0.94, a compressor hub-to-tip ratio, $R_{HC1}/R_{C1}$, of the compressor is between 0.36 and 0.62; and the method comprises operating the geared gas turbine engine at cruise conditions, wherein, at cruise conditions, a speed of rotation of a shaft connecting the high pressure turbine and the compressor is between 13000 rpm and 21000 rpm.

In another embodiment, the speed of rotation of the high pressure turbine at cruise conditions is between 10000 rpm and 17500 rpm, the turbine hub-to-tip ratio, $R_{HT1}/R_{T1}$, of the high pressure turbine is between 0.65 and 0.95, and the compressor hub-to-tip ratio, $R_{HC1}/R_{C1}$, of the compressor is between 0.38 and 0.64.

According to another aspect, there is a geared gas turbine engine comprising a high pressure turbine configured to drive a compressor and a low pressure turbine configured to drive a propulsor via a reduction gearbox, wherein:

the propulsor, the compressor, the high pressure turbine and the low pressure turbine are configured to rotate about an engine axis of rotation;

the high pressure turbine comprises a turbine stage, the turbine stage comprising a turbine blade extending spanwise from an inner radius to an outer radius, a radial distance from the engine axis of rotation to the inner radius being equal to a turbine hub radius, $R_{HT1}$, and a radial distance from engine axis of rotation to the outer radius of the turbine blade being equal to a turbine tip ratio, $R_{T1}$; and a turbine hub-to-tip ratio, $R_{HT1}/R_{T1}$, of the high pressure turbine is between 0.60 and 0.94, and, at cruise conditions, a speed of rotation of a shaft connecting the high pressure turbine and the compressor is between 13000 rpm and 21000 rpm and a loading parameter, $\lambda$, of the turbine stage is between 1.30 and 1.80, where $\lambda=dH/U^2$, dH being an amount of work done by the turbine stage per unit mass flow, and U being a mean blade speed of the turbine blade In another embodiment, the speed of rotation of the high pressure turbine at cruise conditions is between 10000 rpm and 17500 rpm, the turbine hub-to-tip ratio, $R_{HT1}/R_{T1}$, of the high pressure turbine is between 0.65 and 0.95, and the loading parameter, of the turbine stage is between 1.30 and 1.80.

According to another aspect, there is a geared gas turbine engine comprising a high pressure turbine configured to drive a compressor and a low pressure turbine configured to drive a propulsor via a reduction gearbox, wherein:

- the high pressure turbine comprises a turbine stage, the turbine stage comprising a set of nozzle guide vanes, NGVs, and a plurality of turbine blades downstream of the set of NGVs; and
- a ratio, $\varepsilon_1$, of a cooling mass flow for cooling the plurality of turbine blades of the turbine stage and a throat mass flow of the set of NGVs of the turbine stage is between 0.040 and 0.075 at cruise conditions.

According to another aspect, there is a method of operating a geared gas turbine engine comprising a high pressure turbine configured to drive a compressor and a low pressure turbine configured to drive a propulsor via a reduction gearbox, wherein:

- the high pressure turbine comprises a first turbine stage, the first turbine stage comprising a first turbine nozzle guide vane, NGV, and a first turbine blade downstream of the first turbine NGV; and
- the method comprises operating the geared gas turbine engine at cruise conditions, wherein a ratio, $\varepsilon_1$, of a cooling mass flow for cooling the first turbine blade and a throat mass flow of the first turbine NGV is between 0.040 and 0.075 at the cruise conditions.

According to another aspect, aspect, there is a geared gas turbine engine comprising a high pressure turbine configured to drive a compressor and a low pressure turbine configured to drive a propulsor via a reduction gearbox, wherein:

- the high pressure turbine comprises a first turbine stage, the first turbine stage comprising a first turbine nozzle guide vane, NGV, and a first turbine blade downstream of the first turbine NGV; and
- a ratio, $\nu_1$, of a cooling mass flow for cooling the first turbine NGV and a throat mass flow of the first turbine NGV is between 0.080 and 0.150 at cruise conditions.

According to a general aspect, there is a geared gas turbine engine comprising a high pressure turbine configured to drive a compressor and a low pressure turbine configured to drive a propulsor via a reduction gearbox, wherein the high pressure turbine comprises a turbine stage.

According to another general aspect, there is a method of operating a geared gas turbine engine comprising a high pressure turbine configured to drive a compressor and a low pressure turbine configured to drive a propulsor via a reduction gearbox, the high pressure turbine comprising a turbine stage. The method comprises operating the geared gas turbine engine at cruise conditions.

In the following, any feature may be used in combination with any of the above aspects, including the general aspects. Except where mutually exclusive, any feature may be used in combination with any other feature.

The propulsor, the compressor, the high pressure turbine and the low pressure turbine may be configured to rotate about a principal engine axis of rotation.

The propulsor may be a ducted fan. In another example, the propulsor may be an open rotor propulsor.

The geared gas turbine engine may comprise an engine controller. The engine controller may be configured to operate the gas turbine engine at cruise conditions.

The turbine stage may comprise a turbine blade (e.g., at least one turbine blade, a plurality of turbine blades, or a number, $N_T$, of turbine blades).

The (or each) turbine blade may comprise an aerofoil.

The aerofoil may have a leading edge, a trailing edge, a pressure surface extending between the leading edge and the trailing edge, and a suction surface extending between the leading edge and the trailing edge opposite the pressure surface.

The aerofoil may extend chordwise between the leading edge and the trailing edge, extend spanwise between an inner radius and an outer radius, and define a camber line that is a locus of points, defined for each chordwise position, half-way between the pressure surface and the suction surface.

The (or each) turbine blade may have, for each respective spanwise position of the aerofoil, a respective chord length and a respective thickness, the chord length being a straight line distance between the leading edge and the trailing edge, and the thickness being a maximum diameter of a circle that is centred on the camber line and has a circumference that is tangent to the pressure surface and to the suction surface.

The turbine stage may have a loading parameter, $\lambda=dH/U^2$, dH being an amount work done by the turbine stage per unit mass flow, and U being a mean blade speed of the turbine blade. The mean blade speed, U, may be equal to an angular speed of rotation of the HP shaft multiplied by a mean radius of the turbine blade. The mean radius of the turbine blade may be equal to the mean of four radius values of the turbine blade: the radius at the leading edge at the inner radius (0 percent spanwise position); the radius at the leading edge at the outer radius (100 percent spanwise position); the radius at the trailing edge at the inner radius (0 percent spanwise position); and the radius at the trailing edge at the outer radius (100 percent spanwise position).

The turbine stage may have a speed parameter, $\mu=U/\sqrt{T}$, U being the mean blade speed of the turbine blade, and T being an inlet temperature of the turbine stage. The inlet temperature, T, may be a maximum stagnation temperature at a position immediately upstream of a rotating portion of the turbine stage.

The turbine stage may have a blade pitch, s, equal to $2\pi$ multiplied by a ratio of a mean radius of the turbine blades and $N_T$.

The (or each) turbine blade may have, for each respective spanwise position of the aerofoil, a respective solidity, $\sigma$, defined as a ratio of the chord length and the blade pitch, s, of the turbine stage.

The (or each) turbine blade may have an angle of attack, $\alpha_{1,mid}$, measured at a 50 percent spanwise position of the turbine blade. The angle of attack may be defined as the angle formed between a principal axis of the engine and an angle of incidence of an airflow through the high pressure turbine impinging on the turbine blade. The angle of attack may be measured at cruise conditions.

The (or each) turbine blade of the turbine stage may extend spanwise from an inner radius to an outer radius. A radial distance from the engine axis of rotation to the inner radius of the turbine blade may be equal to a turbine hub radius, $R_{HT1}$. A radial distance from the engine axis of rotation to the outer radius of the turbine blade may be being equal to a turbine tip radius, $R_{T1}$. The turbine stage may be a first, most axially upstream, turbine stage of the high pressure turbine.

The (or each) turbine blade of the turbine stage may have a blade height, $h_1$, defined as the difference between the turbine tip radius, $R_{T1}$ and the turbine hub radius, $R_{HT1}$. In other words, $h_1$ is equal to $R_{T1}-R_{HT1}$.

The (or each) turbine blade of the turbine stage may have an aspect ratio, $AR_1$, defined as the ratio of the blade height, $h_1$, and the chord length at a 100 percent spanwise position of the turbine blade.

The compressor may comprise a compressor stage, the compressor comprising a compressor blade. The compressor blade may extend spanwise from an inner radius to an outer radius. A radial distance from the engine axis of rotation to the inner radius of the compressor blade may be equal to a compressor hub radius, $R_{HC1}$. A radial distance from the engine axis of rotation to the outer radius of the compressor blade may be equal to a compressor tip radius, $R_{C1}$. The compressor is coupled to the high pressure turbine and may be referred to as the high pressure compressor. The compressor stage may be a first, most axially upstream, compressor stage of the high pressure compressor.

In a first group of embodiments in accordance with the above general aspects, a maximum static thrust of the geared gas turbine engine may up to 220 kN. For example, the geared gas turbine engine may be configured to produce up to 200 kN of static thrust, up to 175 kN of static thrust, up to 155 kN of static thrust, up to 130 kN of static thrust, up to 110 kN of static thrust, up to 90 kN of static thrust, or up to 65 kN of static thrust.

A speed of rotation of the high pressure turbine at cruise conditions may be between 14000 rpm and 25000 rpm. The speed of rotation of the high pressure turbine at cruise conditions may be between 15000 rpm and 24000 rpm, 15500 rpm and 23500 rpm, between 16000 rpm and 23000 rpm, between 16500 rpm and 22500 rpm, between 17000 rpm and 22000 rpm, between 17500 rpm and 21500 rpm, or between 18000 rpm and 21000 rpm. In another example, the speed of rotation of the high pressure turbine at cruise conditions may be lower, for example between 13000 rpm and 21000 rpm. The speed of rotation of the high pressure turbine at cruise conditions may be between 14000 rpm and 20500 rpm, between 14500 rpm and 20750 rpm, between 15000 rpm and 20000 rpm, between 15500 rpm and 19500 rpm, between 16000 rpm and 19000 rpm, between 16250 rpm and 18750 rpm, or between 16500 rpm and 18500 rpm. In another example, the speed of rotation of the high pressure turbine at cruise conditions may be higher, for example between 17000 rpm and 28000 rpm. The speed of rotation of the high pressure turbine at cruise conditions may be between 18000 rpm and 27000 rpm, 18500 rpm and 26500 rpm, between 19000 rpm and 26000 rpm, between 19500 rpm and 25500 rpm, between 20000 rpm and 25000 rpm, between 19500 rpm and 24500 rpm, or between 20000 rpm and 24000 rpm.

The turbine blade may have a thickness to chord ratio at a 100 percent spanwise position, $\tau_{tip}$, of between 0.11 and 0.18. $\tau_{tip}$ may be between 0.12 and 0.17, between 0.12 and 0.16, between 0.13 and 0.16, or between 0.13 and 0.15. $\tau_{tip}$ may be greater than 0.12, greater than 0.13, greater than 0.14, greater than 0.15, greater than 0.16, or greater than 0.16. $\tau_{tip}$ may be less than 0.17, less than 0.16, less than 0.15, less than 0.14, less than 0.13, or less than 0.12. In another example, $\tau_{tip}$ may be between 0.18 and 0.30. $\tau_{tip}$ may be between 0.19 and 0.29, between 0.20 and 0.28, between 0.21 and 0.27, between 0.22 and 0.26, or between 0.23 and 0.25. $\tau_{tip}$ may be greater than 0.19, greater than 0.20, greater than 0.21, greater than 0.22, greater than 0.23, or greater than 0.24. $\tau_{tip}$ may be less than 0.29, less than 0.28, less than 0.27, less than 0.26, less than 0.25, or less than 0.24.

The turbine blade may have a thickness to chord ratio at a 50 percent spanwise position, $\tau_{mid}$, of between 0.19 and 0.29. $\tau_{mid}$ may be between 0.20 and 0.28, between 0.21 and 0.27, between 0.22 and 0.26, or between 0.23 and 0.25. $\tau_{mid}$ may be greater than 0.20, greater than 0.21, greater than 0.22, greater than 0.23, greater than 0.24, or greater than 0.25. $\tau_{mid}$ may be less than 0.28, less than 0.27, less than 0.26, less than 0.25, less than 0.24, or less than 0.23. In another example, $\tau_{mid}$ may be between 0.23 and 0.35. $\tau_{mid}$ may be between 0.24 and 0.34, between 0.25 and 0.33, between 0.26 and 0.32, between 0.27 and 0.31, or between 0.28 and 0.30. $\tau_{mid}$ may be greater than 0.24, greater than 0.25, greater than 0.26, greater than 0.27, greater than 0.28, or greater than 0.29. $\tau_{mid}$ may be less than 0.34, less than 0.33, less than 0.32, less than 0.31, less than 0.30, or less than 0.29.

The turbine blade may have a thickness to chord ratio at a 0 percent spanwise position, $\tau_{hub}$, of between 0.24 and 0.38. $\tau_{hub}$ may be between 0.23 and 0.37, between 0.26 and 0.36, between 0.27 and 0.35, or between 0.28 and 0.34. $\tau_{hub}$ may be greater than 0.25, greater than 0.26, greater than 0.27, greater than 0.28, greater than 0.29, or greater than 0.30. $\tau_{hub}$ may be less than 0.37, less than 0.36, less than 0.35, less than 0.34, less than 0.33, or less than 0.32. In another example, $\tau_{hub}$ may be between 0.28 and 0.45. $\tau_{hub}$ may be between 0.29 and 0.44, between 0.31 and 0.42, between 0.32 and 0.41, between 0.33 and 0.40, or between 0.34 and 0.39. $\tau_{hub}$ may be greater than 0.29, greater than 0.30, greater than 0.31, greater than 0.32, greater than 0.33, or greater than 0.34. $\tau_{tip}$ may be less than 0.44, less than 0.43, less than 0.42, less than 0.41, less than 0.40, or less than 0.39.

A ratio of the thickness of the turbine blades at a 100 percent spanwise position and the blade pitch, s, of the turbine stage may be between 0.13 and 0.21. The ratio may be between 0.13 and 0.20, between 0.14 and 0.19, or between 0.15 and 0.18. The ratio may be greater than 0.14, greater than 0.15, greater than 0.16, greater than 0.17, greater than 0.18, or greater than 0.19. The ratio may be less than 0.20, less than 0.19, less than 0.18, less than 0.17, less than 0.16, or less than 0.15.

A ratio of the thickness of the turbine blades at a 50 percent spanwise position and the blade pitch, s, of the turbine stage may be between 0.21 and 0.35. The ratio may be between 0.22 and 0.34, between 0.23 and 0.32, between 0.24 and 0.31, between 0.25 and 0.30, or between 0.26 and 0.29. The ratio may be greater than 0.22, greater than 0.23, greater than 0.24, greater than 0.25, greater than 0.26, greater than 0.27, or greater than 0.28. The ratio may be less than 0.34, less than 0.33, less than 0.32, less than 0.31, less than 0.30, less than 0.29, less than 0.28, or less than 0.27.

A ratio of the thickness of the turbine blades at a 0 percent spanwise position and the blade pitch, s, of the turbine stage may be between 0.24 and 0.42. The ratio may be between 0.25 and 0.40, between 0.26 and 0.39, between 0.27 and 0.38, between 0.28 and 0.37, or between 0.30 and 0.35. The ratio may be greater than 0.25, greater than 0.27, greater than 0.29, greater than 0.31, greater than 0.33, or greater than 0.34. The ratio may be less than 0.41, less than 0.39, less than 0.37, less than 0.35, less than 0.33, or less than 0.31.

A sum, $\tau_{tip}+\tau_{mid}$, of a thickness to chord ratio at the a 100 percent spanwise position of the turbine blade, $\tau_{tip}$ and a thickness to chord ratio a 50 percent spanwise position of the turbine blade, $\tau_{mid}$, may be between 0.30 and 0.46. $\tau_{tip}+\tau_{mid}$ may be between 0.31 and 0.44, between 0.32 and 0.43, between 0.33 and 0.42, between 0.34 and 0.41, or between 0.35 and 0.40. $\tau_{tip}+\tau_{mid}$ may be greater than 0.31, greater than 0.32, greater than 0.33, greater than 0.34, greater than 0.35, greater than 0.36, greater than 0.37, or greater than 0.38. $\tau_{tip}+\tau_{mid}$ may be less than 0.45, less than 0.44, less than 0.43, less than 0.42, less than 0.41, less than 0.40, or less than 0.39.

A sum, $\tau_{tip}+\tau_{hub}$, of a thickness to chord ratio at a 100 percent spanwise position of the turbine blade, $\tau_{tip}$ and a thickness to chord ratio a 0 percent spanwise position of the turbine blade, $\tau_{hub}$, may be between 0.35 and 0.56. $\tau_{tip}+\tau_{hub}$ may be between 0.37 and 0.54, between 0.38 and 0.52, between 0.39 and 0.50, between 0.40 and 0.49, or between 0.41 and 0.48. $\tau_{tip}+\tau_{hub}$ may be greater than 0.36, greater than 0.38, greater than 0.40, greater than 0.42, greater than 0.43, greater than 0.44, greater than 0.45 or greater than 0.46. $\tau_{tip}+\tau_{hub}$ may be less than 0.55, less than 0.53, less than 0.51, less than 0.49, less than 0.47, less than 0.45, or less than 0.44.

A sum, $\tau_{mid}+\tau_{hub}$, of a thickness to chord ratio at the a 50 percent spanwise position of the turbine blade, $\tau_{mid}$ and a thickness to chord ratio a 0 percent spanwise position of the turbine blade, $\tau_{hub}$, may be between 0.43 and 0.68. $\tau_{mid}+\tau_{hub}$ may be between 0.45 and 0.66, between 0.47 and 0.64, between 0.49 and 0.62, between 0.51 and 0.60, or between 0.53 and 0.58. $\tau_{mid}+\tau_{hub}$ may be greater than 0.44, greater than 0.46, greater than 0.48, greater than 0.50, greater than 0.51, greater than 0.52, greater than 0.53 or greater than 0.54. $\tau_{mid}+\tau_{hub}$ may be less than 0.67, less than 0.65, less than 0.63, less than 0.61, less than 0.59, less than 0.57, or less than 0.56.

A product of a thickness to chord ratio at a 100 percent spanwise position, $\tau_{tip}$, of the turbine blades and the blade pitch, s, of the turbine stage may be between 2.9 mm and 6.0 mm. The product of $\tau_{tip}$ and s may be between 3.1 mm and 5.8 mm, between 3.3 mm and 5.6 mm, between 3.5 and 5.4 mm, between 3.7 mm and 5.3 mm, between 3.8 mm and 5.2 mm, or between 3.9 mm and 5.1 mm. The product of $\tau_{tip}$ and s may be greater than 3.0 mm, greater than 3.2 mm, greater than 3.4 mm, greater than 3.6 mm, greater than 3.8 mm, greater than 4. mm, greater than 4.1 mm, greater than 4.2 mm, greater than 4.3 mm, greater than 4.4 mm, greater than 4.5 mm, greater than 4.6 mm, or greater than 4.7 mm. The product of $\tau_{tip}$ and s may be less than 5.9 mm, less than 5.8 mm, less than 5.7 mm, less than 5.6 mm, less than 5.5 mm, less than 5.4 mm, less than 5.3 mm, less than 5.2 mm, less than 5.1 mm, less than 5.0 mm, less than 4.9 mm, less than 4.8 mm, less than 4.7 mm, less than 4.6 mm, less than 4.5 mm, or less than 4.4 mm.

A product of a thickness to chord ratio at a 50 percent spanwise position, $\tau_{mid}$, of the turbine blades and the blade pitch, s, of the turbine stage may be between 5.6 mm and 9.8 mm. The product of $\tau_{mid}$ and s may be between 5.8 mm and 9.6 mm, between 6.0 mm and 9.4 mm, between 6.2 mm and 9.2 mm, between 6.4 mm and 9.0 mm, between 6.6 mm and 8.8 mm, or between 6.8 mm and 8.6 mm. The product of $\tau_{mid}$ and s may be greater than 5.7 mm, greater than 5.9 mm, greater than 6.1 mm, greater than 6.3 mm, greater than 6.4 mm, greater than 6.5 mm, greater than 6.6 mm, greater than 6.7 mm, greater than 6.8 mm, greater than 6.9 mm, greater than 7.0 mm, greater than 7.1 mm, or greater than 7.2 mm. The product of $\tau_{mid}$ and s may be less than 9.7 mm, less than 9.6 mm, less than 9.5 mm, less than 9.4 mm, less than 9.3 mm, less than 9.2 mm, less than 9.1 mm, less than 9.0 mm, less than 8.9 mm, less than 8.8 mm, less than 8.7 mm, less than 8.6 mm, or less than 8.5 mm.

A product of a thickness to chord ratio at a 0 percent spanwise position, $\tau_{hub}$, of the turbine blades and the blade pitch, s, of the turbine stage may be between 6.7 mm and 13.0 mm. The product of $\tau_{hub}$ and s may be between 6.9 mm and 12.8 mm, between 7.2 mm and 12.5 mm, between 7.5 mm and 12.2 mm, between 7.8 mm and 11.9 mm, between 8.1 and 11.6 mm, between 8.5 mm and 11.4 mm, between 9.0 and 11.2 mm, or between 9.1 mm and 11.1 mm. The product of $\tau_{hub}$ and s may be greater than 6.8 mm, greater than 7.1 mm, greater than 7.4 mm, greater than 7.7 mm, greater than 8.0 mm, greater than 8.3 mm, greater than 8.4 mm, greater than 8.5 mm, greater than 8.6 mm, greater than 8.7 mm, greater than 8.8 mm, greater than 8.9 mm, greater than 9.0 mm, greater than 9.1 mm or greater than 9.2 mm. The product of $\tau_{hub}$ and s may be less than 12.8 mm, less than 12.6 mm, less than 12.5 mm, less than 12.4 mm, less than 12.3 mm, less than 12.2 mm, less than 12.1 mm, less than 12.0 mm, less than 11.9 mm, less than 11.8 mm, less than 11.7 mm, less than 11.6 mm, less than 11.5 mm, less than 11.4 mm, or less than 11.3 mm.

At cruise conditions, the loading parameter, $\lambda$, may be between 1.30 and 1.80, and the speed parameter, $\mu$, may be between 10.7 $ms^{-1}K^{-0.5}$ and 12.0 $ms^{-1}K^{-0.5}$.

The loading parameter, $\lambda$, may be between 1.35 and 1.75, between 1.40 and 1.70, or between 1.45 and 1.55. The loading parameter, $\lambda$, may be greater than 1.32, greater than 1.34, greater than 1.36, greater than 1.38, greater than 1.40, greater than 1.42, greater than 1.44, greater than 1.46, greater than 1.48, greater than 1.50, greater than 1.52, greater than 1.54, greater than 1.56, greater than 1.58, or greater than 1.60. The loading parameter, $\lambda$, may be less than 1.78, less than 1.76, less than 1.74, less than 1.72, less than 1.70, less than 1.68, less than 1.66, less than 1.64, less than 1.62, less than 1.60, less than 1.55, less than 1.50, or less than 1.45.

The speed parameter, $\mu$, may be between 11.0 $ms^{-1}K^{-0.5}$ and 12.0 $ms^{-1}K^{-0.5}$, between 11.3 $ms^{-1}K^{-0.5}$ and 12.0 $ms^{-1}K^{-0.5}$, between 11.5 $ms^{-1}K^{-0.5}$ and 12.0 $ms^{-1}K^{-0.5}$, or between 11.7 $ms^{-1}K^{-0.5}$ and 12.0 $ms^{-1}K^{-0.5}$. The speed parameter, $\mu$, may be greater than 11.1 $ms^{-1}K^{-0.5}$, greater than 11.2 $ms^{-1}K^{-0.5}$, greater than 11.3 $ms^{-1}K^{-0.5}$, greater than 11.4 $ms^{-1}K^{-0.5}$, greater than 11.5 $ms^{-1}K^{-0.5}$, greater than 11.6 $ms^{-1}K^{-0.5}$, greater than 11.7 $ms^{-1}K^{-0.5}$, or greater than 11.8 $ms^{-1}K^{-0.5}$. The speed parameter, $\mu$, may be less than 11.9 $ms^{-1}K^{-0.5}$, less than 11.8 $ms^{-1}K^{-0.5}$, less than 11.7 $ms^{-1}K^{-0.5}$, less than 11.6 $ms^{-1}K^{-0.5}$, less than 11.5 $ms^{-1}K^{-0.5}$, less than 11.4 $ms^{-1}K^{-0.5}$, less than 11.3 $ms^{-1}K^{-0.5}$, or less than 11.2 $ms^{-1}K^{-0.5}$.

At cruise conditions, a product of $\lambda$ and a thickness to chord ratio at a 100 percent spanwise position of the turbine blade, $\tau_{tip}$, may be between 0.15 and 0.30. The product of $\lambda$ and $\tau_{tip}$ may be between 0.17 and 0.29, between 0.19 and 0.28, between 0.20 and 0.27, between 0.21 and 0.26, between 0.22 and 0.25, or between 0.23 and 0.24. The product of $\lambda$ and $\tau_{tip}$ may be greater than 0.16, greater than 0.17, greater than 0.18, greater than 0.19, greater than 0.20, greater than 0.21, greater than 0.22, greater than 0.23, greater than 0.24, or greater than 0.25. The product of $\lambda$ and $\tau_{tip}$ may be less than 0.29, less than 0.28, less than 0.27, less than 0.26, less than 0.25, or less than 0.24.

At cruise conditions, a product of $\lambda$ and a thickness to chord ratio at a 50 percent spanwise position of the turbine blade, $\tau_{mid}$, may be between 0.24 and 0.52. The product of $\lambda$ and $\tau_{mid}$ may be between 0.26 and 0.50, between 0.28 and 0.48, between 0.32 and 0.44, between 0.31 and 0.41, or between 0.33 and 0.39. The product of $\lambda$ and $\tau_{mid}$ may be greater than 0.25, greater than 0.27, greater than 0.29, greater than 0.31, greater than 0.33, greater than 0.35, or greater than 0.37. The product of $\lambda$ and $\tau_{mid}$ may be less than 0.51, less than 0.49, less than 0.47, less than 0.45, less than 0.43, or less than 0.41.

At cruise conditions, a product of $\lambda$ and a thickness to chord ratio at a 0 percent spanwise position of the turbine blade, $\tau_{hub}$, may be between 0.31 and 0.69. The product of $\lambda$ and $\tau_{hub}$ may be between 0.31 and 0.67, between 0.32 and 0.65, between 0.33 and 0.63, between 0.34 and 0.59, between 0.35 and 0.57, between 0.37 and 0.55, between 0.39 and 0.53, between 0.41 and 0.51, or between 0.44 and 0.50. The product of $\lambda$ and $\tau_{hub}$ may be greater than 0.32, greater than 0.34, greater than 0.36, greater than 0.38, greater than 0.40, greater than 0.42, or greater than 0.44. The product of $\lambda$ and $\tau_{hub}$ may be less than 0.68, less than 0.66, less than 0.64, less than 0.62, less than 0.60, less than 0.58, less than 0.56, less than 0.54, less than 0.52, or less than 0.50.

At cruise conditions, a product of $\lambda$ and the blade pitch, s, of the turbine stage may be between 32 mm and 66 mm. The product of $\lambda$ and s may between 34 mm and 60 mm, between 36 mm and 55 mm, between 38 mm and 52 mm, between 40 mm and 50 mm, or between 42 mm and 48 mm. The product of A and s may be greater than 33 mm, greater than 35 mm, greater than 37 mm, greater than 39 mm, greater than 41 mm, or greater than 43 mm. The product of $\lambda$ and s may be less than 62 mm, less than 58 mm, less than 56 mm, less than 54 mm, greater than 52 mm, or greater than 50 mm.

At cruise conditions, a ratio of $\mu$ and $\lambda$, $\mu/\lambda$, may be between 6.1 $ms^{-1}K^{-0.5}$ and 9.3 $ms^{-1}K^{-0.5}$. The ratio $\mu/\lambda$ may be between 6.4 and 8.9 $ms^{-1}K^{-0.5}$, between 6.7 and 8.5 $ms^{-1}K^{-0.55}$, or between 6.5 and 8.3 $ms^{-1}K^{-0.5}$. The ratio $\mu/\lambda$ may be greater than 6.3 $ms^{-1}K^{-0.5}$, greater than 6.5 $ms^{-1}K^{-0.5}$, greater than 6.7 $ms^{-1}K^{-0.5}$, greater than 6.9 $ms^{-1}K^{-0.5}$, greater than 7.1 $ms^{-1}K^{-0.5}$, greater than 7.3 $ms^{-1}K^{-0.5}$, or greater than 7.5 $ms^{-1}K^{-0.5}$. The ratio $\mu/\lambda$ may be less than 9.1 $ms^{-1}K^{-0.5}$, less than 8.9 $ms^{-1}K^{-0.5}$, less than 8.7 $ms^{-1}K^{-0.5}$, less than 8.5, less than 8.3 $ms^{-1}K^{-0.5}$, less than 8.1 $ms^{-1}K^{-0.5}$, or less than 7.9 $ms^{-1}K^{-0.5}$.

At cruise conditions, a ratio of the blade pitch, s, and $\mu$, $s/\mu$, may be between 1.7 $msK^{0.5}$ and 4.7 $msK^{0.5}$. (Note that in this case, "m" is the prefix "milli", so the unit $msK^{0.5}$ is milli-$sK^{0.5}$, in other words $10^{-3}$ $sK^{0.5}$.) The ratio may be between 1.9 $msK^{0.5}$ and 4.4 $msK^{0.5}$, between 2.1 $msK^{0.5}$ and 4.2 $msK^{0.5}$, or between 2.3 $msK^{0.5}$ and 3.9 $msK^{0.5}$. The ratio may be greater than 1.8 $msK^{0.5}$, greater than 1.9 $msK^{0.5}$, greater than 2.1 $msK^{0.5}$, greater than 2.3 $msK^{0.5}$, or greater than 2.5 $msK^{0.5}$. The ratio may be less than 4.5 $msK^{0.5}$, less than 4.3 $msK^{0.5}$, less than 4.1 $msK^{0.5}$, less than 3.9 $msK^{0.5}$, less than 3.7 $msK^{0.5}$, or less than 3.5 $msK^{0.5}$.

The thickness of the turbine blade at the 100 percent spanwise position may be greater than 4.0 mm. The thickness of the turbine blade at the 100 percent spanwise position may be less than 7.0 mm. The thickness of the turbine blade at the 100 percent spanwise position may be between 4.1 and 6.9 mm, between 4.2 and 6.8 mm, between 4.3 and 6.7 mm, or between 4.4 and 6.6 mm.

The thickness of the turbine blade at the 50 percent spanwise position may be greater than 6.0 mm. The thickness of the turbine blade at the 50 percent spanwise position may be less than 12.0 mm. The thickness of the turbine blade at the 50 percent spanwise position may be between 6.5 and 11.5 mm, between 6.7 and 11.2 mm, between 6.9 and 11.0 mm, or between 7.1 and 10.8 mm.

The thickness of the turbine blade at the 0 percent spanwise position may be greater than 7.5 mm. The thickness of the turbine blade at the 0 percent spanwise position may be less than 14.4 mm. The thickness of the turbine blade at the 0 percent spanwise position may be between 7.7 and 14.1 mm, between 7.9 and 13.9 mm, between 8.1 and 13.7 mm, or between 8.3 and 13.5 mm.

The chord length of the turbine blade at the 100 percent spanwise position may be greater than 30 mm. The chord length of the turbine blade at the 100 percent spanwise position may be less than 48 mm. The chord length of the turbine blade at the 100 percent spanwise position may be between 31 and 47 mm, between 32 and 46 mm, between 33 and 45 mm, between 34 and 44 mm, or between 35 and 43 mm.

The chord length of the turbine blade at the 50 percent spanwise position may be greater than 29 mm. The chord length of the turbine blade at the 50 percent spanwise position may be less than 49 mm. The chord length of the turbine blade at the 50 percent spanwise position may be between 30 and 48 mm, between 31 and 47 mm, between 32 and 46 mm, between 33 and 45 mm, or between 34 and 44 mm.

The chord length of the turbine blade at the 0 percent spanwise position may be greater than 28 mm. The chord length of the turbine blade at the 0 percent spanwise position may be less than 46 mm. The chord length of the turbine blade at the 0 percent spanwise position may be between 29 and 45 mm, between 30 and 44 mm, between 31 and 43 mm, between 32 and 42 mm, or between 33 and 41 mm.

The mean radius of the turbine blade may be between 190 mm and 315 mm. The mean radius may be between 200 mm and 310 mm, between 205 mm and 305 mm, between 210 mm and 300 mm, between 220 mm and 290 mm, between 230 mm and 280 mm, or between 235 mm and 275 mm. The mean radius may be greater than 195 mm, greater than 200 mm, greater than 205 mm, greater than 210 mm, greater than 215 mm, greater than 220 mm, greater than 225 mm, greater than 230 mm, greater than 235 mm, greater than 240 mm, greater than 245 mm, greater than 250 mm, or greater than 255 mm. The mean radius may be less than 310 mm, less than 305 mm, less than 300 mm, less than 295 mm, less than 290 mm, less than 285 mm, less than 280 mm, less than 275 mm, less than 270 mm, greater than 265 mm, less than 260 mm, less than 255 mm, or less than 250 mm.

The number of turbine blades, $N_T$, may be between 35 and 70. $N_T$ may be between 36 and 68, between 37 and 65, between 38 and 62, between 39 and 57, between 41 and 56, between 42 and 55, between 43 and 52, or between 44 and 51. $N_T$ may be greater than 36, greater than 37, greater than 38, greater than 39, greater than 40, greater than 41, or greater than 42. $N_T$ may be less than 61, less than 59, less than 57, less than 55, less than 53, less than 52, or less than 51.

The aspect ratio, $AR_1$, of the turbine blade, equal to the blade height, $h_1$, divided by the chord length at a 100 percent spanwise position of the turbine blade may be between 0.67 and 1.33. The aspect ratio may be between 0.69 and 1.31, between 0.71 and 1.29, between 0.73 and 1.26, between 0.75 and 1.24, between 0.77 and 1.22, between 0.79 and 1.20, between 0.81 and 1.18, between 0.83 and 1.16, between 0.85 and 1.14, between 0.87 and 1.12, between 0.89 and 1.10, between 0.91 and 1.08, or between 0.93 and 1.06. The aspect ratio may be greater than 0.74, greater than 0.76, greater than 0.78, greater than 0.80, greater than 0.82, greater than 0.84, greater than 0.86, greater than 0.88, greater than 0.90, greater than 0.92, greater than 0.94, greater than 0.96, greater than 0.98, or greater than 1.00. The aspect ratio may be less than 1.27, less than 1.25, less than 1.23, less than 1.21, less than 1.19, less than 1.17, less than 1.15, less than 1.13, less than 1.11, less than 1.09, less than 1.07, less than 1.05, less than 1.03, less than 1.01, less than 0.99, or less than 0.97.

A turbine hub-to-tip ratio, $R_{HT1}/R_{T1}$, of the turbine stage may be between 0.50 and 0.92 and a speed of rotation of the high pressure turbine at cruise conditions may be between 14000 rpm and 25000 rpm. $R_{HT1}/R_{T1}$ may be between 0.50 and 0.90, between 0.55 and 0.88, between 0.57 and 0.87, or between 0.60 and 0.86. $R_{HT1}/R_{T1}$ may be greater than 0.55, greater than 0.60, greater than 0.65, greater than 0.70, greater than 0.75, greater than 0.77, greater than 0.79, greater than 0.80, or greater than 0.81. $R_{HT1}/R_{T1}$ may be less than 0.91, less than 0.90, less than 0.89, less than 0.88, less than 0.87, or less than 0.86. The speed of rotation of the high pressure turbine at cruise conditions may be between 15000 rpm and 24000 rpm, 15500 rpm and 23500 rpm, between 16000 rpm and 23000 rpm, between 16500 rpm and 22500 rpm, between 17000 rpm and 22000 rpm, between 17500 rpm and 21500 rpm, or between 18000 rpm and 21000 rpm.

A turbine hub-to-tip ratio, $R_{HT1}/R_{T1}$, of the turbine stage may be between 0.60 and 0.94, a compressor hub-to-tip ratio, $R_{HC1}/R_{C1}$, of the compressor may be between 0.36 and 0.62, and a speed of rotation of a shaft connecting the high pressure turbine and the compressor may be between 13000 rpm and 21000 rpm at cruise conditions. $R_{HT1}/R_{T1}$ may be between 0.62 and 0.93, between 0.65 and 0.92, between 0.70 and 0.90, between 0.75 and 0.88, or between 0.60 and 0.86. $R_{HT1}/R_{T1}$ may be greater than 0.61, greater than 0.63, greater than 0.65, greater than 0.67, greater than 0.69, greater than 0.71, greater than 0.73, greater than 0.75, or greater than 0.76. $R_{HT1}/R_{T1}$ may be less than 0.93, less than 0.91, less than 0.89, less than 0.88, less than 0.87, or less than 0.86. $R_{HC1}/R_{C1}$ may be between 0.37 and 0.61, between 0.38 and 0.60, between 0.40 and 0.58, between 0.41 and 0.56, or between 0.42 and 0.53. $R_{HC1}/R_{C1}$ may be greater than 0.37, greater than 0.39, greater than 0.41, greater than 0.43, greater than 0.44, greater than 0.45, or greater than 0.46. $R_{HC1}/R_{C1}$ may be less than 0.61, less than 0.59, less than 0.57, less than 0.55, less than 0.54, or less than 0.53. The speed of rotation of the high pressure turbine at cruise conditions may be between 14000 rpm and 20500 rpm, between 14500 rpm and 20750 rpm, between 15000 rpm and 20000 rpm, between 15500 rpm and 19500 rpm, between 16000 rpm and 19000 rpm, between 16250 rpm and 18750 rpm, or between 16500 rpm and 18500 rpm.

The turbine stage may comprise a set of stator vanes, and a plurality of turbine blades downstream of the set of stator vanes. The turbine stage may comprise a set of nozzle guide vanes, NGVs, and a plurality of turbine blades downstream of the set of NGVs.

A ratio, $\varepsilon_1$, of a cooling mass flow for cooling the plurality of turbine blades of the turbine stage and a throat mass flow of the set of NGVs of the turbine stage is between 0.040 and 0.075 at cruise conditions. The cooling mass flow may be bleed air bled from the compressor. $\varepsilon_1$ may be between 0.040 and 0.070. $\varepsilon_1$ may be between 0.042 and 0.074, between 0.044 and 0.073, between 0.046 and 0.072, between 0.048 and 0.071, between 0.050 and 0.070, between 0.054 and 0.066, between 0.056 and 0.064, between 0.057 and 0.063, or between 0.058 and 0.062. &1 may be greater than 0.041, greater than 0.043, greater than 0.045, greater than 0.046, greater than 0.047, greater than 0.049, greater than 0.051, greater than 0.053, greater than 0.055, greater than 0.057, greater than 0.059, greater than 0.061, or greater than 0.063. $\varepsilon_1$ may be less than 0.074, less than 0.073, less than 0.071, less than 0.069, less than 0.067, less than 0.065, less than 0.063, less than 0.061, less than 0.059, or less than 0.057.

A ratio, $\nu_1$, of a cooling mass flow for cooling the set of NGVs and the throat mass flow of the set of NGVs is between 0.080 and 0.150 at cruise conditions. The cooling mass flow may be bleed air bled from the compressor. $\nu_1$ may be between 0.085 and 0.145, between 0.090 and 0.140, between 0.095 and 0.135, between 0.100 and 0.130, between 0.105 and 0.125, or between 0.110 and 0.120. $\nu_1$ may be greater than 0.083, greater than 0.086, greater than 0.089, greater than 0.092, greater than 0.095, greater than 0.098, greater than 0.101, greater than 0.104, greater than 0.106, greater than 0.109, or greater than 0.112. $\nu_1$ may be less than 0.140, less than 0.130, less than 0.120, less than 0.110, less than 0.105, less than 0.100, or less than 0.095.

A ratio of a combined cooling mass flow for cooling both the set of NGVs and a platform region of the turbine stage at an inner radius of the NGVs (e.g., at the inner annulus of the turbine stage at an axial position of the set of NGVs) and the throat mass flow of the set of NGVs may between 0.015 and 0.030. The ratio may be between 0.016 and 0.029, between 0.017 and 0.028, between 0.018 and 0.027. between 0.019 and 0.026, between 0.020 and 0.025, between 0.021 and 0.024, or between 0.022 and 0.023. The ratio may be greater than 0.017, greater than 0.019, greater than 0.021, greater than 0.023, greater than 0.025, greater than 0.027, or greater than 0.028. The ratio may be less than 0.029, less than 0.027, less than 0.025, less than 0.023, less than 0.021, less than 0.019, or less than 0.017.

In some embodiments, the turbine stage is a first turbine stage of the high pressure turbine, and the high pressure turbine further comprises a second turbine stage downstream of the first turbine stage.

In such embodiments, the second turbine stage may comprise a second turbine blade (e.g., at least one second turbine blade, a plurality of second turbine blades, or a number, $N_{T2}$, of second turbine blades).

The (or each) second turbine blade may comprise a second aerofoil.

The second aerofoil may have a second leading edge, a second trailing edge, a second pressure surface extending between the second leading edge and the second trailing edge, and a second suction surface extending between the second leading edge and the second trailing edge opposite the second pressure surface.

The second aerofoil may extend chordwise between the second leading edge and the second trailing edge, extend spanwise between a second inner radius and a second outer radius, and define a second camber line that is a locus of points half-way between the second pressure surface and the second suction surface. The second camber line may be the locus of points that, for each chordwise position, are half-way between the second pressure surface and the second suction surface.

The (or each) second turbine blade may have, for each respective spanwise position of the second aerofoil, a respective chord length and a respective thickness, the chord length being a straight line distance between the second leading edge and the second trailing edge, and the thickness being a maximum diameter of a circle that is centred on the second camber line and has a circumference that is tangent to the second pressure surface and to the second suction surface.

The second turbine stage may have a blade pitch, $s_2$, equal to $2\pi$ multiplied by a ratio of a mean radius of the second turbine blades and $N_{T2}$. The mean radius of a second turbine blade may be equal to the mean of four radius values of the second turbine blade: the radius at the second leading edge at the inner radius (0 percent spanwise position); the radius at the second leading edge at the outer radius (100 percent spanwise position); the radius at the second trailing edge at the inner radius (0 percent spanwise position); and the radius at the second trailing edge at the outer radius (100 percent spanwise position).

The (or each) second turbine blade may have, for each respective spanwise position of the second aerofoil, a respective solidity, $\sigma_2$, defined as a ratio of the chord length and the blade pitch, $s_2$, of the second turbine stage.

The second turbine stage may have a second loading parameter, $\lambda_2=dH_2/U_2^2$, $dH_2$ being an amount work done by the second turbine stage per unit mass flow, and $U_2$ being a mean blade speed of the second turbine blade. The mean blade speed, $U_2$, may be equal to speed of rotation of the HP shaft multiplied by a mean radius of the second turbine blade.

The second turbine stage may have a second speed parameter, $\mu_2=U_2/\sqrt{T_2}$, $U_2$ being the mean blade speed of the second turbine blade, and $T_2$ being an inlet temperature of the second turbine stage. The second inlet temperature, $T_2$, may be a maximum stagnation temperature at a position immediately upstream of a rotating portion of the second turbine stage.

The (or each) second turbine blade may have an angle of attack, $\alpha_{2,mid}$, measured at a 50 percent spanwise position of the second turbine blade. The angle of attack may be measured at cruise conditions. The angle of attack may be defined as the angle formed between an principal axis of the engine and an angle of incidence of an airflow impinging on the second turbine blade.

The second turbine blade may a second thickness to chord ratio at a 100 percent spanwise position, $\tau_{tip,2}$, of between 0.10 and 0.15. $\tau_{tip,2}$ may be between 0.10 and 0.14, or between 0.11 and 0.13. $\tau_{tip,2}$ may be greater than 0.11, greater than 0.12, greater than 0.13, or greater than 0.14. $\tau_{tip,2}$ may be less than 0.14, less than 0.13, less than 0.12, or less than 0.11.

The second turbine blade may have a second thickness to chord ratio at a 50 percent spanwise position, $\tau_{mid,2}$, of between 0.15 and 0.23. $\tau_{mid,2}$ may be between 0.16 and 0.22, between 0.17 and 0.21, or between 0.18 and 0.20. $\tau_{mid,2}$ may be greater than 0.16, greater than 0.17, greater than 0.18, greater than 0.19, or greater than 0.20. $\tau_{mid,2}$ may be less than 0.22, less than 0.21, less than 0.20, or less than 0.19.

The second turbine blade may have a second thickness to chord ratio at a 0 percent spanwise position, $\tau_{hub,2}$, of between 0.28 and 0.42. $\tau_{hub,2}$ may be between 0.29 and 0.41, between 0.30 and 0.40, between 0.31 and 0.39, between 0.32 and 0.38, between 0.33 and 0.37, or between 0.34 and 0.36. $\tau_{hub,2}$ may be greater than 0.29, greater than 0.30, greater than 0.31, greater than 0.32, greater than 0.33, greater than 0.34 or greater than 0.34. $\tau_{hub,2}$ may be less than 0.41, less than 0.40, less than 0.39, less than 0.38, less than 0.37, less than 0.36, or less than 0.35.

A ratio of the thickness of the second turbine blades at a 100 percent spanwise position and the blade pitch, $s_2$, of the second turbine stage may be between 0.12 and 0.19. The ratio may be between 0.13 and 0.18, between 0.14 and 0.17, or between 0.15 and 0.16. The ratio may be greater than 0.13, greater than 0.14, greater than 0.15, greater than 0.16, greater than 0.17, or greater than 0.18. The ratio may be less than 0.18, less than 0.17, less than 0.16, less than 0.15, less than 0.14, or less than 0.13.

A ratio of the thickness of the second turbine blades at a 50 percent spanwise position and the blade pitch, $s_2$, of the second turbine stage may be between 0.17 and 0.27. The ratio may be between 0.18 and 0.26, between 0.19 and 0.25, between 0.20 and 0.24, or between 0.21 and 0.23. The ratio may be greater than 0.18, greater than 0.19, greater than 0.20, or greater than 0.21. The ratio may be less than 0.26, less than 0.25, less than 0.24, less than 0.23, or less than 0.22.

A ratio of the thickness of the second turbine blades at a 0 percent spanwise position and a blade pitch, $s_2$, of the second turbine stage may be between 0.29 and 0.48. The ratio may be between 0.30 and 0.46, between 0.32 and 0.44, between 0.34 and 0.42, or between 0.36 and 0.40. The ratio may be greater than 0.30, greater than 0.32, greater than 0.34, greater than 0.36, or greater than 0.38. The ratio may be less than 0.46, less than 0.44, less than 0.42, less than 0.40, or less than 0.38.

A sum, $\tau_{tip,2}+\tau_{mid,2}$, of a thickness to chord ratio at the a 100 percent spanwise position of the turbine blade, $\tau_{tip}$ and a thickness to chord ratio a 50 percent spanwise position of the turbine blade, $\tau_{mid}$, may be between 0.24 and 0.38. $\tau_{tip,2}+\tau_{mid,2}$ may be between 0.25 and 0.37, between 0.26 and 0.36, between 0.27 and 0.35, between 0.28 and 0.34, between 0.29 and 0.33, or between 0.30 and 0.32. $\tau_{tip,2}+\tau_{mid,2}$ may be greater than 0.25, greater than 0.26, greater than 0.27, greater than 0.28, greater than 0.29, greater than 0.30, or greater than 0.31. $\tau_{tip,2}+\tau_{mid,2}$ may be less than 0.37, less than 0.36, less than 0.35, less than 0.34, less than 0.33, less than 0.32, less than 0.31, or less than 0.30.

A sum, $\tau_{tip,2}+\tau_{hub,2}$, of a thickness to chord ratio at the a 100 percent spanwise position of the turbine blade, $\tau_{tip}$ and a thickness to chord ratio a 0 percent spanwise position of the turbine blade, $\tau_{hub}$, may be between 0.37 and 0.57. $\tau_{tip,2}+\tau_{hub,2}$ may be between 0.38 and 0.56, between 0.40 and 0.54, between 0.42 and 0.52, between 0.43 and 0.51, between 0.44 and 0.50, or between 0.45 and 0.49. $\tau_{tip,2}+\tau_{hub,2}$ may be greater than 0.39, greater than 0.41, greater than 0.42, greater than 0.43, greater than 0.44, greater than 0.45, or greater than 0.46. $\tau_{tip,2}+\tau_{hub,2}$ may be less than 0.55, less than 0.54, less than 0.53, less than 0.52, less than 0.51, less than 0.50, less than 0.49, or less than 0.48.

A sum, $\tau_{mid,2}+\tau_{hub,2}$, of a thickness to chord ratio at the a 50 percent spanwise position of the turbine blade, $\tau_{mid,2}$ and a thickness to chord ratio a 0 percent spanwise position of the turbine blade, $\tau_{hub,2}$, may be between 0.42 and 0.65. $\tau_{mid,2}+\tau_{hub,2}$ may be between 0.43 and 0.64, between 0.45 and 0.62, between 0.47 and 0.60, between 0.49 and 0.58, between 0.50 and 0.57, or between 0.51 and 0.56. $\tau_{mid,2}+\tau_{hub,2}$ may be greater than 0.44, greater than 0.46, greater than 0.48, greater than 0.50, greater than 0.51, greater than 0.32, or greater than 0.53. $\tau_{mid,2}+\tau_{hub,2}$ may be less than 0.63, less than 0.61, less than 0.59, less than 0.57, less than 0.56, less than 0.55, less than 0.54, or less than 0.53.

A ratio, $\tau_{tip}/\tau_{tip,2}$, of a thickness to chord ratio, $\tau_{tip}$, at a 100 percent spanwise position of the first turbine blade and a thickness to chord ratio, $\tau_{tip,2}$, at a 100 percent spanwise position of the second turbine blade may be between 0.89 and 1.49. The ratio may be between 0.92 and 1.46, between 0.95 and 1.43, between 0.98 and 1.40, between 1.01 and 1.37, between 1.03 and 1.35, between 1.05 and 1.33, between 1.07 and 1.31, between 1.09 and 1.29, or between 1.11 and 1.27. The ratio may be greater than 0.91, greater than 0.93, greater than 0.94, greater than 0.96, greater than 0.97, greater than 0.99, greater than 1.00, greater than 1.02, greater than 1.04, greater than 1.06, greater than 1.08, greater than 1.10, or greater than 1.12. The ratio may be less than 1.47, less than 1.44, less than 1.41, less than 1.38, less than 1.35, less than 1.32, less than 1.29, less than 1.26, less than 1.23, or less than 1.20.

A ratio, $\tau_{mid}/\tau_{mid,2}$, of a thickness to chord ratio, $\tau_{mid}$, at a 50 percent spanwise position of the first turbine blade and a thickness to chord ratio, $\tau_{mid,2}$, at a 50 percent spanwise position of the second turbine blade may be between 0.96 and 1.62. The ratio may be between 0.98 and 1.60, between 1.00 and 1.58, between 1.02 and 1.56, between 1.04 and 1.54, between 1.06 and 1.52, between 1.08 and 1.50, between 1.14 and 1.49, between 1.16 and 1.47, or between 1.18 and 1.45. The ratio may be greater than 0.97, greater than 0.99, greater than 1.01, greater than 1.03, greater than 1.05, greater than 1.07, greater than 1.09, greater than 1.11, greater than 1.13, greater than 1.15, greater than 1.17, greater than 1.19, greater than 1.21, greater than 1.23, or greater than 1.25. The ratio may be less than 1.59, less than 1.56, less than 1.53, less than 1.50, less than 1.47, less than 1.44, less than 1.41, less than 1.38, less than 1.35, less than 1.32, or less than 1.30.

A ratio, $\tau_{hub}/\tau_{hub,2}$, of a thickness to chord ratio, $\tau_{hub}$, at a 0 percent spanwise position of the first turbine blade and a thickness to chord ratio, $\tau_{hub,2}$, at a 0 percent spanwise position of the second turbine blade may be between 0.65 and 1.13. The ratio may be between 0.67 and 1.11, between 0.69 and 1.13, between 0.71 and 1.11, between 0.73 and 1.09, between 0.75 and 1.07, between 0.77 and 1.04, between 0.79 and 1.01, between 0.81 and 0.98, or between 0.83 and 0.96. The ratio may be greater than 0.70, greater than 0.72, greater than 0.74, greater than 0.76, greater than 0.78, greater than 0.80, greater than 0.82, greater than 0.84, greater than 0.86, or greater than 0.88. The ratio may be less than 1.12, less than 1.10, less than 1.08, less than 1.06, less than 1.04, less than 1.02, less than 1.00, less than 0.98, less than 0.96, or less than 0.94.

A sum, $\tau_{tip}+\tau_{tip,2}$, of a thickness to chord ratio, $\tau_{tip}$, at a 100 percent spanwise position of the first turbine blade and a thickness to chord ratio, $\tau_{tip,2}$, at a 100 percent spanwise position of the second turbine blade may be between 0.20 and 0.33. The sum may be between 0.21 and 0.32, between 0.22 and 0.31, between 0.23 and 0.30, between 0.24 and 0.29, or between 0.25 and 0.28. The sum may be greater than 0.22, greater than 0.23, greater than 0.24, greater than 0.25, or greater than 0.26. The sum may be less than 0.32, less than 0.31, less than 0.30, less than 0.29, or less than 0.28.

A sum, $\tau_{mid}+\tau_{mid,2}$, of a thickness to chord ratio, $\tau_{mid}$, at a 50 percent spanwise position of the first turbine blade and a thickness to chord ratio, $\tau_{mid,2}$, at a 50 percent spanwise position of the second turbine blade may be between 0.31 and 0.53. The sum may be between 0.33 and 0.51, between 0.34 and 0.50, between 0.35 and 0.49, between 0.36 and 0.48, or between 0.37 and 0.47. The sum may be greater than 0.32, greater than 0.34, greater than 0.36, greater than 0.38, or greater than 0.40. The sum may be less than 0.49, less than 0.47, less than 0.45, less than 0.43, or less than 0.41.

A sum, $\tau_{hub}+\tau_{hub,2}$, of a thickness to chord ratio, $\tau_{mid}$, at a 0 percent spanwise position of the first turbine blade and a thickness to chord ratio, $\tau_{hub,2}$, at a 0 percent spanwise position of the second turbine blade may be between 0.49 and 0.84. The sum may be between 0.51 and 0.82, between 0.53 and 0.80, between 0.55 and 0.78, between 0.57 and 0.76, between 0.59 and 0.74, between 0.61 and 0.72, or between 0.63 and 0.70. The sum may be greater than 0.50, greater than 0.54, greater than 0.58, greater than 0.62, or greater than 0.66. The sum may be less than 0.81, less than 0.77, less than 0.73, less than 0.69, or less than 0.65.

A ratio, $(\tau_{tip}/s),/(\tau_{tip,2}/s_2)$, of a thickness to blade pitch ratio, $\tau_{tip}/s$, of the first turbine stage at a 100 percent spanwise position of the first turbine blades and a thickness to blade pitch ratio, $\tau_{tip,2}/s_2$, of the second turbine stage at a 100 percent spanwise position of the second turbine blades may be between 0.78 and 1.45. The ratio may be between 0.81 and 1.42, between 0.84 and 1.39, between 0.87 and 1.36, between 0.90 and 1.33, between 0.93 and 1.30, between 0.93 and 1.27, between 0.96 and 1.24, between 0.99 and 1.21, or between 1.02 and 1.18. The ratio may be greater than 0.82, greater than 0.85, greater than 0.88, greater than 0.91, greater than 0.94, greater than 0.97, greater than 1.00, greater than 1.01, greater than 1.02, greater than 1.03, greater than 1.04, greater than 1.05, or greater than 1.06. The ratio may be less than 1.42, less than 1.39, less than 1.36, less than 1.33, 1.31, less than 1.28, less than 1.25, less than 1.22, less than 1.19, less than 1.16, less than 1.13, less than 1.10, less than 1.09, or less than 1.08.

A ratio, $(t_{mid}/s)/(t_{mid,2}/s_2)$, of a thickness to blade pitch ratio, $t_{mid}/s$, of the first turbine stage at a 50 percent spanwise position of the first turbine blades and a thickness to blade pitch ratio, $t_{mid,2}/s_2$, of the second turbine stage at a 50 percent spanwise position of the second turbine blades may be between 0.93 and 1.64. The ratio may be between 0.91 and 1.60, between 0.95 and 1.56, between 0.99 and 1.52, between 1.03 and 1.48, between 1.07 and 1.44, between 1.07 and 1.44, between 1.11 and 1.40, between 1.15 and 1.36, or between 1.19 and 1.34. The ratio may be greater than 0.90, greater than 0.94, greater than 0.98, greater than 1.02, greater than 1.06, greater than 1.10, greater than 1.14, greater than 1.18, greater than 1.22, greater than 1.23, greater than 1.24, greater than 1.25, or greater than 1.26. The ratio may be less than 1.61, less than 1.57, less than 1.53, less than 1.49, less than 1.45, less than 1.41, less than 1.37, less than 1.33, less than 1.29, or less than 1.28.

A ratio, $(t_{hub}/s),/(t_{hub,2}/s_2)$, of a thickness to blade pitch ratio, $t_{hub}/s$, of the first turbine stage at a 0 percent spanwise position of the first turbine blades and a thickness to blade pitch ratio, $t_{hub,2}/s_2$, of the second turbine stage at a 0 percent spanwise position of the second turbine blades may be between 0.60 and 1.10. The ratio may be between 0.62 and 1.08, between 0.59 and 1.05, between 0.62 and 1.02, between 0.65 and 0.99, between 0.68 and 0.96, between 0.71 and 0.93, between 0.74 and 0.91, between 0.77 and 0.89, or between 0.79 and 0.87. The ratio may be greater than 0.61, greater than 0.63, greater than 0.65, greater than 0.67, greater than 0.69, greater than 0.71, greater than 0.73, greater than 0.75, greater than 0.77, greater than 0.79, greater than 0.81, greater than 0.83, or greater than 0.85. The ratio may be less than 1.09, less than 1.07, less than 1.05, less than 1.03, less than 1.01, less than 0.99, less than 0.97, less than 0.95, less than 0.93, less than 0.91, or less than 0.89.

A sum, $(\tau_{tip}/s)+(\tau_{tip,2}/s_2)$, of a thickness to blade pitch ratio, $\tau_{tip}/s$, of the first turbine stage at a 100 percent spanwise position of the first turbine blades and a thickness to blade pitch ratio, $\tau_{tip,2}/s_2$, of the second turbine stage at a 100 percent spanwise position of the second turbine blades may be between 0.23 and 0.40. The sum may be between 0.25 and 0.38, between 0.26 and 0.37, between 0.27 and 0.36, between 0.28 and 0.35, or between 0.29 and 0.34. The sum may be greater than 0.24, greater than 0.25, greater than 0.26, greater than 0.27, greater than 0.28, or greater than 0.29. The sum may be less than 0.39, less than 0.38, less than 0.37, less than 0.36, less than 0.35, less than 0.34, or less than 0.33.

A sum, $(t_{mid}/s)+(t_{mid,2}/s_2)$, of a thickness to blade pitch ratio, $t_{mid}/s$, of the first turbine stage at a 50 percent spanwise position of the first turbine blades and a thickness to blade pitch ratio, $t_{mid,2}/s_2$, of the second turbine stage at a 50 percent spanwise position of the second turbine blades may be between 0.35 and 0.65. The sum may be between 0.37 and 0.63, between 0.39 and 0.61, between 0.41 and 0.59, between 0.43 and 0.57, or between 0.45 and 0.55. The sum may be greater than 0.36, greater than 0.38, greater than 0.40, greater than 0.42, or greater than 0.44. The sum may be less than 0.64, less than 0.62, less than 0.60, less than 0.58, less than 0.56, or less than 0.54.

A sum, $(t_{hub}/s)+(t_{hub,2}/s_2)$, of a thickness to blade pitch ratio, $t_{hub}/s$, of the first turbine stage at a 0 percent spanwise position of the first turbine blades and a thickness to blade pitch ratio, $t_{hub,2}/s_2$, of the second turbine stage at a 0 percent spanwise position of the second turbine blades may be between 0.50 and 0.93. The sum may be between 0.52 and 0.91, between 0.54 and 0.89, between 0.56 and 0.87, between 0.58 and 0.85, between 0.60 and 0.83, between 0.62 and 0.81, between 0.64 and 0.79, or between 0.66 and 0.77. The sum may be greater than 0.53, greater than 0.57, greater than 0.60, greater than 0.63, or greater than 0.66. The sum may be less than 0.92, less than 0.89, less than 0.86, less than 0.83, less than 0.80, or less than 0.77.

A product of a thickness to chord ratio at a 100 percent spanwise position, $\tau_{tip2}$, of the second turbine blades and the blade pitch, $s_2$, of the second turbine stage may be between 2.7 mm and 4.4 mm. The product may be between 2.8 mm and 4.2 mm, between 2.9 mm and 4.1 mm, between 3.0 mm and 4.0 mm, between 3.1 mm and 3.9 mm, between 3.2 mm and 3.8 mm, or between 3.3 mm and 3.7 mm. The product may be greater than 2.8 mm, greater than 2.9 mm, greater than 3.0 mm, greater than 3.1 mm, greater than 3.2 mm, greater than 3.3 mm, greater than 3.4 mm, or greater than 3.5 mm. The product may be less than 4.3 mm, less than 4.2 mm, less than 4.1 mm, less than 4.0 mm, less than 3.9 mm, less than 3.8 mm, less than 3.7 mm, less than 3.6 mm, or less than 3.5 mm.

A product of a thickness to chord ratio at a 50 percent spanwise position, $\tau_{mid2}$, of the second turbine blades and the blade pitch, $s_2$, of the second turbine stage may be between 4.2 mm and 7.0 mm. The product may be between 4.4 mm and 6.8 mm, between 4.6 mm and 6.6 mm, between 4.9 mm and 6.2 mm, between 5.1 mm and 5.9 mm, or between 5.2 mm and 5.8 mm. The product may be greater than 4.3 mm, greater than 4.4 mm, greater than 4.5 mm, greater than 4.6 mm, greater than 4.8 mm, greater than 5.0 mm, greater than 5.2 mm, or greater than 5.3 mm. The product may be less than 6.9 mm, less than 6.8 mm, less than 6.6 mm, less than 6.4 mm, less than 6.2 mm, less than 6.1 mm, less than 6.0 mm, less than 5.9 mm, or less than 5.8 mm.

A product of a thickness to chord ratio at a 0 percent spanwise position, $\tau_{hub2}$, of the second turbine blades and the blade pitch, $s_2$, of the second turbine stage may be between 8.0 mm and 13.1 mm. The product may be between 8.3 mm and 12.8 mm, between 8.6 mm and 12.4 mm, between 8.9 mm and 12.0 mm, between 9.2 mm and 11.5 mm, between 9.2 mm and 11.3 mm, or between 9.5 mm and 11.0 mm. The product may be greater than 8.2 mm, greater than 8.4 mm, greater than 8.6 mm, greater than 8.8 mm, greater than 9.0 mm, greater than 9.4 mm, greater than 9.6 mm, or greater than 9.8 mm. The product may be less than 12.9 mm, less than 12.7 mm, less than 12.5 mm, less than 12.3 mm, less than 12.1 mm, less than 11.9 mm, less than 11.7 mm, less than 11.4 mm, or less than 11.1 mm.

A ratio, $\sigma_{tip}/\sigma_{tip,2}$, of a solidity, $\sigma_{tip}$, of a first turbine blade of the first turbine stage at a 100 percent spanwise position and a solidity, $\sigma_{tip,2}$, of a second turbine blade of second turbine stage at a 100 percent spanwise position may be between 0.71 and 1.22. The ratio may be between 0.73 and 1.20, between 0.75 and 1.18, between 0.77 and 1.16, between 0.79 and 1.14, between 0.81 and 1.12, between 0.83 and 1.10, between 0.85 and 1.08, between 0.87 and 1.06, or between 0.87 and 1.04. The ratio may be greater than 0.72, greater than 0.74, greater than 0.76, greater than 0.78, greater than 0.80, greater than 0.82, greater than 0.84, greater than 0.86, greater than 0.88, greater than 0.90, greater than 0.92, or greater than 0.94. The ratio may be less than 1.21, less than 1.18, less than 1.15, less than 1.12, less than 1.09, less than 1.06, less than 1.03, less than 1.00, or less than 0.97.

A ratio, $\sigma_{mid}/\sigma_{mid,2}$, of a solidity, $\sigma_{mid}$, of a first turbine blade of the first turbine stage at a 50 percent spanwise position and a solidity, $\sigma_{mid,2}$, of a second turbine blade of second turbine stage at a 50 percent spanwise position may be between 0.73 and 1.27. The ratio may be between 0.75 and 1.25, between 0.77 and 1.22, between 0.79 and 1.18, between 0.81 and 1.15, between 0.83 and 1.12, between 0.85 and 1.09, between 0.87 and 1.06, or between 0.87 and 1.04. The ratio may be greater than 0.74, greater than 0.76, greater than 0.78, greater than 0.80, greater than 0.82, greater than 0.84, greater than 0.86, greater than 0.88, greater than 0.90, greater than 0.92, greater than 0.94, or greater than 0.96. The ratio may be less than 1.24, less than 1.21, less than 1.18, less than 1.15, less than 1.12, less than 1.09, less than 1.06, less than 1.03, or less than 1.02.

A ratio, $\sigma_{hub}/\sigma_{hub,2}$, of a solidity, $\sigma_{hub}$, of a first turbine blade of the first turbine stage at a 0 percent spanwise position and a solidity, $\sigma_{hub,2}$, of a second turbine blade of second turbine stage at a 0 percent spanwise position may be between 0.68 and 1.23. The ratio may be between 0.70 and 1.20, between 0.72 and 1.18, between 0.74 and 1.16, between 0.76 and 1.14, between 0.81 and 1.12, between 0.83 and 1.10, between 0.85 and 1.08, between 0.87 and 1.06, between 0.87 and 1.04, between 0.89 and 1.02, or between 0.91 and 1.00. The ratio may be greater than 0.69, greater than 0.72, greater than 0.75, greater than 0.78, greater than 0.81, greater than 0.84, greater than 0.87, greater than 0.90, or greater than 0.93. The ratio may be less than 1.21, less than 1.18, less than 1.15, less than 1.12, less than 1.09, less than 1.06, less than 1.03, less than 1.00, or less than 0.99.

At cruise conditions, the second loading parameter, $\lambda_2$, may be between 1.00 and 1.30. The second loading parameter, $\lambda_2$, may be between 1.05 and 1.25, between 1.10 and 1.20, or between 1.12 and 1.18. The second loading parameter, $\lambda_2$, may be greater than 1.02, greater than 1.04, greater than 1.06, greater than 1.08, greater than 1.10, greater than 1.12, greater than 1.14, greater than 1.16, greater than 1.18, greater than 1.20, greater than 1.22, greater than 1.24, or greater than 1.26. The second loading parameter, $\lambda_2$, may be less than 1.28, less than 1.26, less than 1.24, less than 1.22, less than 1.20, less than 1.18, less than 1.14, less than 1.12, less than 1.10, less than 1.08, or less than 1.06.

At cruise conditions, the second speed parameter, $\mu_2$, may be between 12.0 $ms^{-1}K^{-0.5}$ and 13.5 $ms^{-1}K^{-0.5}$. The second speed parameter, $\mu_2$, may be between 12.2 $ms^{-1}K^{-0.5}$ and 13.3 $ms^{-1}K^{-0.5}$, between 12.4 $ms^{-1}K^{-0.5}$ and 13.1 $ms^{-1}K^{-0.5}$, or between 12.5 $ms^{-1}K^{-0.5}$ and 13.0 $ms^{-1}K^{-0.5}$. $\mu_2$ may be greater than 12.1 $ms^{-1}K^{-0.5}$, greater than 12.3 $ms^{-1}$ $K^{-0.5}$, or greater than 12.6 $ms^{-1}K^{-0.5}$. $\mu_2$ may be less than 13.4 $ms^{-1}K^{-0.5}$, less than 13.2 $ms^{-1}K^{-0.5}$, or less than 12.9 $ms^{-1}K^{-0.5}$.

At cruise conditions, a ratio of $\mu_2$ and $\lambda_2$, $\mu_2/\lambda_2$, may be between 9.2 $ms^{-1}K^{-0.5}$ and 12.9 $ms^{-1}K^{-0.5}$. The ratio may be between 9.5 $ms^{-1}K^{-0.5}$ and 12.6 $ms^{-1}K^{-0.5}$, between 9.8 $ms^{-1}K^{-0.5}$ and 12.3 $ms^{-1}K^{-0.5}$, between 10.1 $ms^{-1}K^{-0.5}$ and 12.0 $ms^{-1}K^{-0.5}$, between 10.4 $ms^{-1}K^{-0.5}$ and 11.7 $ms^{-1}K^{-0.5}$, or between 10.7 $ms^{-1}K^{-0.5}$ and 11.4 $ms^{-1}K^{-0.5}$. The ratio may be greater than 9.4 $ms^{-1}K^{-0.5}$, greater than 9.7 $ms^{-1}K^{-0.5}$, greater than 10.0 $ms^{-1}K^{-0.5}$, greater than 10.3 $ms^{-1}K^{-0.5}$, greater than 10.6 $ms^{-1}K^{-0.5}$, greater than 10.9 $ms^{-1}K^{-0.5}$, or greater than 11.2 $ms^{-1}K^{-0.5}$. The ratio may be less than 12.7 $ms^{-1}K^{-0.5}$, less than 12.4 $ms^{-1}K^{-0.5}$, less than 12.1 $ms^{-1}K^{-0.5}$, less than 11.8 $ms^{-1}K^{-0.5}$, less than 11.5 $ms^{-1}K^{-0.5}$, less than 11.2 $ms^{-1}K^{-0.5}$, or less than 10.9 $ms^{-1}K^{-0.5}$.

At cruise conditions, a product of $\lambda_2$ and a thickness to chord ratio at a 100 percent spanwise position of the turbine blade, $\tau_{tip,2}$, may be between 0.10 and 0.19. The product of $\lambda_2$ and $\tau_{tip,2}$ may be between 0.11 and 0.18, between 0.12 and 0.17, between 0.13 and 0.16, or between 0.14 and 0.15. The product of $\lambda_2$ and $\tau_{tip,2}$ may be greater than 0.11, greater than 0.11, greater than 0.12, greater than 0.13, greater than 0.14, greater than 0.15, or greater than 0.16. The product of $\lambda_2$ and $\tau_{tip,2}$ may be less than 0.17, less than 0.16, less than 0.15, less than 0.14, less than 0.13, or less than 0.12.

At cruise conditions, a product of $\lambda_2$ and a thickness to chord ratio at a 50 percent spanwise position of the turbine blade, $\tau_{mid,2}$, may be between 0.15 and 0.30. The product of $\lambda_2$ and $\tau_{mid,2}$ may be between 0.16 and 0.29, between 0.17 and 0.28, between 0.18 and 0.27, or between 0.19 and 0.25. The product of $\lambda_2$ and $\tau_{mid,2}$ may be greater than 0.17, greater than 0.18, greater than 0.19, greater than 0.20, greater than 0.21, greater than 0.22, or greater than 0.23. The product of $\lambda_2$ and $\tau_{mid,2}$ may be less than 0.29, less than 0.28, less than 0.27, less than 0.26, less than 0.25, or less than 0.24.

At cruise conditions, a product of $\lambda_2$ and a thickness to chord ratio at a 0 percent spanwise position of the turbine blade, $\tau_{hub,2}$, may be between 0.28 and 0.55. The product of $\lambda_2$ and $\tau_{hub,2}$ may be between 0.29 and 0.54, between 0.30 and 0.52, between 0.32 and 0.50, or between 0.33 and 0.49. The product of $\lambda_2$ and $\tau_{hub,2}$ may be greater than 0.30, greater than 0.31, greater than 0.32, greater than 0.33, greater than 0.34, greater than 0.35, or greater than 0.36. The product of $\lambda_2$ and $\tau_{hub,2}$ may be less than 0.53, less than 0.52, less than 0.50, less than 0.48, less than 0.16, or less than 0.45.

At cruise conditions, a product of $\lambda_2$ and the blade pitch, $s_2$, of the second turbine stage may be between 23 mm and 49 mm. The product of $\lambda_2$ and $s_2$ may be between 25 mm and 47 mm, between 26 mm and 45 mm, between 27 mm and 43 mm, between 28 mm and 42 mm, or between 25 mm and 40 mm. The product of $\lambda_2$ and $s_2$ may be greater than 24 mm, greater than 25 mm, greater than 26 mm, greater than 28 mm, greater than 30 mm, greater than 32 mm, greater than 34 mm, greater than 36 mm, greater than 38 mm, greater than 40 mm, or greater than 42 mm. The product of $\lambda_2$ and $s_2$ may be less than 48 mm, less than 47 mm, less than 46 mm, less than 45 mm, less than 43 mm, less than 41 mm, less than 39 mm, less than 37 mm, less than 35 mm, less than 33 mm, or less than 31 mm.

At cruise conditions, a ratio, $\lambda/\lambda_2$, may be between 1.0 and 1.8. The ratio may be between 1.1 and 1.7, between 1.2 and 1.6, or between 1.3 and 1.5. The ratio may be greater than 1.1, greater than 1.2, greater than 1.3, greater than 1.4, greater than 1.5, greater than 1.6, or greater than 1.7. The ratio may be less than 1.7, less than 1.6, less than 1.5, or less than 1.4.

At cruise conditions, the first turbine blade may have an angle of attack, $\alpha_{1,mid}$, between 10 degrees and 58 degrees measured at a 50 percent spanwise position of the first turbine blade, and the second turbine blade may have an angle of attack, $\alpha_{2,mid}$, between −10 degrees and 40 degrees measured at a 50 percent spanwise position of the second turbine blade.

$\alpha_{1,mid}$ may be between 12 degrees and 56 degrees, between 15 degrees and 53 degrees, between 20 degrees and 48 degrees, between 25 degrees and 43 degrees, or between 30 degrees and 38 degrees. $\alpha_{1,mid}$ may be greater than 11 degrees, greater than 13 degrees, greater than 15 degrees, greater than 17 degrees, greater than 19 degrees, greater than 21 degrees, greater than 23 degrees, greater than 25 degrees, greater than 27 degrees, greater than 29 degrees, greater than 31 degrees, greater than 33 degrees, greater than 35 degrees, or greater than 37 degrees. $\alpha_{1,mid}$ may be less than 56 degrees, less than 54 degrees, less than 52 degrees, less than 50 degrees, less than 49 degrees, less than 47 degrees, less than 45 degrees, less than 43 degrees, less than 41 degrees, less than 39 degrees, less than 37 degrees, less than 35 degrees, less than 33 degrees, less than 31 degrees, less than 29 degrees, less than 27 degrees, less than 25 degrees, or less than 23 degrees.

$\alpha_{2,mid}$ may be between −5 degrees and 35 degrees, between 0 degrees and 30 degrees, between 5 degrees and 25 degrees, or between 10 and 20 degrees. $\alpha_{2,mid}$ may be greater than −9 degrees, greater than −8 degrees, greater than −7 degrees, greater than −6 degrees, greater than −5 degrees, greater than-4 degrees, greater than −3 degrees, greater than −2 degrees, greater than −1 degrees, greater than 0 degrees, greater than 1 degree, greater than 2 degrees, greater than 3 degrees, or greater than 4 degrees. $\alpha_{2,mid}$ may be less than 38 degrees, less than 36 degrees, less than 34 degrees, less than 32 degrees, less than 30 degrees, less than 28 degrees, less than 26 degrees, less than 24 degrees, less than 22 degrees, less than 20 degrees, less than 19 degrees, less than 18 degrees, less than 17 degrees, less than 16 degrees, less than 15 degrees, less than 14 degrees, less than 13 degrees, less than 12 degrees, or less than 11 degrees.

A ratio, $\alpha_{2,mid}/\alpha_{1,mid}$, of $\alpha_{2,mid}$ and $\alpha_{1,mid}$ may be between 0.22 and 0.92 when measured at cruise conditions. The ratio may be between 0.25 and 0.89, between 0.28 and 0.86, between 0.31 and 0.83, between 0.35 and 0.80, between 0.40 and 0.75, between 0.50 and 0.70, between 0.52 and 0.68, between 0.54 and 0.66, or between 0.56 and 0.54. The ratio may be greater than 0.24, greater than 0.26, greater than 0.28, greater than 0.30, greater than 0.32, greater than 0.34, greater than 0.36, greater than 0.38, greater than 0.40, greater than 0.42, greater than 0.44, greater than 0.46, greater than 0.48, greater than 0.50, greater than 0.52, greater than 0.54, greater than 0.56, or greater than 0.58. The ratio may be less than 0.90, less than 0.88, less than 0.86, less than 0.84, less than 0.82, less than 0.80, less than 0.78, less than 0.76, less than 0.74, less than 0.72, less than 0.70, less than 0.68, less than 0.66, less than 0.64, less than 0.62, less than 0.60, or less than 0.58.

A ratio, $\alpha_{1,mid}/\alpha_{2,mid}$, of $\alpha_{1,mid}$ $\alpha_{2,mid}$ may be between −1.04 and 4.50 when measured at cruise conditions. The ratio may be between −0.90 and 4.0, between −0.75 and 3.5, between −0.50 and 3.00, between 0.25 and 3.75, between 0.0 and 3.50, or between 0.25 and 2.75. The ratio may be greater than 0.4, greater than 0.5, greater than 0.6, greater than 0.7, greater than 0.8, greater than 0.9, greater than 1.0, greater than 1.1, greater than 1.2, greater than 1.3, greater than 1.4, greater than 1.5, or greater than 1.6. The ratio may be less than 1.6, less than 1.5, less than 1.4, less than 1.3, less than 1.2, less than 1.1, less than 1.0, less than 0.9, less than 0.8, less than 0.7, less than 0.6, less than 0.5, or less than 0.4.

The thickness of the second turbine blade at the 100 percent spanwise position may be greater than 3.2 mm. The thickness of the turbine blade at the 100 percent spanwise position may be less than 6.0 mm. The thickness of the turbine blade at the 100 percent spanwise position may be between 3.3 and 5.9 mm, between 3.5 and 5.8 mm, between 3.7 and 5.6 mm, or between 3.9 and 5.4 mm.

The thickness of the second turbine blade at the 50 percent spanwise position may be greater than 4.6 mm. The thickness of the turbine blade at the 50 percent spanwise position may be less than 8.4 mm. The thickness of the turbine blade at the 50 percent spanwise position may be between 4.8 and 8.2 mm, between 5.1 and 7.9 mm, between 5.3 and 7.7 mm, or between 5.6 and 7.4 mm.

The thickness of the second turbine blade at the 0 percent spanwise position may be greater than 8.5 mm. The thickness of the turbine blade at the 0 percent spanwise position may be less than 14.4 mm. The thickness of the turbine blade at the 0 percent spanwise position may be between 8.9 and 13.7 mm, between 9.3 and 13.3 mm, between 9.7 and 13.1 mm, or between 9.9 and 13.0 mm.

The chord length of the second turbine blade at the 100 percent spanwise position may be greater than 25 mm. The chord length of the turbine blade at the 100 percent spanwise position may be less than 50 mm. The chord length of the turbine blade at the 100 percent spanwise position may be between 28 and 47 mm, between 30 and 45 mm, between 32 and 43 mm, between 33 and 42 mm, or between 34 and 41 mm.

The chord length of the second turbine blade at the 50 percent spanwise position may be greater than 24 mm. The chord length of the turbine blade at the 50 percent spanwise position may be less than 46 mm. The chord length of the turbine blade at the 50 percent spanwise position may be between 26 and 44 mm, between 28 and 42 mm, between 30 and 40 mm, between 31 and 39 mm, or between 32 and 38 mm.

The chord length of the second turbine blade at the 0 percent spanwise position may be greater than 22 mm. The chord length of the turbine blade at the 0 percent spanwise position may be less than 43 mm. The chord length of the turbine blade at the 0 percent spanwise position may be between 24 and 41 mm, between 26 and 39 mm, between 28 and 37 mm, between 29 and 36 mm, or between 30 and 35 mm.

The mean radius of the turbine blade may be between 185 mm and 320 mm. The mean radius may be between 190 mm and 315 mm, between 195 mm and 310 mm, between 205 mm and 300 mm, between 215 mm and 290 mm, between 220 mm and 280 mm, or between 230 mm and 270 mm The mean radius may be greater than 190 mm, greater than 195 mm, greater than 200 mm, greater than 205 mm, greater than 210 mm, greater than 215 mm, greater than 220 mm, greater than 225 mm, greater than 230 mm, greater than 235 mm, greater than 240 mm, greater than 245 mm, or greater than 250 mm. The mean radius may be less than 315 mm, less than 310 mm, less than 305 mm, less than 300 mm, less than 295 mm, less than 290 mm, less than 285 mm, less than 280 mm, less than 275 mm, greater than 270 mm, less than 265 mm, less than 260 mm, or less than 255 mm.

The number of turbine blades, $N_{T2}$, of the second turbine stage may be between 39 and 70. $N_{T2}$ may be between 41 and 68, between 43 and 66, between 44 and 64, between 45 and 63, between 46 and 62, or between 47 and 62. $N_{T2}$ may be greater than 40, greater than 42, greater than 44, greater than 46, greater than 48, greater than 50, or greater than 52. $N_{T2}$ may be less than 64, less than 62, less than 60, less than 58, less than 56, less than 54, or less than 52.

The (or each) second turbine blade of the second turbine stage may extend spanwise from an inner radius to an outer radius. A radial distance from the engine axis of rotation to the inner radius of the second turbine blade may be equal to a second turbine hub radius, $R_{HT2}$. A radial distance from engine axis of rotation to the outer radius of the second turbine blade may be equal to a second turbine tip radius, $R_{T2}$. The second turbine stage may be a most axially downstream turbine stage of the high pressure turbine.

The (or each) second turbine blade of the second turbine stage may have a second blade height, $h_2$, defined as the difference between the second turbine tip radius, $R_{T2}$ and the second turbine hub radius, $R_{HT2}$. In other words, $h_2$ is equal to $R_{T2}-R_{HT2}$.

The (or each) second turbine blade of the second turbine stage may have a second aspect ratio, $AR_2$, defined as the ratio of the second blade height, $h_2$, and the chord length at a 100 percent spanwise position of the second turbine blade.

The aspect ratio, $AR_2$, of the second turbine blade, equal to the second blade height, $h_2$, divided by the second chord length at a 100 percent spanwise position of the second turbine blade, may be between 1.17 and 2.21. The second aspect ratio may be between 1.19 and 2.19, between 1.21 and 2.17, between 1.23 and 2.15, between 1.25 and 2.13, between 1.28 and 2.10, between 1.30 and 2.08, between 1.30 and 2.06, between 1.32 and 2.04, between 1.34 and 2.02, between 1.36 and 2.00, between 1.38 and 1.98, between 1.42 and 1.96, between 1.46 and 1.94, between 1.48 and 1.92, between 1.50 and 1.90, between 1.52 and 1.88, between 1.54 and 1.86, between 1.54 and 1.84, between 1.56 and 1.82, between 1.58 and 1.80, or between 1.60 and 1.78. The second aspect ratio may be greater than 1.27, greater than 1.31, greater than 1.35, greater than 1.39, greater than 1.43, greater than 1.47, greater than 1.51, greater than 1.55, greater than 1.59, greater than 1.63, or greater than 1.67. The second aspect ratio may be less than 2.11, less than 2.07, less than 2.03, less than 1.99, less than 1.95, less than 1.91, less than 1.87, less than 1.83, less than 1.79, less than 1.75, or less than 1.71.

A ratio of the first aspect ratio and the second aspect ratio, $AR_1/AR_2$, may be between 0.40 and 0.79. The ratio may be between 0.41 and 0.77, between 0.43 and 0.75, between 0.45 and 0.73, between 0.47 and 0.71, between 0.49 and 0.69, between 0.51 and 0.67, between 0.53 and 0.65, between 0.55 and 0.63, or between 0.57 and 0.61. The ratio may be greater than 0.44, greater than 0.46, greater than 0.48, greater than 0.50, greater than 0.52, greater than 0.54, greater than 0.56, or greater than 0.58. The ratio may be less than 0.74, less than 0.72, less than 0.70, less than 0.68, less than 0.66, less than 0.64, less than 0.62, or less than 0.60.

A sum of the first aspect ratio and the second aspect ratio, $AR_1+AR_2$, may be between 1.8 and 3.5 The sum may be between 1.9 and 3.4, between 2.1 and 3.3, between 2.2 and 3.2, between 2.3 and 3.1 between 2.4 and 3.0, between 2.5 and 2.9, or between 2.6 and 2.8. The sum may be greater than 2.1, greater than 2.2, greater than 2.3, greater than 2.4, greater than 2.5, greater than 2.6, or greater than 2.7. The sum may be less than 3.3, less than 3.2, less than 3.1, less than 3.0, less than 2.9, less than 2.8, or less than 2.7.

A second turbine hub-to-tip ratio, $R_{HT2}/R_{T2}$, of the second turbine stage may be between 0.45 and 0.85. $R_{HT2}/R_{T2}$ may be between 0.50 and 0.84, between 0.60 and 0.83, between 0.65 and 0.82, or between 0.70 and 0.81. $R_{HT2}/R_{T2}$ may be greater than 0.50, greater than 0.55, greater than 0.60, greater than 0.65, greater than 0.70, greater than 0.75, or greater than 0.77. $R_{HT2}/R_{T2}$ may be less than 0.84, less than 0.83, less than 0.82, less than 0.81, less than 0.80, or less than 0.79.

The turbine stage may comprise a second set of stator vanes, and a second plurality of turbine blades downstream of the second set of stator vanes. The second turbine stage may comprise a second set of NGVs and a second plurality of turbine blades downstream of the second set of NGVs.

A ratio, $\varepsilon_2$, of a cooling mass flow for cooling the second plurality of turbine blades and the throat mass flow of the first set of NGVs may be between 0.010 and 0.025 at cruise conditions. The cooling mass flow may be bleed air bled from the compressor. $\varepsilon_2$ may be between 0.011 and 0.024, between 0.012 and 0.023, between 0.013 and 0.022, between 0.014 and 0.021, between 0.015 and 0.020, or between 0.016 and 0.019. $\varepsilon_2$ may be greater than 0.011, greater than 0.012, greater than 0.013, greater than 0.014, greater than 0.015, greater than 0.016, greater than 0.017, greater than 0.018, greater than 0.019, or greater than 0.020. $\varepsilon_2$ may be less than 0.024, less than 0.023, less than 0.022, less than 0.021, less than 0.020, less than 0.019, less than 0.018, less than 0.017, less than 0.016, or less than 0.015.

A ratio, $\nu_2$, of a cooling mass flow for cooling the second set of NGVs and the throat mass flow of the first set of NGVs may be between 0.015 and 0.030 at cruise conditions. The cooling mass flow may be bleed air bled from the compressor. $\nu_2$ may be between 0.018 and 0.027, between 0.020 and 0.025, or between 0.021 and 0.024. $\nu_2$ may be greater than 0.016, greater than 0.017, greater than 0.018, greater than 0.019, greater than 0.020, greater than 0.021, greater than 0.022, greater than 0.023, greater than 0.024, or greater than 0.025. $\nu_2$ may be less than 0.029, less than 0.028, less than 0.027, less than 0.026, less than 0.025, or less than 0.024.

In other embodiments, the high pressure turbine is a single-stage high pressure turbine.

In a second group of embodiments in accordance with the above general aspects, a maximum static thrust of the geared gas turbine engine may be greater than 220 kN. For example, the geared gas turbine engine may be configured to produce up to 245 kN of static thrust, up to 265 kN of static thrust, up to 290 kN of static thrust, up to 310 kN of static thrust, up to 335 kN of static thrust, up to 355 kN of static thrust, or greater than 355 kN of static thrust.

A speed of rotation of the high pressure turbine at cruise conditions may be between 11000 rpm and 18500 rpm. The speed of rotation of the high pressure turbine at cruise conditions may be between 11500 rpm and 18000 rpm, 12000 rpm and 17500 rpm, between 12500 rpm and 17000 rpm, between 13000 rpm and 16500 rpm, between 13500 rpm and 16000 rpm, between 14000 rpm and 15500 rpm, or between 14500 rpm and 15000 rpm. In another example, the speed of rotation of the high pressure turbine at cruise conditions may be lower, for example between 10000 rpm and 17500 rpm. The speed of rotation of the high pressure turbine at cruise conditions may be between 10500 rpm and 17000 rpm, between 11000 rpm and 16750 rpm, between 11500 rpm and 16500 rpm, between 12000 rpm and 16000 rpm, between 12500 rpm and 15500 rpm, between 12750 rpm and 15250 rpm, or between 13000 rpm and 15000 rpm.

The turbine blade may have a thickness to chord ratio at a 100 percent spanwise position, $\tau_{tip}$, of between 0.20 and 0.34. $\tau_{tip}$ may be between 0.22 and 0.32, between 0.23 and 0.31, between 0.24 and 0.30, or between 0.25 and 0.29.

The turbine blade may have a thickness to chord ratio at a 50 percent spanwise position, $\tau_{mid}$, of between 0.28 and 0.46. $\tau_{mid}$ may be between 0.30 and 0.44, between 0.31 and 0.43, between 0.32 and 0.42, between 0.33 and 0.41, or between 0.34 and 0.40

The turbine blade may have a thickness to chord ratio at a 0 percent spanwise position, $\tau_{hub}$, of between 0.36 and 0.60. $\tau_{hub}$ may be between 0.38 and 0.58, between 0.36 and 0.56, between 0.38 and 0.54, between 0.40 and 0.52, or between 0.42 and 0.48.

A ratio of the thickness of the turbine blades at a 100 percent spanwise position and the blade pitch, s, of the turbine stage may be between 0.24 and 0.42. The ratio may be between 0.26 and 0.40, between 0.28 and 0.38, between 0.30 and 0.36, or between 0.31 and 0.35.

A ratio of the thickness of the turbine blades at a 50 percent spanwise position and the blade pitch, s, of the turbine stage may be between 0.29 and 0.50. The ratio may be between 0.31 and 0.48, between 0.33 and 0.46, between 0.35 and 0.44, between 0.37 and 0.42, or between 0.38 and 0.41.

A ratio of the thickness of the turbine blades at a 0 percent spanwise position and the blade pitch, s, of the turbine stage may be between 0.32 and 0.58. The ratio may be between 0.34 and 0.56, between 0.36 and 0.54, between 0.38 and 0.52, between 0.40 and 0.50, or between 0.42 and 0.48.

A sum, $\tau_{tip}+\tau_{mid}$, of a thickness to chord ratio at the a 100 percent spanwise position of the turbine blade, $\tau_{tip}$ and a thickness to chord ratio a 50 percent spanwise position of the turbine blade, $\tau_{mid}$, may be between 0.50 and 0.78. $\tau_{tip}+\tau_{mid}$ may be between 0.52 and 0.76, between 0.54 and 0.74, between 0.56 and 0.72, between 0.58 and 0.70, or between 0.60 and 0.68.

A sum, $\tau_{tip}+\tau_{hub}$, of a thickness to chord ratio at the a 100 percent spanwise position of the turbine blade, $\tau_{tip}$ and a thickness to chord ratio a 0 percent spanwise position of the turbine blade, $\tau_{hub}$, may be between 0.58 and 0.93. $\tau_{tip}+\tau_{hub}$ may be between 0.60 and 0.91, between 0.62 and 0.89, between 0.64 and 0.87, between 0.66 and 0.85, or between 0.68 and 0.83.

A sum, $\tau_{mid}+\tau_{hub}$, of a thickness to chord ratio at the a 50 percent spanwise position of the turbine blade, $\tau_{mid}$ and a thickness to chord ratio a 0 percent spanwise position of the turbine blade, $\tau_{hub}$, may be between 0.67 and 1.02. $\tau_{mid}+\tau_{hub}$ may be between 0.70 and 0.99, between 0.72 and 0.97, between 0.74 and 0.95, between 0.71 and 0.92, or between 0.75 and 0.89.

A product of a thickness to chord ratio at a 100 percent spanwise position, $\tau_{tip}$, of the turbine blades and the blade pitch, s, of the turbine stage may be between 8.6 mm and 15.4 mm. The product of $\tau_{tip}$ and s may be between 8.9 mm and 15.2 mm, between 9.2 mm and 514.9 mm, between 9.5 mm and 14.6 mm, between 9.8 mm and 14.3 mm, between 10.1 mm and 14.0 mm, or between 10.4 mm and 13.7 mm.

A product of a thickness to chord ratio at a 50 percent spanwise position, $\tau_{mid}$, of the turbine blades and the blade pitch, s, of the turbine stage may be between 10.9 mm and 22.4 mm. The product of $\tau_{mid}$ and s may be between 11.4 mm and 21.9 mm, between 11.9 mm and 21.4 mm, between 12.4 mm and 20.9 mm, between 12.9 mm and 20.4 mm, between 13.4 mm and 19.9 mm, or between 13.9 mm and 19.5 mm.

A product of a thickness to chord ratio at a 0 percent spanwise position, $\tau_{hub}$, of the turbine blades and the blade pitch, s, of the turbine stage may be between 15.4 mm and 26.4 mm. The product of $\tau_{hub}$ and s may be between 16.4 mm and 25.4 mm, between 17.4 mm and 24.4 mm, between 17.9 mm and 23.9 mm, between 18.4 and 23.4 mm, between 18.9 mm and 22.9 mm, between 19.4 and 22.4 mm, or between 19.9 mm and 21.9 mm.

At cruise conditions, the loading parameter, λ, may be between 1.30 and 1.80, and the speed parameter, μ, may be between 10.7 $ms^{-1}K^{-0.5}$ and 12.0 $ms^{-1}K^{-0.5}$.

The loading parameter, λ, may be between 1.35 and 1.75, between 1.40 and 1.70, or between 1.45 and 1.55.

The speed parameter, μ, may be between 11.0 $ms^{-1}K^{-0.5}$ and 12.0 $ms^{-1}K^{-0.5}$, between 11.3 $ms^{-1}K^{-0.5}$ and 12.0 $ms^{-1}K^{-0.5}$, between 11.5 $ms^{-1}K^{-0.5}$ and 12.0 $ms^{-1}K^{-0.5}$, or between 11.7 $ms^{-1}K^{-0.5}$ and 12.0 $ms^{-1}K^{-0.5}$.

At cruise conditions, a product of λ and a thickness to chord ratio at a 100 percent spanwise position of the turbine blade, $\tau_{tip}$, may be between 0.27 and 0.60. The product of λ and $\tau_{tip}$ may be between 0.29 and 0.58, between 0.31 and 0.56, between 0.33 and 0.54, between 0.35 and 0.52, between 0.37 and 0.50, or between 0.39 and 0.48.

At cruise conditions, a product of λ and a thickness to chord ratio at a 50 percent spanwise position of the turbine blade, $\tau_{mid}$, may be between 0.36 and 0.82. The product of λ and $\tau_{mid}$ may be between 0.39 and 0.79, between 0.42 and 0.76, between 0.45 and 0.73, between 0.48 and 0.70, or between 0.51 and 0.67.

At cruise conditions, a product of λ and a thickness to chord ratio at a 0 percent spanwise position of the turbine blade, $\tau_{hub}$, may be between 0.47 and 1.08. The product of λ and $\tau_{hub}$ may be between 0.50 and 1.05, between 0.53 and 1.02, between 0.56 and 0.99, between 0.59 and 0.96, between 0.62 and 0.93, between 0.65 and 0.90, between 0.68 and 0.87, between 0.71 and 0.84, or between 0.74 and 0.81.

At cruise conditions, a product of λ and the blade pitch, s, of the turbine stage may be between 43 mm and 100 mm. The product of λ and s may between 48 mm and 95 mm, between 53 mm and 90 mm, between 58 mm and 85 mm, between 63 mm and 80 mm, or between 68 mm and 75 mm.

At cruise conditions, a ratio of μ and λ, μ/λ, may be between 6.1 $ms^{-1}K^{-0.5}$ and 9.3 $ms^{-1}K^{-0.5}$. The ratio μ/λ may be between 6.4 and 8.9 $ms^{-1}K^{-0.5}$, between 6.7 and 8.5 $ms^{-1}K^{-0.55}$, or between 6.5 and 8.3 $ms^{-1}K^{-0.5}$.

At cruise conditions, a ratio of the blade pitch, s, and μ, s/μ, may be between 2.7 $msK^{0.5}$ and 5.2 $msK^{0.5}$. (Note that in this case, "m" is the prefix "milli", so the unit $msK^{0.5}$ is milli-$sK^{0.5}$, in other words $10^{-3}$ $sK^{0.5}$.) The ratio may be between 2.9 $msK^{0.5}$ and 5.0 $msK^{0.5}$, between 3.3 $msK^{0.5}$ and 4.6 $msK^{0.5}$, or between 3.6 $msK^{0.5}$ and 4.3 $msK^{0.5}$.

The thickness of the turbine blade at the 100 percent spanwise position may be greater than 10.8 mm. The thickness of the turbine blade at the 100 percent spanwise position may be less than 18.2 mm. The thickness of the turbine blade at the 100 percent spanwise position may be between 11.8 and 17.2 mm, between 12.8 and 16.2 mm, between 13.8 and 16.2 mm, or between 14.3 and 15.7 mm.

The thickness of the turbine blade at the 50 percent spanwise position may be greater than 11.6 mm. The thickness of the turbine blade at the 50 percent spanwise position may be less than 23.8 mm. The thickness of the turbine blade at the 50 percent spanwise position may be between 12.6 and 22.8 mm, between 13.6 and 21.8 mm, between 14.6 and 20.8 mm, or between 15.6 and 19.8 mm.

The thickness of the turbine blade at the 0 percent spanwise position may be greater than 13.9 mm. The thickness of the turbine blade at the 0 percent spanwise position may be less than 24.8 mm. The thickness of the turbine blade at the 0 percent spanwise position may be between 14.9 and 23.8 mm, between 15.9 and 22.8 mm, between 16.9 and 21.8 mm, between 17.9 and 20.8 mm, or between 18.9 and 19.8 mm.

The chord length of the turbine blade at the 100 percent spanwise position may be greater than 40 mm. The chord length of the turbine blade at the 100 percent spanwise position may be less than 68 mm. The chord length of the turbine blade at the 100 percent spanwise position may be between 42 and 66 mm, between 44 and 64 mm, between 46 and 62 mm, between 48 and 60 mm, or between 50 and 58 mm.

The chord length of the turbine blade at the 50 percent spanwise position may be greater than 32 mm. The chord length of the turbine blade at the 50 percent spanwise position may be less than 62 mm. The chord length of the turbine blade at the 50 percent spanwise position may be between 35 and 59 mm, between 38 and 56 mm, between 41 and 53 mm, between 43 and 51 mm, or between 44 and 50 mm.

The chord length of the turbine blade at the 0 percent spanwise position may be greater than 30 mm. The chord length of the turbine blade at the 0 percent spanwise position may be less than 52 mm. The chord length of the turbine blade at the 0 percent spanwise position may be between 32 and 50 mm, between 34 and 48 mm, between 36 and 46 mm, between 37 and 45 mm, or between 38 and 44 mm.

The mean radius of the turbine blade may be between 265 mm and 4445 mm. The mean radius may be between 280 mm and 430 mm, between 295 mm and 415 mm, between 310 mm and 400 mm, between 320 mm and 390 mm, between 330 mm and 380 mm, or between 340 mm and 370 mm.

The number of turbine blades, $N_T$, may be between 35 and 70. $N_T$ may be between 38 and 65. $N_T$ may be between 40 and 63, between 42 and 61, between 44 and 59, between 45 and 57, or between 47 and 55.

The aspect ratio, $AR_1$, of the turbine blade, equal to the blade height, $h_1$, divided by the chord length at a 100 percent spanwise position of the turbine blade may be between 0.55 and 1.05. The aspect ratio may be between 0.57 and 103, between 0.59 and 1.01, between 0.61 and 0.99, between 0.63 and 0.97, between 0.65 and 0.95, between 0.67 and 0.93, between 0.69 and 0.91, between 0.71 and 0.89, between 0.73 and 0.87, between 0.75 and 0.85, between 0.76 and 0.84, between 0.77 and 0.83, or between 0.78 and 0.82.

A turbine hub-to-tip ratio, $R_{HT1}/R_{T1}$, of the turbine stage may be between 0.60 and 0.94 and a speed of rotation of the high pressure turbine at cruise conditions may be between 11000 rpm and 18500 rpm. $R_{HT1}/R_{T1}$ may be between 0.63 and 0.93, between 0.66 and 0.92, between 0.70 and 0.91, or between 0.75 and 0.90. The speed of rotation of the high pressure turbine at cruise conditions may be between 11500 rpm and 18000 rpm, 12000 rpm and 17500 rpm, between 12500 rpm and 17000 rpm, between 13000 rpm and 16500 rpm, between 13500 rpm and 16000 rpm, or between 14000 rpm and 15500 rpm.

A turbine hub-to-tip ratio, $R_{HT1}/R_{T1}$, of the turbine stage may be between 0.65 and 0.95, a compressor hub-to-tip ratio, $R_{HC1}/R_{C1}$, of the compressor may be between 0.38 and 0.64, and a speed of rotation of a shaft connecting the high pressure turbine and the compressor may be between 10000 rpm and 17500 rpm at cruise conditions. $R_{HT1}/R_{T1}$ may be between 0.67 and 0.92, between 0.72 and 0.91, between 0.77 and 0.90, between 0.80 and 0.89, or between 0.81 and 0.88. $R_{HC1}/R_{C1}$ may be between 0.39 and 0.62, between 0.40 and 0.61, between 0.41 and 0.60, between 0.43 and 0.58, or between 0.45 and 0.56. The speed of rotation of the high pressure turbine at cruise conditions may be between 10250 rpm and 17250 rpm, between 10500 rpm and 17000 rpm, between 10750 rpm and 16750 rpm, between 11000 rpm and 16500 rpm, between 11250 rpm and 16250 rpm, between 11500 rpm and 16000 rpm, or between 12000 rpm and 15500 rpm.

The turbine stage may comprise a set of stator vanes, and a plurality of turbine blades downstream of the set of stator vanes. The turbine stage may comprise a set of nozzle guide vanes, NGVs, and a plurality of turbine blades downstream of the set of NGVs.

A ratio, $\varepsilon_1$, of a cooling mass flow for cooling the plurality of turbine blades of the turbine stage and a throat mass flow of the set of NGVs of the turbine stage is between 0.040 and 0.075 at cruise conditions. The cooling mass flow may be bleed air bled from the compressor. $\varepsilon_1$ may be between 0.040 and 0.070. $\varepsilon_1$ may be between 0.042 and 0.074, between 0.044 and 0.073, between 0.046 and 0.072, between 0.048 and 0.071, between 0.050 and 0.070, between 0.054 and 0.066, between 0.056 and 0.064, between 0.057 and 0.063, or between 0.058 and 0.062.

A ratio, $\nu_1$, of a cooling mass flow for cooling the set of NGVs and the throat mass flow of the set of NGVs is between 0.080 and 0.150 at cruise conditions. The cooling mass flow may be bleed air bled from the compressor. $\nu_1$ may be between 0.085 and 0.145, between 0.090 and 0.140, between 0.095 and 0.135, between 0.100 and 0.130, between 0.105 and 0.125, or between 0.110 and 0.120.

A ratio of a combined cooling mass flow for cooling both the set of NGVs and a platform region of the turbine stage at an inner radius of the NGVs (e.g., at the inner annulus of the turbine stage at an axial position of the set of NGVs) and the throat mass flow of the set of NGVs may between 0.015 and 0.030. The ratio may be between 0.016 and 0.029, between 0.017 and 0.028, between 0.018 and 0.027. between 0.019 and 0.026, between 0.020 and 0.025, between 0.021 and 0.024, or between 0.022 and 0.023. The ratio may be greater than 0.017, greater than 0.019, greater than 0.021, greater than 0.023, greater than 0.025, greater than 0.027, or greater than 0.028. The ratio may be less than 0.029, less than 0.027, less than 0.025, less than 0.023, less than 0.021, less than 0.019, or less than 0.017.

In some embodiments, the turbine stage is a first turbine stage of the high pressure turbine, and the high pressure turbine further comprises a second turbine stage downstream of the first turbine stage.

The second turbine blade may a second thickness to chord ratio at a 100 percent spanwise position, $\tau_{tip,2}$, of between 0.13 and 0.22. $\tau_{tip,2}$ may be between 0.14 and 0.21, between 0.15 and 0.20, between 0.16 and 0.19, or between 0.17 and 0.18.

The second turbine blade may have a second thickness to chord ratio at a 50 percent spanwise position, $\tau_{mid,2}$, of between 0.19 and 0.30. $\tau_{mid,2}$ may be between 0.20 and 0.29, between 0.21 and 0.28, between 0.22 and 0.27, between 0.23 and 0.26, or between 0.24 and 0.27.

The second turbine blade may have a second thickness to chord ratio at a 0 percent spanwise position, $\tau_{hub,2}$, of between 0.28 and 0.48. $\tau_{hub,2}$ may be between 0.29 and 0.46, between 0.30 and 0.45, between 0.31 and 0.44, between 0.32 and 0.43, between 0.33 and 0.42, or between 0.34 and 0.41.

A ratio of the thickness of the second turbine blades at a 100 percent spanwise position and the blade pitch, $s_2$, of the second turbine stage may be between 0.17 and 0.29. The ratio may be between 0.18 and 0.28, between 0.20 and 0.26, or between 0.21 and 0.25.

A ratio of the thickness of the second turbine blades at a 50 percent spanwise position and the blade pitch, $s_2$, of the second turbine stage may be between 0.20 and 0.33. The ratio may be between 0.21 and 0.32, between 0.23 and 0.30, between 0.24 and 0.29, or between 0.25 and 0.28.

A ratio of the thickness of the second turbine blades at a 0 percent spanwise position and a blade pitch, $s_2$, of the second turbine stage may be between 0.28 and 0.47. The ratio may be between 0.30 and 0.45, between 0.32 and 0.43, between 0.34 and 0.41, or between 0.35 and 0.40.

A sum, $\tau_{tip,2}+\tau_{mid,2}$, of a thickness to chord ratio at the a 100 percent spanwise position of the turbine blade, $\tau_{tip}$ and a thickness to chord ratio a 50 percent spanwise position of the turbine blade, $\tau_{mid}$, may be between 0.32 and 0.52. $\tau_{tip,2}+\tau_{mid,2}$ may be between 0.34 and 0.50, between 0.36 and 0.48, between 0.37 and 0.47, between 0.38 and 0.46, between 0.39 and 0.45, or between 0.40 and 0.44.

A sum, $\tau_{tip,2}+\tau_{hub,2}$, of a thickness to chord ratio at the a 100 percent spanwise position of the turbine blade, $\tau_{tip}$ and a thickness to chord ratio a 0 percent spanwise position of the turbine blade, $\tau_{hub}$, may be between 0.42 and 0.70. $\tau_{tip,2}+\tau_{hub,2}$ may be between 0.44 and 0.68, between 0.46 and 0.66, between 0.48 and 0.64, between 0.50 and 0.62, between 0.51 and 0.61, or between 0.52 and 0.60.

A sum, $\tau_{mid,2}+\tau_{hub,2}$, of a thickness to chord ratio at the a 50 percent spanwise position of the turbine blade, $\tau_{mid,2}$ and a thickness to chord ratio a 0 percent spanwise position of the turbine blade, $\tau_{hub,2}$, may be between 0.47 and 0.78. $\tau_{mid,2}+\tau_{hub,2}$ may be between 0.49 and 0.76, between 0.51 and 0.74, between 0.53 and 0.72, between 0.55 and 0.70, between 0.57 and 0.68, or between 0.58 and 0.67.

A ratio, $\tau_{tip}/\tau_{tip,2}$, of a thickness to chord ratio, $\tau_{tip}$, at a 100 percent spanwise position of the first turbine blade and a thickness to chord ratio, $\tau_{tip,2}$, at a 100 percent spanwise position of the second turbine blade may be between 1.17 and 1.91. The ratio may be between 1.20 and 1.88, between 1.23 and 1.85, between 1.26 and 1.82, between 1.29 and 1.79, between 1.32 and 1.76, between 1.35 and 1.73, between 1.37 and 1.71, between 1.39 and 1.69, or between 1.41 and 1.67.

A ratio, $\tau_{mid}/\tau_{mid,2}$, of a thickness to chord ratio, $\tau_{mid}$, at a 50 percent spanwise position of the first turbine blade and a thickness to chord ratio, $\tau_{mid,2}$, at a 50 percent spanwise position of the second turbine blade may be between 1.19 and 1.85. The ratio may be between 1.22 and 1.82, between 1.24 and 1.80, between 1.26 and 1.78, between 1.28 and 1.76, between 1.30 and 1.74, between 1.32 and 1.72, between 1.34 and 1.70, between 1.36 and 1.68, or between 1.39 and 1.75.

A ratio, $\tau_{hub}/\tau_{hub,2}$, of a thickness to chord ratio, $\tau_{hub}$, at a 0 percent spanwise position of the first turbine blade and a thickness to chord ratio, $\tau_{hub,2}$, at a 0 percent spanwise position of the second turbine blade may be between 0.91 and 1.69. The ratio may be between 0.94 and 1.66, between 0.97 and 1.63, between 1.00 and 1.60, between 1.03 and 1.57, between 1.06 and 1.54, between 1.09 and 1.51, between 1.11 and 1.49, between 1.12 and 1.48, or between 1.13 and 1.47.

A sum, $\tau_{tip}+\tau_{tip,2}$, of a thickness to chord ratio, $\tau_{tip}$, at a 100 percent spanwise position of the first turbine blade and a thickness to chord ratio, $\tau_{tip,2}$, at a 100 percent spanwise position of the second turbine blade may be between 0.35 and 0.54. The sum may be between 0.37 and 0.52, between 0.39 and 0.50, between 0.40 and 0.49, between 0.41 and 0.48, or between 0.42 and 0.47.

A sum, $\tau_{mid}+\tau_{mid,2}$, of a thickness to chord ratio, $\tau_{mid}$, at a 50 percent spanwise position of the first turbine blade and a thickness to chord ratio, $\tau_{mid,2}$, at a 50 percent spanwise position of the second turbine blade may be between 0.47 and 0.76. The sum may be between 0.49 and 0.74, between 0.51 and 0.72, between 0.53 and 0.70, between 0.55 and 0.68, or between 0.56 and 0.67.

A sum, $\tau_{hub}+\tau_{hub,2}$, of a thickness to chord ratio, $\tau_{mid}$, at a 0 percent spanwise position of the first turbine blade and a thickness to chord ratio, $\tau_{hub,2}$, at a 0 percent spanwise position of the second turbine blade may be between 0.68 and 1.02. The sum may be between 0.70 and 1.00, between 0.72 and 0.98, between 0.74 and 0.96, between 0.76 and 0.94, between 0.78 and 0.92, between 0.79 and 0.91, or between 0.80 and 0.90.

A ratio, $(\tau_{tip}/s)$,$/(\tau_{tip,2}/s_2)$, of a thickness to blade pitch ratio, $\tau_{tip}/s$, of the first turbine stage at a 100 percent spanwise position of the first turbine blades and a thickness to blade pitch ratio, $\tau_{tip,2}/s_2$, of the second turbine stage at a 100 percent spanwise position of the second turbine blades may be between 1.06 and 1.82. The ratio may be between 1.09 and 1.79, between 1.12 and 1.76, between 1.15 and 1.73, between 1.18 and 1.70, between 1.22 and 1.66, between 1.26 and 1.62, between 1.30 and 1.58, between 1.34 and 1.54, or between 1.38 and 1.50.

A ratio, $(t_{mid}/s)$,$/(t_{mid,2}/s_2)$, of a thickness to blade pitch ratio, $t_{mid}/s$, of the first turbine stage at a 50 percent spanwise position of the first turbine blades and a thickness to blade pitch ratio, $t_{mid,2}/s_2$, of the second turbine stage at a 50 percent spanwise position of the second turbine blades may be between 1.03 and 1.97. The ratio may be between 1.06 and 1.94, between 1.09 and 1.93, between 1.12 and 1.87, between 1.15 and 1.84, between 1.19 and 1.80, between 1.23 and 1.76, between 1.28 and 1.71, between 1.33 and 1.66, or between 1.38 and 1.61.

A ratio, $(t_{hub}/s)$,$/(t_{hub,2}/s_2)$, of a thickness to blade pitch ratio, $t_{hub}/s$, of the first turbine stage at a 0 percent spanwise position of the first turbine blades and a thickness to blade pitch ratio, $t_{hub,2}/s_2$, of the second turbine stage at a 0 percent spanwise position of the second turbine blades may be between 0.77 and 1.67. The ratio may be between 0.80 and 1.64, between 0.83 and 1.61, between 0.86 and 1.58, between 0.90 and 1.54, between 0.94 and 1.50, between 0.99 and 1.45, between 1.04 and 1.40, between 1.09 and 1.35, or between 1.14 and 1.30.

A sum, $(\tau_{tip}/s)+(\tau_{tip,2}/s_2)$, of a thickness to blade pitch ratio, $\tau_{tip}/s$, of the first turbine stage at a 100 percent spanwise position of the first turbine blades and a thickness to blade pitch ratio, $\tau_{tip,2}/s_2$, of the second turbine stage at a 100 percent spanwise position of the second turbine blades may be between 0.39 and 0.74. The sum may be between 0.41 and 0.72, between 0.43 and 0.70, between 0.45 and 0.68, between 0.47 and 0.66, or between 0.50 and 0.63.

A sum, $(t_{mid}/s)+(t_{mid,2}/s_2)$, of a thickness to blade pitch ratio, $t_{mid}/s$, of the first turbine stage at a 50 percent spanwise position of the first turbine blades and a thickness to blade pitch ratio, $t_{mid,2}/s_2$, of the second turbine stage at a 50 percent spanwise position of the second turbine blades may be between 0.48 and 0.84. The sum may be between 0.51 and 0.81, between 0.54 and 0.78, between 0.57 and 0.75, between 0.60 and 0.72, or between 0.62 and 0.70.

A sum, $(t_{hub}/s)+(t_{hub,2}/s_2)$, of a thickness to blade pitch ratio, $t_{hub}/s$, of the first turbine stage at a 0 percent spanwise position of the first turbine blades and a thickness to blade pitch ratio, $t_{hub,2}/s_2$, of the second turbine stage at a 0 percent spanwise position of the second turbine blades may be between 0.59 and 1.04. The sum may be between 0.62 and 1.01, between 0.65 and 0.98, between 0.68 and 0.95, between 0.71 and 0.92, between 0.74 and 0.89, between 0.76 and 0.87, between 0.78 and 0.85, or between 0.79 and 0.84.

A product of a thickness to chord ratio at a 100 percent spanwise position, $\tau_{tip2}$, of the second turbine blades and the blade pitch, $s_2$, of the second turbine stage may be between 5.5 mm and 9.6 mm. The product may be between 5.7 mm and 9.4 mm, between 5.9 mm and 9.2 mm, between 6.1 mm and 9.0 mm, between 6.3 mm and 8.8 mm, between 6.5 mm and 8.6 mm, or between 6.7 mm and 8.4 mm.

A product of a thickness to chord ratio at a 50 percent spanwise position, $\tau_{mid2}$, of the second turbine blades and the blade pitch, $s_2$, of the second turbine stage may be between 7.5 mm and 13.3 mm. The product may be between 7.8 mm and 13.0 mm, between 8.1 mm and 12.7 mm, between 8.4 mm and 12.4 mm, between 8.7 mm and 12.1 mm, or between 10.0 mm and 11.8 mm.

A product of a thickness to chord ratio at a 0 percent spanwise position, $\tau_{hub2}$, of the second turbine blades and the blade pitch, $s_2$, of the second turbine stage may be between 11.1 mm and 21.1 mm. The product may be between 11.6 mm and 20.6 mm, between 12.1 mm and 20.1 mm, between 12.6 mm and 19.6 mm, between 13.1 mm and 19.1 mm, between 13.6 mm and 18.6 mm, or between 14.1 mm and 18.1 mm.

A ratio, $\sigma_{tip}/\sigma_{tip,2}$, of a solidity, $\sigma_{tip}$, of a first turbine blade of the first turbine stage at a 100 percent spanwise position and a solidity, $\sigma_{tip,2}$, of a second turbine blade of second turbine stage at a 100 percent spanwise position may be between 0.74 and 1.13. The ratio may be between 0.74 and 1.12, between 0.75 and 1.11, between 0.77 and 1.09, between 0.79 and 1.07, between 0.81 and 1.05, between 0.83 and 1.03, between 0.85 and 1.01, between 0.87 and 0.99, or between 0.89 and 0.97.

A ratio, $\sigma_{mid}/\sigma_{mid,2}$, of a solidity, $\sigma_{mid}$, of a first turbine blade of the first turbine stage at a 50 percent spanwise position and a solidity, $\sigma_{mid,2}$, of a second turbine blade of second turbine stage at a 50 percent spanwise position may be between 0.74 and 1.23. The ratio may be between 0.75 and 1.22, between 0.77 and 1.20, between 0.79 and 1.18, between 0.81 and 1.15, between 0.83 and 1.12, between 0.85 and 1.09, between 0.87 and 1.06, or between 0.89 and 1.04.

A ratio, $\sigma_{hub}/\sigma_{hub,2}$, of a solidity, $\sigma_{hub}$, of a first turbine blade of the first turbine stage at a 0 percent spanwise position and a solidity, $\sigma_{hub,2}$, of a second turbine blade of second turbine stage at a 0 percent spanwise position may be between 0.72 and 1.14. The ratio may be between 0.73 and 1.13, between 0.74 and 1.17, between 0.76 and 1.15, between 0.78 and 1.13, between 0.80 and 1.11, between 0.82 and 1.09, between 0.82 and 1.07, between 0.84 and 1.05, between 0.86 and 1.03, between 0.84 and 1.01, or between 0.86 and 0.99.

At cruise conditions, the second loading parameter, $\lambda_2$, may be between 1.00 and 1.30. The second loading parameter, $\lambda_2$, may be between 1.05 and 1.25, between 1.10 and 1.20, or between 1.12 and 1.18.

At cruise conditions, the second speed parameter, $\mu_2$, may be between 12.0 $ms^{-1}K^{-0.5}$ and 13.5 $ms^{-1}K^{-0.5}$. The second speed parameter, $\mu_2$, may be between 12.2 $ms^{-1}K^{-0.5}$ and 13.3 $ms^{-1}K^{-0.5}$, between 12.4 $ms^{-1}K^{-0.5}$ and 13.1 $ms^{-1}K^{-0.5}$, or between 12.5 $ms^{-1}K^{-0.5}$ and 13.0 $ms^{-1}K^{-0.5}$.

At cruise conditions, a ratio of $\mu_2$ and $\lambda_2$, $\mu_2/\lambda_2$, may be between 9.2 $ms^{-1}K^{-0.5}$ and 12.9 $ms^{-1}K^{-0.5}$. The ratio may be between 9.5 $ms^{-1}K^{-0.5}$ and 12.6 $ms^{-1}K^{-0.5}$, between 9.8 $ms^{-1}K^{-0.5}$ and 12.3 $ms^{-1}K^{-0.5}$, between 10.1 $ms^{-1}K^{-0.5}$ and 12.0 $ms^{-1}K^{-0.5}$, between 10.4 $ms^{-1}K^{-0.5}$ and 11.7 $ms^{-1}K^{-0.5}$, or between 10.7 $ms^{-1}K^{-0.5}$ and 11.4 $ms^{-1}K^{-0.5}$.

At cruise conditions, a product of $\lambda_2$ and a thickness to chord ratio at a 100 percent spanwise position of the turbine blade, $\tau_{tip,2}$, may be between 0.14 and 0.28. The product of $\lambda_2$ and $\tau_{tip,2}$ may be between 0.15 and 0.27, between 0.16 and 0.26, between 0.17 and 0.25, or between 0.18 and 0.24.

At cruise conditions, a product of $\lambda_2$ and a thickness to chord ratio at a 50 percent spanwise position of the turbine blade, $\tau_{mid,2}$, may be between 0.20 and 0.39. The product of $\lambda_2$ and $\tau_{mid,2}$ may be between 0.21 and 0.38, between 0.22 and 0.37, between 0.24 and 0.35, or between 0.26 and 0.33.

At cruise conditions, a product of $\lambda_2$ and a thickness to chord ratio at a 0 percent spanwise position of the turbine blade, $\tau_{hub,2}$, may be between 0.29 and 0.63. The product of $\lambda_2$ and $\tau_{hub,2}$ may be between 0.31 and 0.61, between 0.33 and 0.59, between 0.37 and 0.55, or between 0.41 and 0.51.

At cruise conditions, a product of $\lambda_2$ and the blade pitch, $s_2$, of the second turbine stage may be between 33 mm and 69 mm. The product of $\lambda_2$ and $s_2$ may be between 35 mm and 67 mm, between 37 mm and 65 mm, between 40 mm and 62 mm, between 43 mm and 59 mm, or between 46 mm and 56 mm.

At cruise conditions, a ratio, $\lambda/\lambda_2$, may be between 1.0 and 1.8. The ratio may be between 1.1 and 1.7, between 1.2 and 1.6, or between 1.3 and 1.5.

At cruise conditions, the first turbine blade may have an angle of attack, $\alpha_{1,mid}$, between 27 degrees and 51 degrees measured at a 50 percent spanwise position of the first turbine blade, and the second turbine blade may have an angle of attack, $\alpha_{2,mid}$, between 20 degrees and 30 degrees measured at a 50 percent spanwise position of the second turbine blade.

$\alpha_{1,mid}$ may be between 29 degrees and 49 degrees, between 31 degrees and 47 degrees, between 33 degrees and 45 degrees, between 35 degrees and 43 degrees, or between 37 degrees and 41 degrees.

$\alpha_{2,mid}$ may be between 21 degrees and 29 degrees, between 22 degrees and 28 degrees, between 23 degrees and 27 degrees, or between 24 and 26 degrees.

A ratio, $\alpha_{2,mid}/\alpha_{1,mid}$, of $\alpha_{2,mid}$ and $\alpha_{1,mid}$ may be between 0.60 and 0.93 when measured at cruise conditions. The ratio may be between 0.62 and 0.91, between 0.64 and 0.89, between 0.66 and 0.87, between 0.68 and 0.85, between 0.70 and 0.83, between 0.71 and 0.82, between 0.72 and 0.81, between 0.73 and 0.80, or between 0.73 and 0.79.

A ratio, $\alpha_{1,mid}/\alpha_{2,mid}$, of $\alpha_{1,mid}$ $\alpha_{2,mid}$ may be between 1.04 and 1.60 when measured at cruise conditions. The ratio may be between 1.07 and 1.57, between 1.10 and 1.54, between 1.13 and 1.51, between 1.16 and 1.48, between 1.19 and 1.45, or between 1.22 and 1.42.

The thickness of the second turbine blade at the 100 percent spanwise position may be greater than 7.0 mm. The thickness of the turbine blade at the 100 percent spanwise position may be less than 12.4 mm. The thickness of the turbine blade at the 100 percent spanwise position may be between 7.3 and 12.1 mm, between 7.6 and 11.8 mm, between 8.0 and 11.4 mm, or between 8.4 and 10.0 mm.

The thickness of the second turbine blade at the 50 percent spanwise position may be greater than 8.0 mm. The thickness of the turbine blade at the 50 percent spanwise position may be less than 14.4 mm. The thickness of the turbine blade at the 50 percent spanwise position may be between 8.4 and 14.0 mm, between 8.8 and 13.6 mm, between 9.2 and 13.2 mm, or between 9.6 and 12.8 mm.

The thickness of the second turbine blade at the 0 percent spanwise position may be greater than 10.5 mm. The thickness of the turbine blade at the 0 percent spanwise position may be less than 21.4 mm. The thickness of the turbine blade at the 0 percent spanwise position may be between 11.0 and 20.9 mm, between 11.5 and 20.4 mm, between 12.0 and 19.9 mm, or between 13.0 and 18.9 mm.

The chord length of the second turbine blade at the 100 percent spanwise position may be greater than 40 mm. The chord length of the turbine blade at the 100 percent spanwise position may be less than 69 mm. The chord length of the turbine blade at the 100 percent spanwise position may be between 42 and 67 mm, between 44 and 65 mm, between 46 and 63 mm, between 48 and 61 mm, or between 50 and 59 mm.

The chord length of the second turbine blade at the 50 percent spanwise position may be greater than 34 mm. The chord length of the turbine blade at the 50 percent spanwise position may be less than 58 mm. The chord length of the turbine blade at the 50 percent spanwise position may be between 36 and 56 mm, between 38 and 54 mm, between 40 and 52 mm, between 42 and 50 mm, or between 44 and 48 mm.

The chord length of the second turbine blade at the 0 percent spanwise position may be greater than 30 mm. The chord length of the turbine blade at the 0 percent spanwise position may be less than 54 mm. The chord length of the turbine blade at the 0 percent spanwise position may be between 32 and 52 mm, between 34 and 50 mm, between 36 and 48 mm, between 38 and 46 mm, or between 40 and 44 mm.

The mean radius of the turbine blade may be between 275 mm and 460 mm. The mean radius may be between 290 mm and 445 mm, between 305 mm and 430 mm, between 320 mm and 415 mm, between 335 mm and 400 mm, between 340 mm and 395 mm, or between 345 mm and 390 mm.

The number of turbine blades, $N_{T2}$, of the second turbine stage may be between 41 and 70. $N_{T2}$ may be between 43 and 68, between 45 and 66, between 47 and 64, between 49 and 63, between 50 and 62, or between 51 and 61.

The aspect ratio, $AR_2$, of the second turbine blade, equal to the second blade height, $h_2$, divided by the second chord length at a 100 percent spanwise position of the second turbine blade, may be between 1.04 and 1.90. The second aspect ratio may be between 1.06 and 1.88, between 1.08 and 1.86, between 1.10 and 1.84, between 1.13 and 1.81, between 1.16 and 1.78, between 1.19 and 1.75, between 1.22 and 1.72, between 1.25 and 1.69, between 1.28 and 1.66, between 1.31 and 1.63, between 1.34 and 1.60, between 1.41 and 1.57, or between 1.44 and 1.54.

A ratio of the first aspect ratio and the second aspect ratio, $AR_1/AR_2$, may be between 0.39 and 0.66. The ratio may be between 0.40 and 0.65, between 0.41 and 0.64, between 0.42 and 0.63, between 0.43 and 0.62, between 0.44 and 0.61, between 0.45 and 0.60, between 0.46 and 0.59, between 0.48 and 0.57, or between 0.50 and 0.55.

A sum of the first aspect ratio and the second aspect ratio, $AR_1+AR_2$, may be between 1.58 and 3.02. The sum may be between 1.68 and 2.92, between 1.78 and 2.82, between 1.88 and 2.72, between 1.98 and 2.62 between 2.08 and 2.52, between 2.18 and 2.42, or between 2.23 and 2.37.

A second turbine hub-to-tip ratio, $R_{HT2}/R_{T2}$, of the second turbine stage may be between 0.48 and 0.90. $R_{HT2}/R_{T2}$ may be between 0.55 and 0.88, between 0.65 and 0.884, between 0.70 and 0.83, or between 0.75 and 0.82.

A ratio, $\varepsilon_2$, of a cooling mass flow for cooling the second plurality of turbine blades and the throat mass flow of the first set of NGVs may be between 0.010 and 0.025 at cruise conditions. The cooling mass flow may be bleed air bled from the compressor. $\varepsilon_2$ may be between 0.011 and 0.024, between 0.012 and 0.023, between 0.013 and 0.022, between 0.014 and 0.021, between 0.015 and 0.020, or between 0.016 and 0.019.

A ratio, $\nu_2$, of a cooling mass flow for cooling the second set of NGVs and the throat mass flow of the first set of NGVs may be between 0.015 and 0.030 at cruise conditions. The cooling mass flow may be bleed air bled from the compressor. $\nu_2$ may be between 0.018 and 0.027, between 0.020 and 0.025, or between 0.021 and 0.024.

In other embodiments, the high pressure turbine is a single-stage high pressure turbine.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades which may or may not be enclosed within a nacelle). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

An engine according to the present disclosure may be a geared gas turbine engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound star gearbox (which may have the input on the sun gear and the output on the ring gear), for example having two stages of reduction.

The gearbox (which may be, for example, a star gearbox, a planetary gearbox, or a compound star gearbox) may have any desired gear ratio (defined as the rotational speed of the input shaft divided by the rotational speed of the output shaft). For example the gear ratio may be greater than, or may be any of, the following: 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4 or 4.5. The gear ratio may be in an inclusive range bounded by any two of the values in the previous sentence (i.e. the values may form upper or lower bounds). The gear ratio may be, for example, greater than 2.5, for example in the range of from 3.0 to 4.2, or from 3.2 to 3.8. Purely by way of example, the gearbox may be a "star" gearbox having a gear ratio in the range of from 2.9, 3.0, 3.1 or 3.2 to 3.8. Purely by way of further example, the gearbox may be a "planetary" gearbox having a reduction ratio in the range of from 3.3 to 4.2, 3.3 to 3.6, or from 3.6 to 4.2. Purely by way of further example, the gearbox may be a compound gearbox, for example a compound star gearbox, having a gear ratio of, or at least: 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0. The gear ratio of a compound gearbox, for example a compound star gearbox, may be in an inclusive range bounded by any two of the values in the previous sentence (i.e. the values may form upper or lower bounds), for example in the range of from 4.0 to 14.0, or 6.0 to 12.0, or 8.0 to 10.0. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit from the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. By way of example, the gas turbine engine may be a "geared" gas turbine engine (in which the fan is driven by a first core shaft via a reduction gearbox) comprising 11, 12, 13, 14 or 15 compressor stages (in addition to the fan). Such an engine may comprise 3 or 4 stages in the first (or "low pressure") compressor and 8, 9, 10 or 11 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes. The respective rows of rotor blades and stator vanes may be axially offset from each other. In each stage, the row of rotor blades may be arranged downstream from the respective row of stator vanes. By way of example, the gas turbine engine may comprise 5, 6, 7, 8, or 9 turbine stages.

For example, the gas turbine engine may be a "geared" gas turbine engine comprising 5, 6, or 7 turbine stages. Such a geared gas turbine engine may comprise a second ("high pressure") turbine having 1 or 2 stages. Such a geared gas turbine engine may comprise a first (or "low pressure") turbine having 3, or 4 stages.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip may be less than, or may be any of: 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31, 0.30, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32, or from 0.29 to 0.30. These ratios may commonly be referred to as the hub-to-tip ratio. Purely by way of non-limitative example, the hub-to-tip ratio may be in the range of from 0.40 to 0.50, from 0.42 to 0.48, or from 0.43 to 0.47. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than, or may be, any of: 140 cm, 170 cm, 180 cm, 190 cm, 200 cm, 205 cm, 206 cm, 207 cm, 208 cm, 209 cm, 210 cm, 211 cm, 212 cm, 213 cm, 214 cm, 215 cm, 216 cm, 217 cm, 218 cm, 219 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 345 cm, 350 cm, 355 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, from 250 cm to 280 cm, from 320 cm to 380 cm, or 380 cm to 420 cm. Purely by way of non-limitative example, the fan diameter may be in the range of from 170 cm to 180 cm, 190 cm to 200 cm, 200 cm to 210 cm, 210 cm to 220 cm, 220 cm to 230 cm, 290 cm to 300 cm, or 340 cm to 360 cm.

The rotational speed of the fan may vary in use. Generally, the rotational speed is lower for fans with a higher diameter. Purely by way of non-limitative example, the rotational speed of the fan at cruise conditions may be less than, or may be any of the following: 3500 rpm, 3450 rpm, 3400 rpm, 3350 rpm, 3300 rpm, 3250 rpm, 3200 rpm, 3150 rpm, 3100 rpm, 3050 rpm, 3000 rpm, 2950 rpm, 2900 rpm, 2850 rpm, 2800 rpm, 2750 rpm, 2700 rpm, 2650 rpm, 2600 rpm, 2550 rpm, 2500 rpm, 2450 rpm, 2400 rpm, 2350 rpm, 2300 rpm, 2250 rpm, 2200 rpm, 2150 rpm, 2100 rpm, 2050 rpm, 2000 rpm, 1950 rpm, 1900 rpm, 1850 rpm, 1800 rpm, 1750 rpm, 1700 rpm, 1650 rpm, 1600 rpm, 1550 rpm, 1500 rpm, 1450 rpm, 1400 rpm, 1350 rpm, 1300 rpm, 1250 rpm, 1200 rpm, 1150 rpm, 1100 rpm, 1050 rpm, 1000 rpm, or 950 rpm. The rotational speed of the fan at cruise conditions may be in an inclusive range bounded by any two of the values in the previous sentence (i.e. the values may form upper or lower bounds). Purely by way of further non-limitative example, the rotational speed of the fan at cruise conditions for a "geared" gas turbine engine having a fan diameter in the range of from 200 cm to 210 cm may be in the range of from 2750 to 2900 rpm, from 2750 rpm to 2800 rpm, or 2800 rpm to 2900 rpm. Purely by way of further non-limitative example, the rotational speed of the fan at cruise conditions for a "geared" gas turbine engine having a fan diameter in the range of from 210 cm to 230 cm may be in the range of from 2500 rpm to 2800 rpm, or from 2500 rpm to 2750 rpm. Purely by way of further non-limitative example, the rotational speed of the fan at cruise conditions for a "geared" gas turbine engine having a fan diameter in the range of from 340 cm to 360 cm may be in the range of from 1500 rpm to 1800 rpm, or from 1500 rpm to 1700 rpm. Purely by way of further non-limitative example, the rotational speed of the fan at cruise conditions for a "geared" gas turbine engine having a fan diameter in the range of from 380 cm to 420 cm may be in the range of from 950 rpm to 1500 rpm, from 950 rpm to 1200 rpm, from 950 rpm to 1100 rpm, from 950 rpm to 1050 rpm, from 950 rpm to 1000 rpm, or from 1000 rpm to 1050 rpm.

In use of the gas turbine engine, the fan (with associated fan blades) rotates about a rotational axis. This rotation results in the tip of the fan blade moving with a velocity $U_{tip}$. The work done by the fan blades on the flow results in a rise dH in specific enthalpy of the flow. A fan tip loading may be defined as, $dH/U_{tip}^2$ where dH is the rise in specific enthalpy (for example the 1-D average specific enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than, or may be any of the following: 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e. the values may form upper or lower bounds), for example in the range of from 0.15 to 0.20, from 0.28 to 0.35, from 0.29 to 0.35, from 0.29 to 0.30, or from 0.30 to 0.35 (for example for a geared gas turbine engine).

In use of the gas turbine engine, the fan has a fan tip pressure ratio being defined as the ratio of the total pressure of the flow downstream of the fan that subsequently flows through the bypass duct to the total pressure of the flow at the inlet to the fan. The fan tip pressure ratio at cruise conditions may be greater than 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50. The fan tip pressure ratio may be in an inclusive range bounded by any two of the values in the previous sentence (i.e. the values may form upper or lower bounds), for example in the range of from 1.30 to 1.50, from 1.37 to 1.50, from 1.42 to 1.50.

Gas turbine engines as contemplated herein may have any desired bypass ratio (BPR), where the bypass ratio is defined as the ratio of the mass flow rate of the flow around the core (e.g. through the bypass duct) to the mass flow rate of the flow through the core. In some arrangements the bypass ratio at cruise conditions may be greater than, or may be any of the following: 8.0, 8.5, 9.0, 9.5, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 13.0, 13.5, 14.0, 14.5, 15.0, 15.5, 16.0, 16.5, 17.0, 17.5, 18.0, 18.5, 19.0, 19.5 or 20.0. The bypass ratio at cruise conditions may be in an inclusive range bounded by any two of the values in the previous sentence (i.e. the values may form upper or lower bounds), for example in the range of from 10.0 to 16.0, from 12.0 to 16.0, 13.0 to 15.0, or from 13.0 to 14.0. Purely by way of further non-limitative example, the bypass ratio at cruise conditions of a geared gas turbine engine as contemplated herein may be in the range of from 10.0 to 12.0, from 12.0 to 15.0, or from 12.5 to 15.0. The bypass duct may be at least substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than, or may be any of the following: 25, 30, 35, 40, 41, 42, 43, 44, 45, 46, 47, 48, 49, 50, 51, 52, 53, 54, 55, 56, 57, 58, 59, 60, 65, 70, 75. The overall pressure ratio at cruise conditions may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 44. Purely by way of non-limitative example, the overall pressure ratio at cruise conditions of a geared gas turbine engine having a fan diameter in the range of from 210 cm to 230 cm may be in the range of from 44 to 55. Purely by way of non-limitative example, the overall pressure ratio at cruise conditions of a geared gas turbine engine having a fan diameter in the range of from 340 cm to 360 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than, or may be any of the following: 150 $Nkg^{-1}s$, 145 $Nkg^{-1}s$, 140 $Nkg^{-1}s$, 135 $Nkg^{-1}s$, 130 $Nkg^{-1}s$, 125 $Nkg^{-1}s$, 120 $Nkg^{-1}s$, 115 $Nkg^{-1}s$, 110 $Nkg^{-1}s$, 105 $Nkg^{-1}s$, 100 $Nkg^{-1}s$, 99 $Nkg^{-1}s$, 98 $Nkg^{-1}s$, 97 $Nkg^{-1}s$, 96 $Nkg^{-1}s$, 95 $Nkg^{-1}s$, 94 $Nkg^{-1}s$, 93 $Nkg^{-1}s$, 92 $Nkg^{-1}s$, 91 $Nkg^{-1}s$, 90 $Nkg^{-1}s$, 89 $Nkg^{-1}s$, 88 $Nkg^{-1}s$, 87 $Nkg^{-1}s$, 86 $Nkg^{-1}s$, 85 $Nkg^{-1}s$, 80 $Nkg^{-1}s$, 75 $Nkg^{-1}s$, 70 $Nkg^{-1}s$, 65 $Nkg^{-1}s$, 60 $Nkg^{-1}s$, 55 $Nkg^{-1}s$, or 50 $Nkg^{-1}s$. The specific thrust at cruise conditions may be in an inclusive range bounded by any two of the values in the previous sentence (i.e. the values may form upper or lower bounds), for example in the range of from 80 $Nkg^{-1}s$ to 100 $Nkg^{-1}s$, from 85 $Nkg^{-1}s$ to 100 $Nkg^{-1}s$, or from 92 $Nkg^{-1}s$ to 100 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 98 $Nkg^{-1}s$, or from 92 $Nkg^{-1}s$ to 98 $Nkg^{-1}s$. Purely by way of non-limitative example, the specific thrust of a geared gas turbine engine having a fan diameter in the range of from 210 cm to 230 cm may be in the range of from 90 $Nkg^{-1}s$ to 100 $Nkg^{-1}s$, or from 95 $Nkg^{-1}s$ to 100 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 95 $Nkg^{-1}s$, from 80 $Nkg^{-1}s$ to 95 $Nkg^{-1}s$, or from 85 $Nkg^{-1}s$ to 95 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least, or may be any of the following: 60 kN, 70 kN, 80 kN, 90 kN, 100 kN, 105 kN, 110 kN, 115 kN, 120 kN, 125 kN, 130 kN, 131 kN, 132 kN, 133 kN, 134 kN, 135 kN, 136 kN, 137 kN, 138 kN, 139 kN, 140 kN, 141 kN, 142 kN, 143 kN, 144 kN, 145 kN, 146 kN, 147 kN, 148 kN, 149 kN, 150 kN, 151 kN, 152 kN, 153 kN, 154 kN, 155 kN, 160 kN, 170 kN, 180 kN, 190 kN, 200 kN, 250 kN, 300 kN, 350 kN, 375 kN, 400 kN, 425 kN, 450 kN, 475 kN, 500 kN, 525 kN, 550 kN, 575 kN, or 600 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 65 kN to 150 kN, from 105 kN to 150 kN, from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 130 kN to 160 kN, or from 130 kN to 150 kN. Purely by way of non-limitative example, the maximum thrust of a geared gas turbine engine having a fan diameter in the range of from 210 cm to 230 cm may be in the range of from 130 kN to 200 kN, or 135 kN to 180 kN, or 135 kN to 170 kN, or 135 kN to 160 kN, or 135 kN to 150 kN, or 135 kN or 145 kN. Purely by way of non-limitative example, the maximum thrust of a geared gas turbine engine having a fan diameter in the range of from 340 cm to 360 cm may be in the range of from 370 kN to 500 kN. The thrust referred to above may be the maximum net thrust at standard atmospheric conditions at sea level plus 15 degrees Celsius (ambient pressure 101.3 kPa, temperature 30 degrees Celsius), with the engine static.

In use, the temperature of the flow at the entry to the high pressure turbine may be particularly high. This temperature, which may be referred to as turbine entry temperature, or TET, may be measured at the exit to the combustor, for example immediately upstream of the first turbine vane, which itself may be referred to as a nozzle guide vane. In some examples, the TET may depend, for a given thrust condition, upon the specific composition of fuel provided to the combustor. At cruise conditions, the TET may be at least, or may be any of the following: 1400 K, 1450 K, 1455 K, 1460 K, 1465 K, 1470 K, 1475 K, 1480 K, 1490 K, 1495 K, 1500 K, 1505 K, 1510 K, 1515 K, 1520 K, 1525 K, 1530 K, 1535 K, 1540 K, 1545 K, 1550 K, 1555 K, 1560 K, 1565 K, 1570 K, 1575 K, 1580 K, 1585 K, 1590 K, 1595 K, 1600 K, 1605 K, 1610 K, 1615 K, 1620 K, 1625 K, 1630 K, 1635 K, 1640 K, 1645 K, 1650 K, 1660 K, 1670 K, 1680 K, 1690 K, 1700 K, or 1750 K. The TET at cruise conditions may be in an inclusive range bounded by any two of the values in the previous sentence (i.e. the values may form upper or lower bounds). Thus, purely by way of non-limitative example, the TET at cruise conditions of a geared gas turbine engine having a fan diameter in the range of from 200 cm to 210 cm may be in the range of from 1540 K to 1650 K, or 1550 K to 1650 K, or 1600 K to 1650 K. Purely by way of non-limitative example, the TET at cruise conditions of a geared gas turbine engine having a fan diameter in the range of from 210 cm to 230 cm may be in the range of from 1525 K to 1650 K, or 1540 K to 1630 K, or 1570 K to 1590 K. Purely by way of non-limitative example, the TET at cruise conditions of a geared gas turbine engine having a fan diameter in the range of from 340 cm to 360 cm may be in the range of from 1550 K to 1660 K, or 1550 K to 1600 K. The TET at cruise conditions may be in an inclusive range bounded by any two of the values of TET in the present paragraph (i.e. the values may form upper or lower bounds), for example 1530 K to 1600 K.

The maximum TET in use of the engine may be at least, or may be any of the following: 1700 K, 1750 K, 1755 K, 1760 K, 1765 K, 1770 K, 1775 K, 1780 K, 1785 K, 1790 K, 1795 K, 1800 K, 1805 K, 1810 K, 1815 K, 1820 K, 1825 K, 1830 K, 1835 K, 1840 K, 1845 K, 1850 K, 1855 K, 1860 K, 1865 K, 1870 K, 1875 K, 1880 K, 1885 K, 1890 K, 1895 K, 1900 K, 1905 K, 1910 K, 1915 K, 1920 K, 1925 K, 1930 K, 1935 K, 1940 K, 1945 K, 1950 K, 1955 K, 1960 K, 1965 K, 1970 K, 1975 K, 1980 K, 1985 K, 1990 K, 1995 K, 2000 K, 2005 K, 2010 K, 2015 K, 2050 K, or 2100 K. The maximum TET in use of the engine may be in an inclusive range bounded by any two of the values of TET in the present paragraph (i.e. the values may form upper or lower bounds). Thus, purely by way of non-limitative example, the maximum TET of a geared gas turbine engine having a fan diameter in the range of from 200 cm to 210 cm may be in the range of from 1800 K to 1960 K, from 1850 K to 1960 K, from 1875 K to 1960 K, from 1900 K to 1960 K, or from 1900 K to 1950 K. Purely by way of non-limitative example, the maximum TET of a geared gas turbine engine having a fan diameter in the range of from 210 cm to 230 cm may be in the range of from 1700 K to 1960 K, from 1750 K to 1900 K, from 1750 K to 1850 K, or from 1750 K to 1800 K. Purely by way of non-limitative example, the maximum TET of a geared gas turbine engine having a fan diameter in the range of from 340 cm to 360 cm may be in the range of from 1800 K to 1960 K, from 1800 K to 1900 K, or from 1850 K to 1900 K. The maximum TET may occur, for example, at a high thrust condition, for example at a maximum take-off (MTO) condition.

A gas turbine engine as described and/or claimed herein may have any desired high-pressure compressor size, also known as core size. The core size defines the size of the core of the engine. Engine core size can be defined as:

$$\text{Core size} = \dot{m}_2 \frac{\sqrt{T_3}}{P_3}$$

where $\dot{m}_2$=the mass flow rate, in lbs per second, of air on entry to the high-pressure compressor, $T_3$=the temperature, in kelvin, of air on exit from the high-pressure compressor, and $P_3$=the pressure, in lb inches per second squared per inch squared, of air on exit from the high-pressure compressor. A unit of core size is therefore expressed as:

$$s \cdot K^{\frac{1}{2}} \cdot \text{in}$$

At cruise conditions, the core size may be at least, or may be any of the following: 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0. The core size at cruise conditions may be in an inclusive range bounded by any two of the values in the previous sentence (i.e. the values may form upper or lower bounds). Thus, purely by way of non-limitative example, the core size at cruise conditions of a geared gas turbine engine having a fan diameter in the range of from 200 cm to 210 cm may be in the range of from 3.0 to 8.0, 3.5 to 7.0, 4.0 to 6.5, 4.5 to 6.5, or 5.0 to 6.0. Purely by way of non-limitative example, the core size at cruise conditions of a geared gas turbine engine having a fan diameter in the range of from 210 cm to 230 cm may be in the range of from 7.0 to 15.0, 8.0 to 14.0, 9.0 to 13.0, 10.0 to 12.5, or 11.0 to 12.0. Purely by way of non-limitative example, the core size at cruise conditions of a geared gas turbine engine having a fan diameter in the range of from 340 cm to 360 cm may be in the range of from 5.0 to 13.0, 6.5 to 12.5, 7.5 to 11.5, 8.5 to 10.5, or 9.0 to 10.0.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge. The fan blade may have a weight of at least, or may be any of the following: 3.0 kg, 3.5 kg, 4.0 kg, 4.5 kg, 5.0 kg, 5.5 kg, 6.0 kg, 6.5 kg, 7.0 kg, 7.5 kg, 8.0 kg, 8.5 kg, 9.0 kg, 9.5 kg, 10.0 kg, 10.5 kg, 11.0 kg, 11.5 kg, 12.0 kg, 12.5 kg, 13.0 kg, 13.5 kg, 14.0 kg, 14.5 kg, 15.0 kg, 15.5 kg, 16.0 kg, 16.5 kg, 17.0 kg, 17.5 kg, 18.0 kg, 18.5 kg, 19.0 kg, 19.5 kg, or 20.0 kg. The weight of the fan blade may be in an inclusive range bounded by any two of the values of fan blade weight in the previous sentence (i.e. the values may form upper or lower bounds). For example, the weight of the fan blade for a "geared" gas turbine engine having a fan diameter in the range of from 200 cm to 230 may be in the range of from 3.0 kg to 6.0 kg, or 4.0 kg to 6.0 kg, or from 5.0 kg to 5.5 kg.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles disclosed herein may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 14, 16 or 18 fan blades. Where the fan blades have a metallic body (for example aluminium-lithium or titanium-alloy), there may be 18, 20 or 22 fan blades.

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propeller stages may be driven by a gearbox. The gearbox may be of the type described herein.

As used herein, the terms idle, taxi, take-off, climb, cruise, descent, approach, and landing (or one or more portions thereof) have the conventional meaning and would be readily understood by the skilled person.

Purely by way of non-limitative example, ground idle may refer to an operating phase of the engine where the aircraft is stationary and in contact with the ground, but where there is a requirement for the engine to be running. For example, during idle, the engine may be producing between 3 percent and 9 percent of the available thrust of the engine. In further non-limitative examples, the engine may be producing between 5 percent and 8 percent of available thrust. In further non-limitative examples, the engine may be producing between 6 percent and 7 percent of available thrust. Purely by way of non-limitative example, taxi may refer to an operating phase of the engine where the aircraft is being propelled along the ground by the thrust produced by the engine. For example, during taxi, the engine may be producing between 5 percent and 15 percent of available thrust. In further non-limitative examples, the engine may be producing between 6 percent and 12 percent of available thrust. In further non-limitative examples, the engine may be producing between 7 percent and 10 percent of available thrust. Purely by way of non-limitative example, take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. For example, during take-off, the engine may be producing between 90 percent and 100 percent of available thrust. In further non-limitative examples, the engine may be producing between 95 percent and 100 percent of available thrust. In further non-limitative examples, the engine may be producing 100 percent of available thrust.

Purely by way of non-limitative example, climb may refer to an operating phase of the engine where the aircraft is being propelled by the thrust produced by the engine. For example, during climb, the engine may be producing between 75 percent and 100 percent of available thrust. In further non-limitative examples, the engine may be producing between 80 percent and 95 percent of available thrust. In further non-limitative examples, the engine may be producing between 85 percent and 90 percent of available thrust. For example, climb may refer to an operating phase within an aircraft flight cycle between take-off and the arrival at cruise conditions, the arrival at cruise conditions thus defining the onset of the cruise phase, or a portion thereof, of the aircraft flight. Additionally or alternatively, climb may refer to, for example, a nominal point in, or one or more nominal periods during, an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50 percent of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.78, 0.79, or 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

In use, at any one of more of the operating conditions and/or thrust settings disclosed or described herein, a reduction in percentage $CO_2$ mass emissions index (EI), provided by any one or more of the gas turbine engine configurations disclosed or described herein, may be greater than or equal to any of the following: 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.22, 0.24, 0.26, 0.28, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.65, 0.70, 0.75, 0.80, 0.85, 0.90, 0.95, 1.00, 1.10, 1.20, 1.30, 1.40, 1.50, 1.60, 1.70, 1.80, 1.90, 2.00, 2.10, 2.20, 2.30, 2.40, 2.50, 2.60, 2.70, 2.80, 2.90, 3.00, 3.10, 3.20, 3.30, 3.40, 3.50, 3.60, 3.70, 3.80, 3.90, 4.00, 4.50, 5.00, 5.50, or 6.00, when the fuel provided to the combustor comprises sustainable aviation fuel, or a sustainable aviation fuel blend comprising up to 100 percent sustainable aviation fuel. The percentage $CO_2$ emissions index (EI) may be expressed in kg of $CO_2$ per kg of fuel. The percentage reduction provided may be in an inclusive range bounded by any two of the values in the previous sentence (i.e. the values may form upper or lower bounds), for example in the range of from 0.40 to 2.50, from 0.42 to 2.08, or from 0.43 to 2.08.

Purely by way of non-limitative example, the reduction in percentage $CO_2$ emissions index (EI) may result from the fuel provided to the combustor comprising a hydrogen mass fraction percentage of greater than any one of the following: 13.40, 13.41, 13.42, 13.43, 13.44, 13.45, 13.46, 13.47, 13.48, 13.49, 13.50, 13.51, 13.52, 13.53, 13.54, 13.55, 13.56, 13.57, 13.58, 13.59, 13.60, 13.65, 13.70, 13.75, 13.80, 13.85, 13.90, 13.95, 14.00, 14.10, 14.20, 14.30, 14.40, 14.50, 14.60, 14.70, 14.80, 14.90, 15.00, 15.10, 15.20, 15.30, 15.40, 15.50, 15.60, 15.70, 15.80, 15.90, 16.00, 16.50, 17.00, or 17.50. The hydrogen mass fraction percent of the fuel may be in an inclusive range bounded by any two of the values in the previous sentence (i.e. the values may form upper or lower bounds), for example in the range of from 13.41 to 15.30, or from 13.42 to 15.30.

In use, at any one of more of the operating conditions and/or thrust settings disclosed or described herein, a reduction in percentage $CO_2$ per MJ of fuel energy, provided by any one or more of the gas turbine engine configurations disclosed or described herein, may be greater than or equal to any of the following: 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.22, 0.24, 0.26, 0.28, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.10, 1.20, 1.30, 1.40, 1.50, 1.60, 1.70, 1.80, 1.90, 2.00, 2.10, 2.20, 2.30, 2.40, 2.50, 2.60, 2.70, 2.80, 2.90, 3.00, 3.10, 3.20, 3.30, 3.40, 3.50, 3.60, 3.70, 3.80, 3.90, 4.00, 4.10, 4.20, 4.30, 4.40, 4.50, 4.60, 4.70, 4.80, 4.90, 5.00, 5.50, 6.50, 7.00, or 7.50, when the fuel provided to the combustor comprises sustainable aviation fuel, or a sustainable aviation fuel blend comprising up to 100 percent sustainable aviation fuel. The percentage reduction provided may be in an inclusive range bounded by any two of the values in the previous sentence (i.e. the values may form upper or lower bounds), for example in the range of from 0.8. to 5.00, from 0.88 to 4.75, or from 0.89 to 4.75.

Purely by way of non-limitative example, the reduction in percentage $CO_2$ per MJ of fuel energy may result from the fuel provided to the combustor comprising a specific fuel energy (in MJ per kg) of greater than any one of the following: 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.5, 45.0, 45.5, or 46.0. The specific fuel energy of the fuel may be in an inclusive range bounded by any two of the values in the previous sentence (i.e. the values may form upper or lower bounds), for example in the range of from 42.8 to 45.0, from 43.0 to 44.5, or from 43.0 to 44.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter contained or described herein may be applied to any aspect and/or combined with any other feature or parameter contained or described herein.

Except where mutually exclusive, any parameter or value contained or described herein may be applied to and/or combined with any one or more further parameters and/or values contained or described herein. For example, a first parameter or value contained or described herein (for example, parameter A) may be applied to and/or combined with any one or more further parameters and/or values contained or described herein (for example, any one or more of parameter B; parameter C; and parameter D, and so on) to express a product or quotient of their relationship. For example, the skilled person would understand that where parameter A is disclosed in separation to parameter B, a product of their relationship may be expressed as, for example, B*A, a quotient of their relationship may be expressed as, for example, A/B, B/A, or any such further application, combination, or function of parameter A relative to parameter B, as required.

BRIEF DESCRIPTION OF THE DRAWINGS

Embodiments will now be described by way of example only with reference to the accompanying drawings, in which.

DETAILED DESCRIPTION OF THE DISCLOSURE

Figure 1:
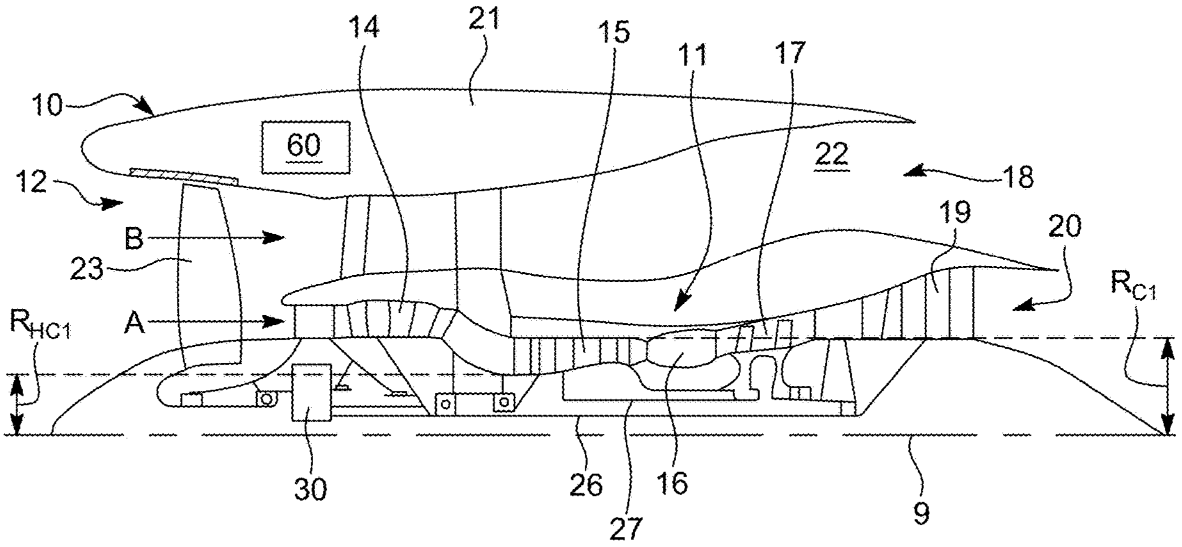
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a first, low pressure shaft 26 and an epicyclic gearbox 30. An engine controller 60, which may be an Electronic Engine Controller (EEC) or Full Authority Digital Engine Controller (FADEC), is also shown. The controller 60 is configured to control an operation of the gas turbine engine 10, for example in response to inputs from a pilot or autopilot system. The controller may, for example, adjust parameters relating to fuel metering and variable vane scheduling to implement a desired operating point, for example cruise conditions.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting second, high pressure shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
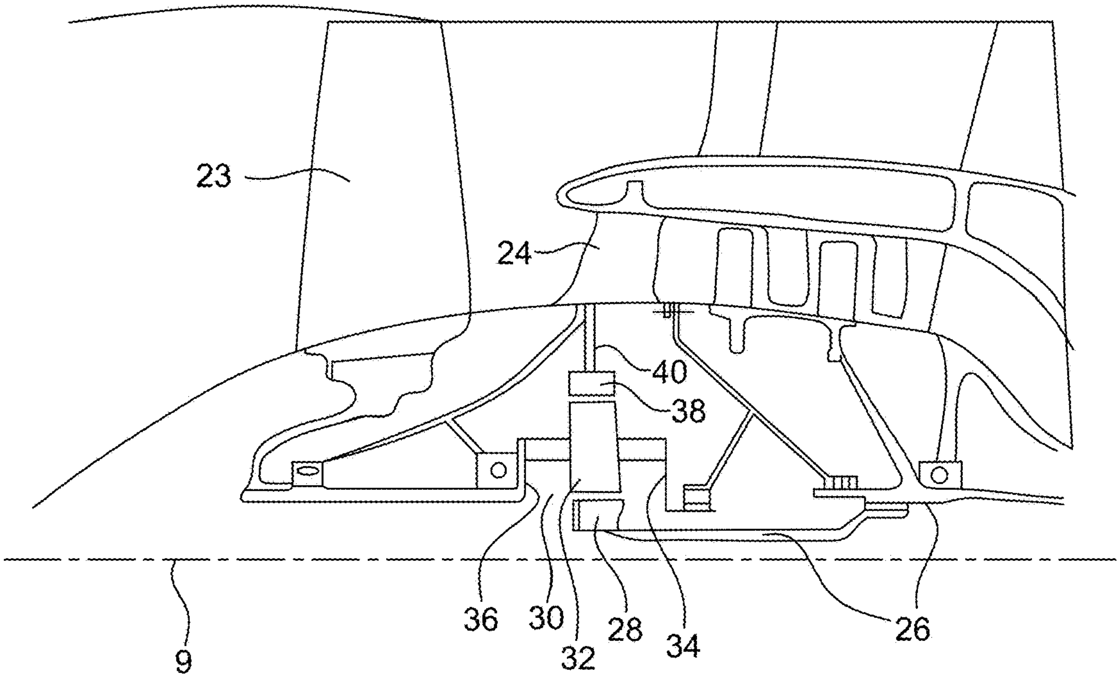
FIG. 2 is a close up sectional side view of an upstream portion of the geared gas turbine engine of FIG. 1.

An exemplary arrangement for a geared fan gas turbine engine 10 is shown in FIG. 2. The low pressure turbine 19 (see FIG. 1) drives the low pressure shaft 26, which is coupled to a sun wheel, or sun gear, 28 of the epicyclic gearbox 30. The low pressure shaft 26 may be referred to as an input shaft for the epicyclic gearbox 30. Radially outward of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 through an output fan shaft in order to drive the fan 23 in rotation about the engine axis 9. Radially outward of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the output fan shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
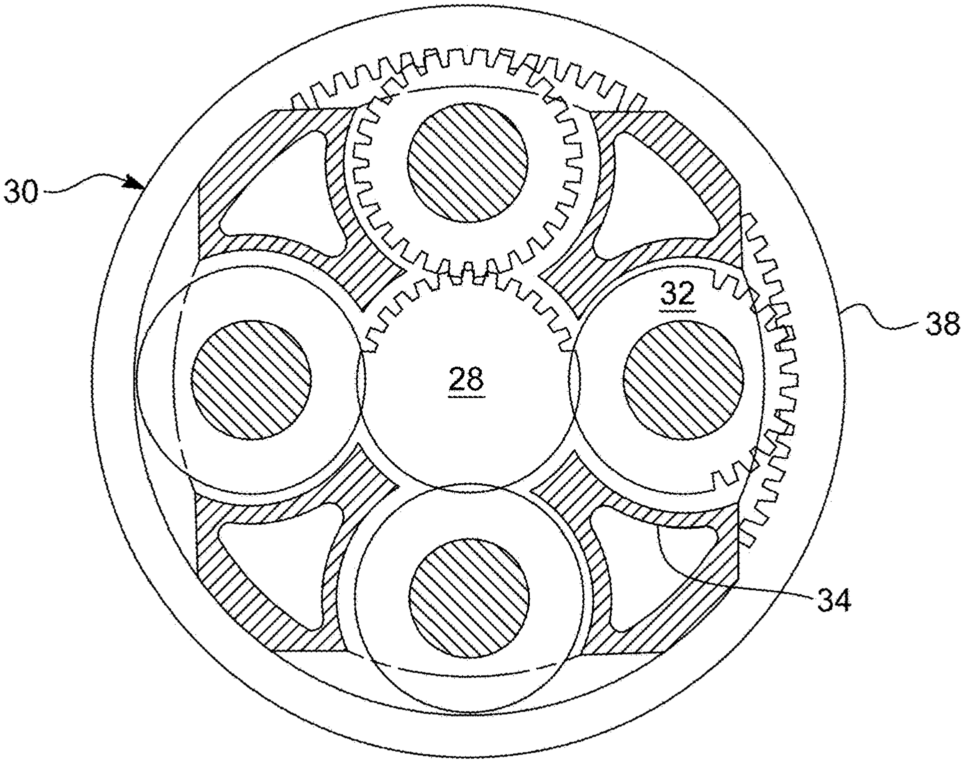
FIG. 3 is a partially cut-away view of a gearbox for the geared gas turbine engine of FIG. 1.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32, for example five planet gears 32.

The epicyclic gearbox 30 illustrated by way of example in FIGS. 2 and 3 is of the planetary type, in that the planet carrier 34 is coupled to the output fan shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 2 and FIG. 3 is by way of example only, and various alternatives are contemplated. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output fan shaft and the stationary supporting structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, any arrangement of gearbox styles (for example star or planetary), support structures, input and output shaft arrangement, and bearing locations may be employed.

Optionally, the gearbox may drive additional and/or alternative components (e.g. the intermediate pressure compressor and/or a booster compressor).

Other gas turbine engines to which the principles disclosed herein may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle (the bypass exhaust nozzle 18) that is separate to and radially outside the core exhaust nozzle 20. However, this should not be construed as limiting, and in alternative arrangements contemplated herein the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Figure 4:
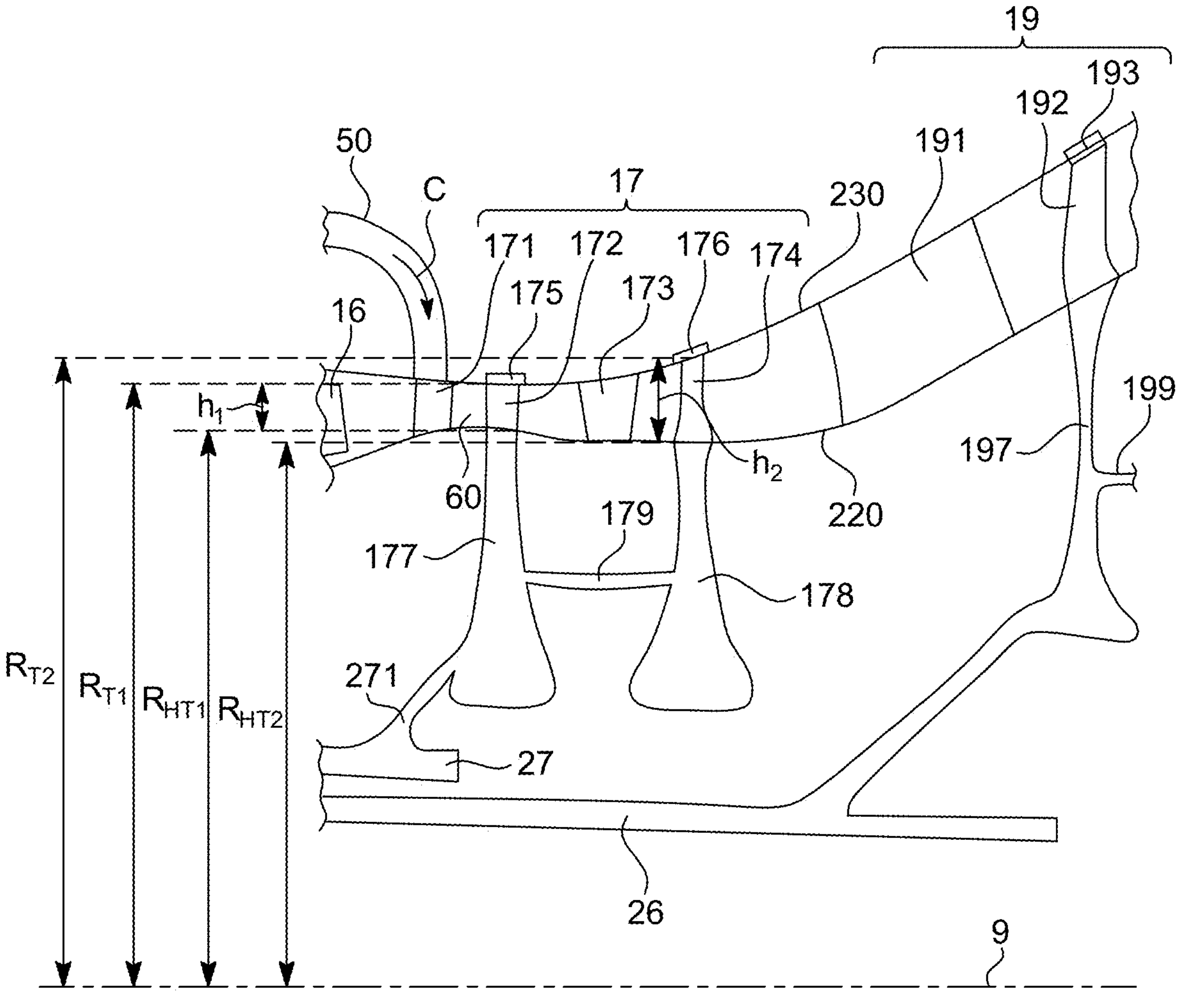
FIG. 4 is a close up sectional side view of a turbine section of the geared gas turbine engine of FIG. 1.

FIG. 4 shows the turbine section of the geared gas turbine engine 10 in more detail. The turbine section, which is downstream of the combustor 16, includes the high pressure turbine 17 and the low pressure turbine 19 downstream of the high pressure turbine 17. It is noted that only an upstream portion of the low pressure turbine 19 is shown in FIG. 4.

In this example, and in accordance with some embodiments described herein, the high pressure turbine 17 is a two-stage high pressure turbine comprising, in flow series, a first turbine stage and a second turbine stage. The first turbine stage comprises a first set of stator vanes 171 (e.g., nozzle guide vanes, NGVs) and a first plurality of rotating turbine blades 172. The second turbine stage comprises a second set of stator vanes 173 (e.g., NGVs) and a second plurality of rotating turbine blades 174. Seal segments 175, 176 may be provided radially outside the radially outer tips of the turbine blades 172, 174 to reduce or prevent airflow passing around the tips of the turbine blades 172, 174 at the outer annulus 230. The first plurality of turbine blades 172 are secured, at their radially inner ends, or 'roots', to a first turbine disc 177, which is itself connected to the high pressure engine shaft 27 that rotates about the principal engine axis 9. The second plurality of turbine blades 174 are secured, at their radially inner end, or roots, to a second turbine disc 178, which is likewise connected to the high pressure engine shaft 27. Thus, the turbine discs 177, 178 and their associated turbine blades 172, 174 rotate together at a common angular speed (rpm). In the illustrated example, there is no direct connection between the second stage turbine disc 178 and the high pressure shaft 27. Instead, the first turbine disc 177 is connected to the high pressure shaft 27 via a connecting arm 271, and the first and second stage turbine discs 177, 177 are connected by a link member 179.

The low pressure turbine 19 is shown to include a set of stator vanes 191 and a plurality of turbine blades 192 downstream of the stator vanes 191. Seal segments 193 may be provided radially outside the radially outer tips of the turbine blades 192 to reduce or prevent airflow passing over the tips of the turbine blades 192 at the outer annulus 230. The turbine blades 192 are secured, at their roots, to a turbine disc 197, which is itself connected to the low pressure engine shaft 26 that rotates about the principal engine axis 9. As noted above, only an upstream portion of the low pressure turbine 19, comprising a single stage, is illustrated in FIG. 4. However, as can be seen from the link member 199, the rotor disc 197 may be connected to one or more additional low pressure turbine stages.

In use, hot combustion products from the combustor 16 flow through the turbine section, expanding through the high pressure turbine 17 and low pressure turbine 19, driving rotation of the turbines and the engine shafts 26, 27. The temperature of the hot combustion products, particularly in the vicinity of the high pressure turbine 17, is typically very high. For example, the turbine entry temperature, defined as the maximum stagnation temperature at a position 60 immediately upstream of the rotating turbine blades 172 of the first high pressure turbine stage, may be about 1300 K or even higher. To accommodate the high temperatures, a cooling airflow C is bled from one or more of the compressor sections 14, 15 and delivered to the high pressure turbine 17 via one or more conduits 50. It is noted that although FIG. 4 shows a single cooling airflow C being delivered to a single, specific location in the high pressure turbine 17, this is merely for ease of illustration. The cooling airflow C may be extracted from multiple locations in the low pressure compressor 14 and/or high pressure compressor 15 and delivered to multiple locations in the high pressure turbine 17, including the stator vanes 171, 173 of one or both of the first and second high pressure turbine stages, and the turbine blades 172, 174 of one or both of the first and second high pressure turbine stages.

Figure 5:
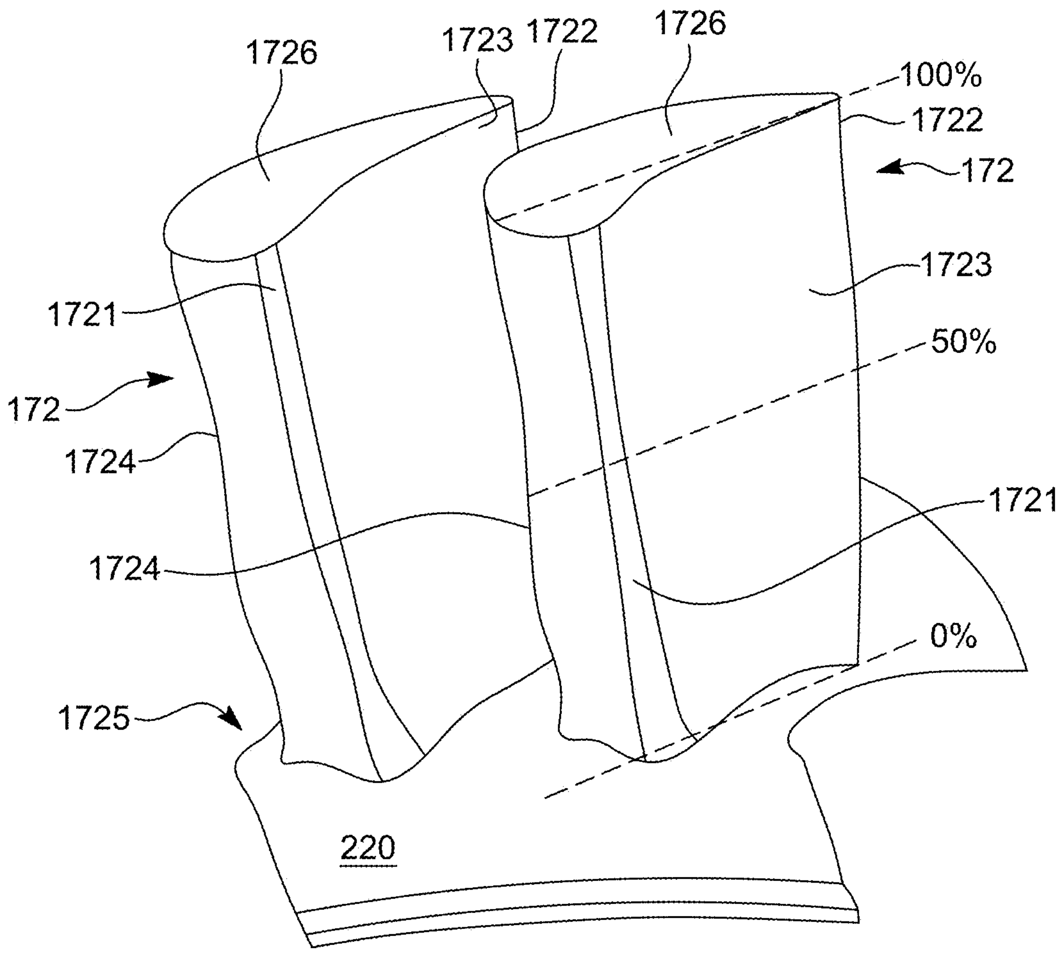
FIG. 5 is a perspective view of a portion of a rotor of one stage of a high pressure turbine of the geared gas turbine engine of FIG. 1, showing two adjacent turbine blades.

FIG. 5 is a perspective view of a portion of one rotor stage of the high pressure turbine 17. In this example the first rotor stage is described, but it should be appreciated the following description also applies to the second rotor stage, if present.

Two circumferentially adjacent turbine blades 172 are shown. Each turbine blade 172 forms an aerofoil that has a leading edge 1721, a trailing edge 1722, a pressure surface 1723 extending chordwise between the leading edge 1721 and the trailing edge 1722, and a suction surface 1724 extending between the leading edge 1721 and the trailing edge 1722 opposite the pressure surface 1723. In other words, the pressure surface 1723 and the suction surface 1724 meet at the leading edge 1721 and again meet at the trailing edge 1722. Each turbine blade 172 also extends in a spanwise, generally radial, direction between an inner radius and an outer radius. At the inner radius 1725, also referred to herein as the 0 percent spanwise position or the 'hub', the turbine blade 172 meets the inner annulus 220 of the high pressure turbine flow path. Although not visible in FIG. 5, the turbine blade 172 may have a root portion radially below the inner annulus 220 that secures the turbine blade 172 to the turbine disc 177. At the outer radius, also referred to herein as the 100 percent spanwise position, is the tip 1726 of the turbine blade 172. As noted previously, the gap between the tip 1726 of the turbine blades 172 and the outer annulus 230 is kept small, optionally using sealing members 175. Half the radial/spanwise distance between the hub and the tip is the midspan position, also referred to herein as the 50 percent spanwise position of the turbine blade 172.

Figure 6:
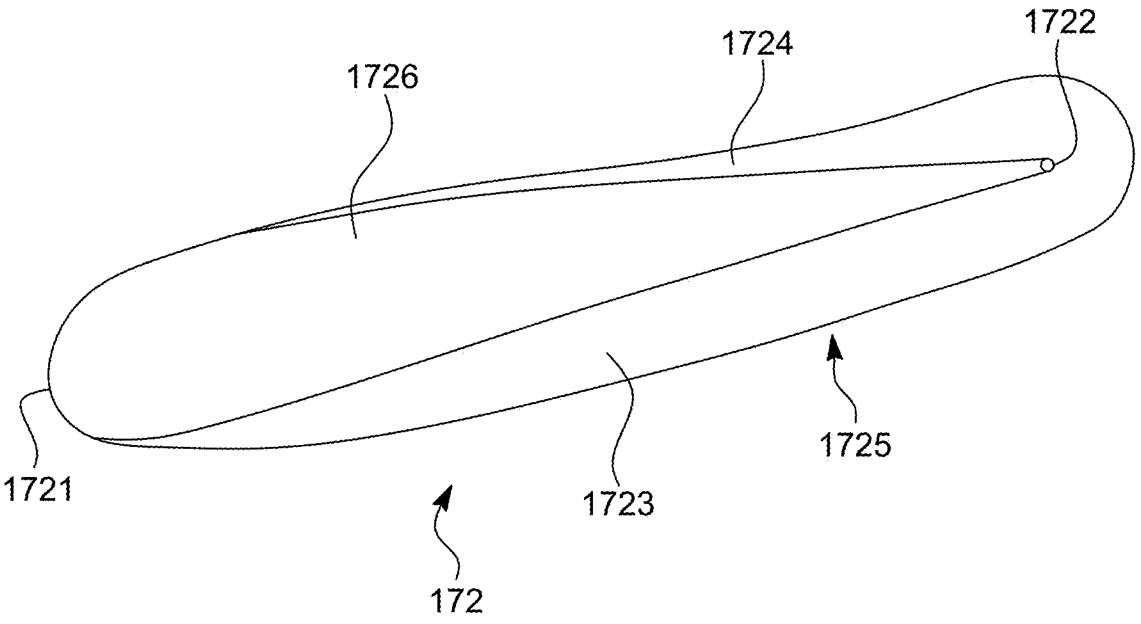
FIG. 6 is a top-down view of one turbine blade of the high pressure turbine of FIG. 5.

FIG. 6 is a top-down view of a turbine blade 172, i.e., a view looking radially inwards, in the spanwise direction, from the tip 1726 of the turbine blade 172 towards the hub and the central engine axis 9. The turbine blade 172 has a complex three-dimensional shape and, as is apparent from FIG. 6, the cross-section is different for each spanwise position. For example, considering the cross-section of the turbine blade 172 at the tip 1726 (i.e., the 100 percent spanwise position) and cross-section of the turbine blade 172 the hub 1725 (i.e., the 0 percent spanwise position), both of which can be seen from FIG. 6, it is clear that the profiles are different.

For each spanwise position, the turbine blade 172 may be characterized by its thickness to chord ratio, $\tau$, defined as the thickness of the turbine blade, t, divided by the chord length, c, of the turbine blade: $\tau = t/c$. The definitions of the chord length, c, and the thickness, t, are illustrated by FIG. 7, which shows the cross-section of the turbine blade 172 for one spanwise position.

The chord length, c, is defined as the length of the chord 1727, which is the straight line that connects the leading edge 1721 and the trailing edge 1723 of the turbine blade 172. It is noted that in FIG. 7, the turbine blade 172 has, without loss of generality, been oriented so that the chord 1727 is parallel to the x-axis.

Figure 7:
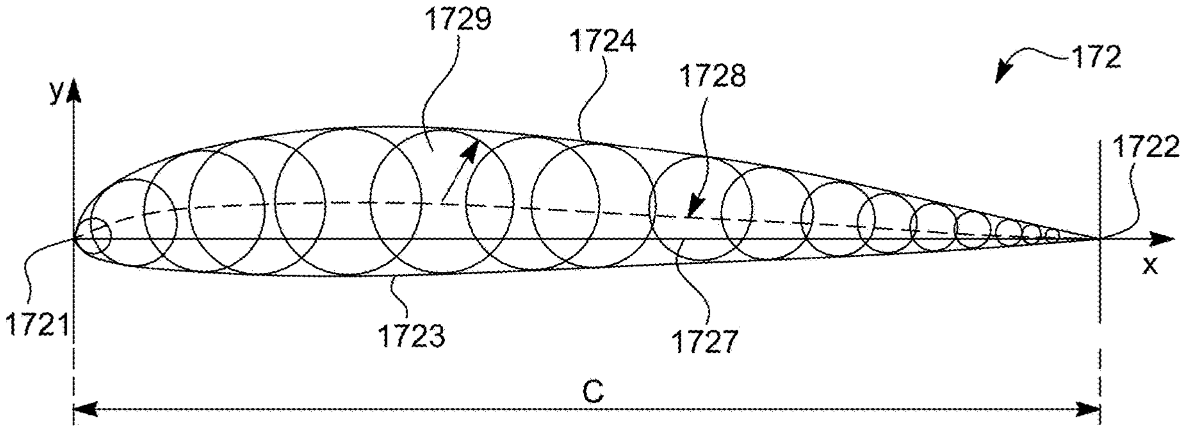
FIG. 7 shows a turbine blade in cross-section at one spanwise position, illustrating the chord length and thickness of the turbine blade.

To define the thickness, we first define the camber line 1728, shown in FIG. 7 as the dotted curve. For each chordwise position (i.e., for each position along x-axis in FIG. 7), there is a point that is exactly half the distance, measured perpendicular to the chordwise direction (i.e. parallel to the y-axis in FIG. 7), between the pressure surface 1723 and the suction surface 1724 of the turbine blade 172. The camber line 1728 is the locus of these points, i.e., the camber line 1728 the locus of points that, for each chordwise position of the turbine blade 172, are half-way between the pressure surface 1723 and the suction surface 1724. For each respective point on the camber line 1728, there is a respective circle that is centred on the point and has a radius such that the circumference of the circle is tangent to (i.e., touches but does not cross) both the pressure surface 1723 and the suction surface 1724. The thickness, t, is equal to the diameter of the largest of these circles. The largest circle is labelled 1729 in FIG. 7.

As noted previously, the high pressure turbine 17 of a gas turbine engine 10 operates at both high speeds and high temperatures, and this causes stresses in the components of the high pressure turbine 17. It is consequently common for components of the high pressure turbine 17, particularly the first-stage turbine disc 177, to be the most life-limited component of the engine 10. Since it is the most life-limited component that determines the Time Before Overhaul (TBO) of the engine, which temporarily takes the engine 10 out of commercial operation, any improvement to the life of components of the high pressure turbine 17 is of great advantage. Embodiments described herein may improve the life of components of the high pressure turbine 17, for example by reducing stresses in the turbine disc(s) and/or turbine blades, without a significant impact in terms of, for example, component mass and cost.

A first group of embodiments relates to the profile of the turbine blades 172, 174 of the high pressure turbine 17. In general, increasing the thickness, t, of a turbine blade 172, 174 reduces the blade loading and reduces the rotational speed of the turbine which, for a given disc diameter, reduces stresses in the disc 177, 178, particularly in the regions of the disc 177, 178 where the blades 172, 174 are secured to the disc 177, 178, and improves the disc life. However, increasing the thickness of the blades 172, 174 increases their mass, and this may have a significant impact on total engine weight given each rotor stage includes many turbine blades. Such additional mass in the rotating parts of the turbine 17 may be particularly problematic in an engine 10 featuring a reduction gearbox 30, for example due to the use of a more slender engine core that may be more prone to deflection. The inventors have identified sweet spots in the profiles of the turbine blades 172, 174 that may provide improved high pressure turbine durability while balancing any increase in, e.g., mass.

A turbine blade 172 of the first stage of the high pressure turbine 17 may have a thickness to chord ratio, measured at the 100 percent spanwise position, $\tau_{tip,1}$, of between 0.11 and 0.18. Additionally or alternatively, the turbine blade 172 may have a thickness to chord ratio, measured at the 50 percent spanwise position, $\tau_{mid,1}$, of between 0.19 and 0.29. Additionally or alternatively, the turbine blade 172 may have a thickness to chord ratio, measured at the 0 percent spanwise position, $\tau_{hub,1}$, of between 0.24 and 0.38. Tables 1-3 illustrate exemplary values of $\tau_{tip,1}$, $\tau_{mid,1}$ and $\tau_{hub,1}$.

TABLE 1

| $t_{tip,1}$ | $c_{tip,1}$ | $\tau_{tip,1}$ |
|---|---|---|
| 4.4 mm | 37.3 mm | 0.118 |
| 5.0 mm | 30.1 mm | 0.166 |
| 6.2 mm | 40.8 mm | 0.152 |

TABLE 2

| $t_{mid,1}$ | $c_{mid,1}$ | $\tau_{mid,1}$ |
|---|---|---|
| 6.8 mm | 29.6 mm | 0.230 |
| 9.7 mm | 48.5 mm | 0.200 |
| 12.2 mm | 46.4 mm | 0.263 |

TABLE 3

| $t_{hub,1}$ | $c_{hub,1}$ | $\tau_{hub,1}$ |
|---|---|---|
| 7.6 mm | 31.1 mm | 0.244 |
| 8.6 mm | 28.0 mm | 0.307 |
| 14.2 mm | 38.4 mm | 0.370 |

In some specific embodiments, $\tau_{tip,1}$ may be between 0.12 and 0.16, $\tau_{mid,1}$ may be between 0.21 and 0.27, and/or $\tau_{hub,1}$ may be between 0.27 and 0.35.

Where the high pressure turbine 17 has two stages, a turbine blade 174 of the second stage of the high pressure turbine 17 may have a thickness to chord ratio, measured at the 100 percent spanwise position, $\tau_{tip,2}$, of between 0.10 and 0.15. Additionally or alternatively, the turbine blade 174 may have a thickness to chord ratio, measured at the 50 percent spanwise position, $\tau_{mid,2}$, of between 0.15 and 0.23. Additionally or alternatively, the turbine blade 174 may have a thickness to chord ratio, measured at the 0 percent spanwise position, $\tau_{hub}$, of between 0.28 and 0.42. Tables 4-6 illustrate exemplary values of $\tau_{tip,2}$, $\tau_{mid,2}$ and $\tau_{hub,2}$.

TABLE 4

| $t_{tip,2}$ | $c_{tip,2}$ | $\tau_{tip,2}$ |
|---|---|---|
| 3.5 mm | 29.1 mm | 0.120 |
| 4.9 mm | 37.4 mm | 0.131 |
| 5.5 mm | 36.9 mm | 0.149 |

TABLE 5

| $t_{mid,2}$ | $c_{mid,2}$ | $\tau_{mid,2}$ |
|---|---|---|
| 5.0 mm | 24.0 mm | 0.208 |
| 6.4 mm | 38.8 mm | 0.165 |
| 8.2 mm | 42.9 mm | 0.191 |

TABLE 6

| $t_{hub,2}$ | $c_{hub,2}$ | $\tau_{hub,2}$ |
|---|---|---|
| 9.1 mm | 30.3 mm | 0.300 |
| 9.4 mm | 25.3 mm | 0.372 |
| 13.7 mm | 40.1 mm | 0.342 |

In some specific embodiments, $\tau_{tip,2}$ may be between 0.11 and 0.13, $\tau_{mid,2}$ may be between 0.17 and 0.21, and/or $\tau_{hub,2}$ may be between 0.32 and 0.38.

In some embodiments, wear of the first stage of the high pressure turbine 17 may be particularly reduced if a sum, $\tau_{tip,1}+\tau_{mid,1}$, of the thickness to chord ratios at the 100 percent and 50 percent spanwise positions of a turbine blade 172 of the first stage of the high pressure turbine 17 is between 0.30 and 0.46, a sum, $\tau_{tip,1}+\tau_{hub,1}$, of the thickness to chord ratios at the 100 percent and 0 percent spanwise positions of a turbine blade 172 of the first stage of the high pressure turbine 17 is between 0.35 and 0.56, and/or a sum, $\tau_{mid,1}+\tau_{hub,1}$, of the thickness to chord ratios at the 50 percent and 0 percent spanwise positions of a turbine blade 172 of the first stage of the high pressure turbine 17 is between 0.43 and 0.68. Table 7 illustrates exemplary values:

TABLE 7

| | Example 1 | Example 2 |
|---|---|---|
| $t_{tip,1}$ | 5.2 mm | 6.4 mm |
| $t_{mid,1}$ | 8.8 mm | 10.0 mm |
| $t_{hub,1}$ | 11.0 mm | 12.1 mm |
| $c_{tip,1}$ | 38.1 mm | 41.1 mm |
| $c_{mid,1}$ | 34.9 mm | 39.2 mm |
| $c_{hub,1}$ | 34.2 mm | 36.3 mm |
| $\tau_{tip,1} + \tau_{mid,1}$ | 0.39 | 0.41 |
| $\tau_{tip,1} + \tau_{hub,1}$ | 0.46 | 0.49 |
| $\tau_{mid,1} + \tau_{hub,1}$ | 0.57 | 0.59 |

In some embodiments, wear of the second stage of the high pressure turbine 17 may be particularly reduced if a sum, $\tau_{tip,2}+\tau_{mid,2}$, of the thickness to chord ratios at the 100 percent and 50 percent spanwise positions of a turbine blade 174 of the second stage of the high pressure turbine 17 is between 0.24 and 0.38, a sum, $\tau_{tip,2}+\tau_{hub,2}$, of the thickness to chord ratios at the 100 percent and 0 percent spanwise positions of a turbine blade 174 of the second stage of the high pressure turbine 17 is between 0.37 and 0.57, and/or a sum, $\tau_{mid,2}+\tau_{hub,2}$, of the thickness to chord ratios at the 50 percent and 0 percent spanwise positions of a turbine blade 174 of the second stage of the high pressure turbine 17 is between 0.42 and 0.65. Table 8 illustrates exemplary values:

TABLE 8

| | Example 1 | Example 2 |
|---|---|---|
| $t_{tip,2}$ | 4.1 mm | 5.1 mm |
| $t_{mid,2}$ | 6.0 mm | 7.1 mm |
| $t_{hub,2}$ | 10.2 mm | 12.5 mm |
| $c_{tip,2}$ | 33.8 mm | 38.4 mm |
| $c_{mid,2}$ | 32.2 mm | 38.0 mm |
| $c_{hub,2}$ | 29.9 mm | 35.1 mm |
| $\tau_{tip,2} + \tau_{mid,2}$ | 0.31 | 0.32 |
| $\tau_{tip,2} + \tau_{hub,2}$ | 0.46 | 0.49 |
| $\tau_{mid,2} + \tau_{hub,2}$ | 0.53 | 0.54 |

In another group of embodiments contemplated, the thickness to chord ratios at the 100 percent, 50 percent and 0 percent spanwise positions may be higher than those described above and achieve high levels of turbine durability. For example, in another group of contemplated embodiments, the first stage of the high pressure turbine may have values of $\tau_{tip,1}$ between 0.18 and 0.30, values of $\tau_{mid,1}$ between 0.23 and 0.35, and values of $\tau_{hub,1}$ between 0.28 and 0.45.

As noted above, the first and second turbine stages of the high pressure turbine 17 are coupled, for example via a link member 179 that connects their respective discs 177, 178, such that they rotate together. Wear reduction of the high pressure turbine discs 177, 178 and blades 172, 174 may therefore be optimized by co-selecting the thickness to chord ratios of the turbine blades 172, 174. In one group of embodiments, the thicknesses and chords of the first and second stage turbine blades 172, 174 may be selected so that a ratio of $\tau_{tip,1}$ and $\tau_{tip,2}$ is between 0.89 and 1.49. Additionally or alternatively, a ratio of $\tau_{mid,1}$ and $\tau_{mid,2}$ is between 0.96 and 1.62, and/or a ratio of $\tau_{hub,1}$ and $\tau_{hub,2}$ is between 0.65 and 1.13. Selecting blade thickness and chord values so that one and, optionally, more than one of these ratios is satisfied may improve stresses in the disc 177, 178, particularly in the blade root region, while retaining good turbine performance. Table 9 illustrates exemplary values of the blade thicknesses, chords and ratios for the first and second high pressure turbine stages.

TABLE 9

| | Example 1 | Example 2 |
|---|---|---|
| $t_{1,\ tip}$ | 5.2 mm | 6.4 mm |
| $t_{2,\ tip}$ | 4.1 mm | 5.1 mm |
| $t_{1,\ mid}$ | 8.8 mm | 10.0 mm |
| $t_{2,\ mid}$ | 6.0 mm | 7.1 mm |
| $t_{1,\ hub}$ | 11.0 mm | 12.1 mm |
| $t_{2,\ hub}$ | 10.2 mm | 12.5 mm |
| $c_{1,\ tip}$ | 38.1 mm | 41.1 mm |
| $c_{2,\ tip}$ | 33.8 mm | 38.4 mm |
| $c_{1,\ mid}$ | 34.9 mm | 39.2 mm |
| $c_{2,\ mid}$ | 32.2 mm | 38.0 mm |
| $c_{1,\ hub}$ | 34.2 mm | 36.3 mm |
| $c_{2,\ hub}$ | 29.9 mm | 35.1 mm |
| $\tau_{tip,\ 1}/\tau_{tip,\ 2}$ | 1.13 | 1.17 |
| $\tau_{mid,\ 1}/\tau_{mid,\ 2}$ | 1.35 | 1.37 |
| $\tau_{hub,\ 1}/\tau_{hub,\ 2}$ | 0.94 | 0.94 |
| $\tau_{tip,\ 1} + \tau_{tip,\ 2}$ | 0.26 | 0.29 |
| $\tau_{mid,\ 1} + \tau_{tip,\ 2}$ | 0.44 | 0.44 |
| $\tau_{hub,\ 1} + \tau_{hub,\ 2}$ | 0.66 | 0.69 |

As illustrated in Table 9, sums of the thickness to chords ratios may also be constrained to improve the balance between high pressure turbine wear and performance. The sum of $\tau_{tip,1}$ and $\tau_{tip,2}$ may be constrained to be between 0.20 and 0.33, the sum of $\tau_{mid,1}$ and $\tau_{mid,2}$ may be constrained to be between 0.31 and 0.53, and/or the sum of $\tau_{hub,1}$ and $\tau_{hub,2}$ may be constrained to be between 0.49 and 0.84.

Referring again to FIG. 4, which is not to scale, a turbine hub radius, $R_{HT1}$, of the first stage of the high pressure turbine 17 is defined as a radial distance between the engine axis of rotation 9 and the inner annulus 220 at the first stage. In other words, the turbine hub radius, $R_{HT1}$, of the first stage of the high pressure turbine 17 is defined as the radial distance between the engine axis of rotation 9 and the inner radius, or 0 percent spanwise position, of the first stage turbine blades 172. Similarly, a turbine hub radius, $R_{HT2}$, of the second stage of the high pressure turbine 17 is defined as a radial distance between the engine axis of rotation 9 and the inner annulus 220 at the second stage, in other words the inner radius, or 0 percent spanwise position, of the second stage turbine blades 174. A turbine tip radius, $R_{T1}$, of the first stage of the high pressure turbine 17 is defined as a radial distance between the engine axis of rotation 9 and the tip of the first stage turbine blades 172, in other words the 100 percent spanwise position of the turbine blades 172. Similarly, a turbine tip radius, $R_{T2}$, of the second stage of the high pressure turbine 17 is defined as a radial distance between the engine axis of rotation 9 and the tip of the second stage turbine blades 174, in other words the 100 percent spanwise position of the turbine blades 174. For each of the first and second stage turbine blades 172, 174, there is also defined the blade height, $h_1$ and $h_2$, shown in FIG. 4. The blade height, $h_1$, of each turbine blade 172 of the first turbine stage is the difference between the turbine tip radius, $R_{T1}$ of the first stage and the turbine hub radius, $R_{HT1}$, of the first stage, i.e., $h_1=R_{T1}-R_{HT1}$. Similarly, the blade height, $h_2$, of each turbine blade 174 of the second turbine stage is the difference between the turbine tip radius, $R_{T2}$ of the second stage and the turbine hub radius, $R_{HT2}$, of the second stage, i.e., $h_2=R_{T2}-R_{HT2}$.

In a group of embodiments, which may be applied alone or in combination with the first embodiment, the values of the blade height and blade chords may be selected so that the aspects ratios of the turbine blades 172, 174 of the high pressure turbine 17, defined as the ratios of the blade heights and the chord lengths at the 100 percent spanwise position, reduce turbine wear. In accordance with these embodiments, the aspect ratio of the turbine blades 172 of the first stage, $AR_1=h_1/c_{1,tip}$, may be between 0.67 and 1.33, while the aspect ratio of the turbine blades 174 of the second stage, $AR_2=h_2/c_{2,tip}$, may be between 1.17 and 2.21. Optionally, a particularly good balance between wear and performance may be provided by a ratio, $AR_1/AR_2$ of between 0.40 and 0.79. Table 10 illustrates exemplary values:

TABLE 10

| | Example 1 | Example 2 |
|---|---|---|
| $h_1$ | 37.2 mm | 44.2 mm |
| $h_2$ | 63.4 mm | 71.7 mm |
| $c_{1,\ tip}$ | 38.1 mm | 41.1 mm |
| $c_{2,\ tip}$ | 33.8 mm | 38.4 mm |
| $AR_1$ | 0.98 | 1.08 |
| $AR_2$ | 1.88 | 1.87 |
| $AR_1/AR_2$ | 0.52 | 0.58 |
| $AR_1 + AR_2$ | 2.85 | 2.94 |

In another group of embodiments, which may be applied alone or in combination with the previous embodiments, a hub-to-tip ratio of the first stage and/or the second stage of the high pressure turbine 17 may be selected to reduce turbine wear while retaining engine efficiency. In particular, the inventors have appreciated that in order to retain engine efficiency while improving turbine life, it may be desirable to reduce the turbine blade tip speed compared with previously-considered designs. To do so without a significant impact on engine operating conditions, for example a significant reduction in the rotational speed of the high pressure shaft 27, the inventors have identified, e.g., lower ranges of values for the hub-to-tip ratios, $R_{HT1}/R_{T1}$ and $R_{HT2}/R_{T2}$, of the first and second stages of the high pressure turbine 17. In this group of embodiments, the turbine hub-to-tip ratio of the first stage, $R_{HT1}/R_{T1}$, may be between 0.50 and 0.92, yet the speed of rotation of the high pressure shaft, measured at cruise conditions, may be between 14000 rpm and 25000 rpm. The turbine hub-to-tip ratio of the first stage, $R_{HT2}/R_{T2}$, may be between 0.45 and 0.85, yet the speed of rotation of the high pressure shaft, measured at cruise conditions, may be between 14000 rpm and 25000 rpm. Table 11 illustrates exemplary values:

TABLE 11

| | Example 1 | Example 2 | Example 3 |
|---|---|---|---|
| HP Shaft Speed (Cruise) | 20500 rpm | 18200 rpm | 21500 rpm |
| $R_{HT1}$ | 225 mm | 214 mm | 244 mm |
| $R_{HT2}$ | 217 mm | 199 mm | 238 mm |

TABLE 11-continued

| | Example 1 | Example 2 | Example 3 |
|---|---|---|---|
| $R_{T1}$ | 321 mm | 261 mm | 285 mm |
| $R_{T2}$ | 339 mm | 265 mm | 294 mm |
| $R_{HT1}/R_{T1}$ | 0.70 | 0.82 | 0.86 |
| $R_{HT2}/R_{T2}$ | 0.64 | 0.75 | 0.81 |

In another embodiment, the hub-to-tip ratio(s) of the high pressure turbine may not be reduced or may not be reduced as much, and the speed of rotation of the high pressure shaft 27 may instead be reduced to reduce the turbine blade tip speed and thereby reduce turbine wear. In this case, to, e.g., maintain engine efficiency and operability, a hub-to-tip ratio of the high pressure compressor 15 may be adjusted. Referring again to FIG. 1, which is not to scale, a compressor hub radius, $R_{HC1}$, of a first stage of the high pressure compressor 15 is defined as a radial distance between the engine axis of rotation 9 and the inner annulus at the first stage, in other words the inner radius, or 0 percent spanwise position, of the first stage compressor blades. A compressor tip radius, $R_{C1}$, of the first stage of the high pressure compressor 15 is defined as a radial distance between the engine axis of rotation 9 and the tip of the first stage compressor blades, in other words the 100 percent spanwise position of the compressor blades. In the embodiment, the turbine hub-to-tip ratio of the first stage, $R_{HT1}/R_{T1}$, may be between 0.60 and 0.94, the compressor hub-to-tip ratio of the first stage, $R_{HC1}/R_{C1}$, may be between 0.36 and 0.62, and the speed of rotation of the high pressure shaft, measured at cruise conditions, may be between 13000 rpm and 21000 rpm. Table 12 illustrates exemplary values:

TABLE 12

| | Example 1 | Example 2 |
|---|---|---|
| HP Shaft Speed (Cruise) | 15300 rpm | 17500 rpm |
| $R_{HT1}/R_{T1}$ | 0.77 | 0.88 |
| $R_{HC1}/R_{C1}$ | 0.42 | 0.56 |

Figure 8:
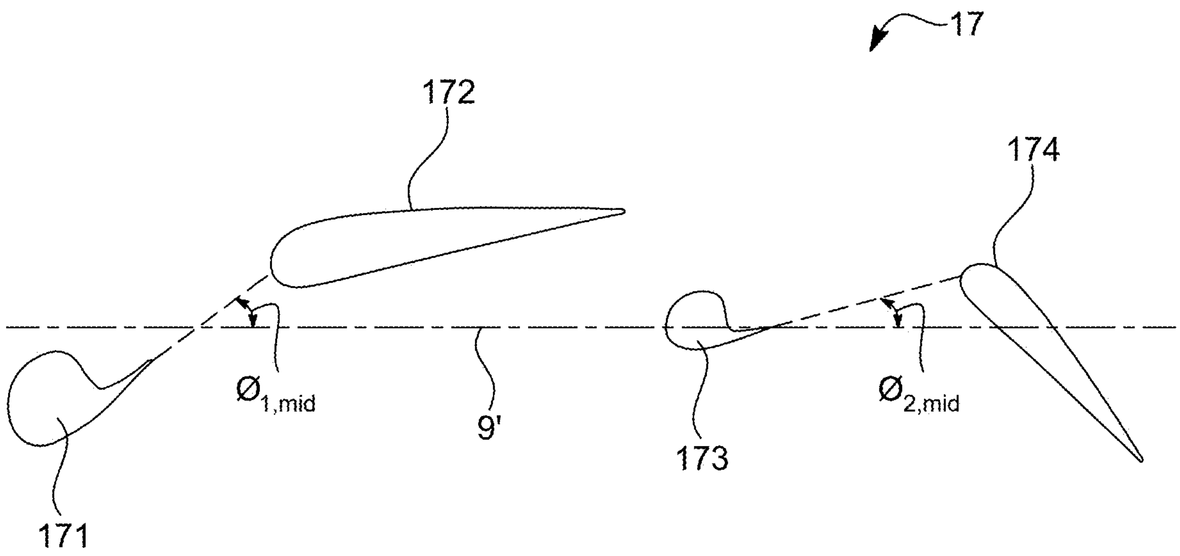
FIG. 8 is a partially schematic illustration of a two-stage high pressure turbine of the geared gas turbine engine of FIG. 1, showing the angles of attack of the first and second stages.

Referring again to FIG. 4, in use, the hot combustion products from the combustor 16 impinge on the stationary stator vanes 171 of the first stage of the high pressure turbine, which turn the airflow and direct it towards the leading edges 1721 of the turbine blades 172 of the first stage of the high pressure turbine. This is shown in more detail in FIG. 8, which is a partially schematic illustration of the high-pressure turbine 17. In FIG. 8, the dotted line 9' is a line parallel to the engine axis 9.

The combustion products from the combustor 16 enter the high pressure turbine section and encounter the stator vanes 171, which direct the airflow towards the leading edges 1721 of the turbine blades 172 of the first stage, which extract energy from the airflow. Before encountering the turbine blades 174 of the second stage, the airflow passes the second set of stator vanes 173, which direct the airflow towards the leading edges 1741 of the turbine blades 174 of the second stage, which extract energy from the airflow before the airflow moves to the low pressure turbine 19. For each of the first and second stages of the high pressure turbine 17, the angle formed between the engine axis 9 and the airflow, redirected from a respective one of the sets of stator vanes 171, 173 towards a respective one of the plurality of turbine blades 172, 174, is referred to as the angle of attack. Due to the complex profile of the leading edges of the turbine blades 172, 174, the angle of attack varies across the span of the turbine blades. Furthermore, the angle of attack is somewhat dependent on the speed of rotation of the turbine stage, due to the relative rotation. Herein, the angle of attack is defined at the 50 percent spanwise position of the turbine blades 172, 174 and at cruise conditions. Thus, the angle of attack, $\alpha_{1,mid}$, of a first turbine blade 172 of the first stage of the high pressure turbine is the angle formed between the principal axis of the engine 9 and an angle of incidence of an airflow through the high pressure turbine impinging on the 50 percent spanwise position of the turbine blade 172, as directed by the first set of stator vanes 171 at cruise conditions. Similarly, the angle of attack, $\alpha_{2,mid}$, of a second turbine blade 174 of the second stage of the high pressure turbine is the angle formed between the principal axis of the engine 9 and an angle of incidence of an airflow through the high pressure turbine impinging on the 50 percent spanwise position of the second turbine blade 174, as directed by the second set of stator vanes 173 at cruise conditions.

As discussed above, some embodiments described herein relate to sweet spots in the thickness to chord ratio of the high pressure turbine blades 172, 174 that improve turbine life, for example by reducing the loading on each turbine blade. The inventors have further appreciated that, in some cases, this may permit modified high pressure turbine angles of attack, $\alpha_{1,mid}$, $\alpha_{2,mid}$, and that modified values of the angle attack may increase the work done by each turbine blade, which may at least partially compensate for any reduction in work done caused by a reduction in blade loading. In some examples, the thickness-to-chord ratios described above may, for at least some portions of the turbine blade profiles, correspond to an increase in blade thickness compared to previously-considered designs, and this may allow for an increase in the angles of attack. In one group of embodiments, $\alpha_{1,mid}$ is between 10 degrees and 58 degrees, while $\alpha_{2,mid}$ is between −10 degrees and 40 degrees. A particularly good balance between enhancing the work done by each blade, while reducing turbine wear, may be provided where $\alpha_{1,mid}$ is between 25 and 52 degrees and $\alpha_{2,mid}$ is between 5 and 30 degrees. Table 13 illustrates exemplary values, including for the ratio $\alpha_{2,mid}/\alpha_{1,mid}$ which may, in some embodiments, be selected to between 0.22 and 0.92.

TABLE 13

| | Example 1 | Example 2 | Example 3 |
|---|---|---|---|
| $\alpha_{1, mid}$ (Cruise) | 38.7° | 48.3° | 30.9° |
| $\alpha_{2, mid}$ (Cruise) | 14.2° | 28.9° | 7.8° |
| $\alpha_{2, mid}/\alpha_{1, mid}$ | 0.37 | 0.59 | 0.25 |

Figure 9:
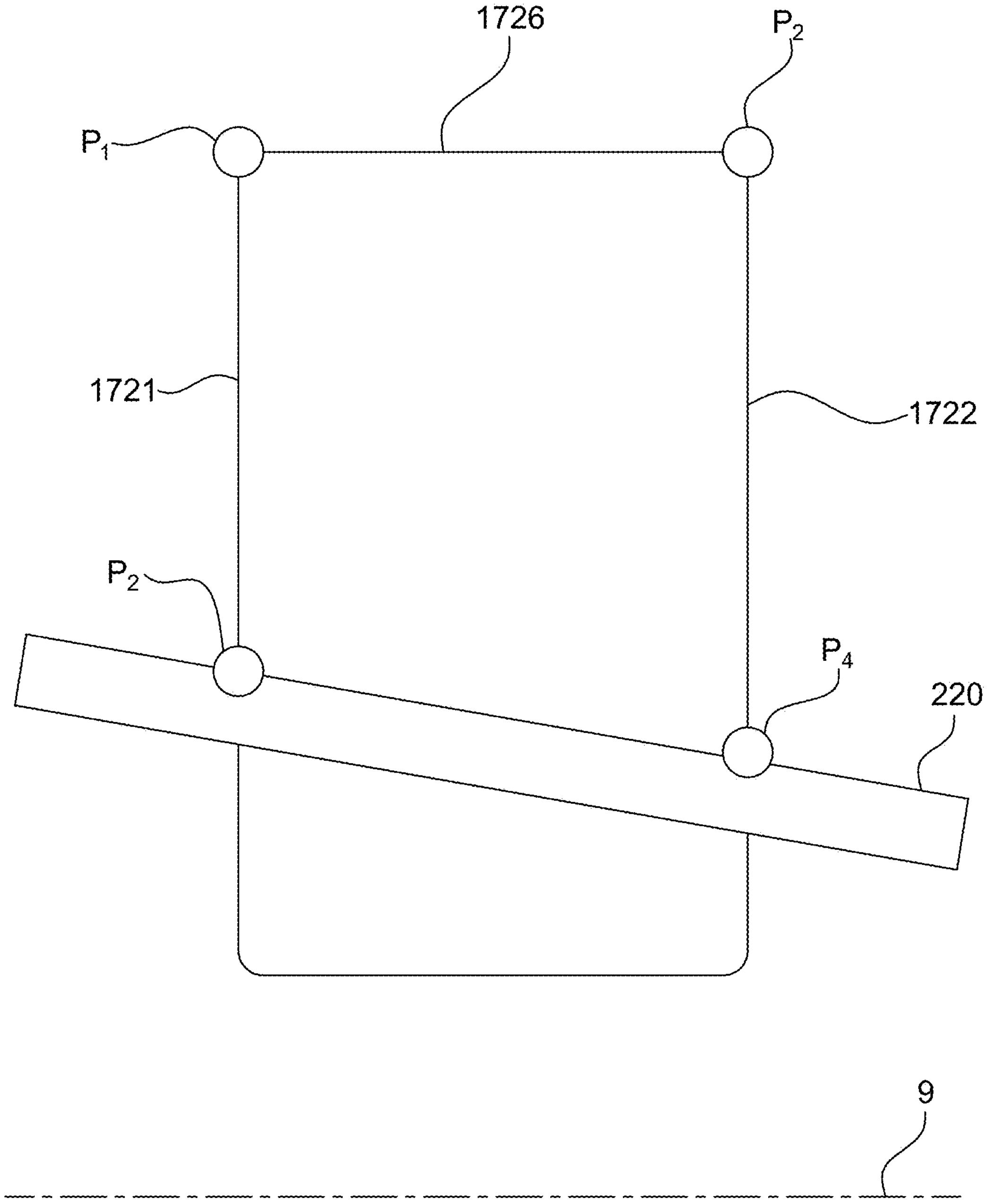
FIG. 9 is a partially schematic illustration of a turbine blade, showing the calculation of the mean blade radius.

Turning now to FIG. 9, this is a partially schematic illustration of a turbine blade 172, viewed in the circumferential directional. Although a turbine blade 172 of the first stage of the high pressure turbine 17 is labelled, the following description applies equally to a turbine blade 174 of the second stage of the high pressure turbine 17.

Four block points, $P_1$, $P_3$, $P_3$, $P_4$ (hereafter $P_{1-4}$) are illustrated. The first block point, $P_1$, is located at the tip (100 percent spanwise position) and the leading edge 1721 of the turbine blade. The second block point, $P_2$, is located at the tip (100 percent spanwise position) and the trailing edge 1722 of the turbine blade 172. The third block point, $P_3$, is located at the hub (0 percent spanwise position) at the leading edge 1721 of the turbine blade 172. The fourth block point, $P_4$, is located at the hub (0 percent spanwise position) at the trailing edge 1722 of the turbine blade 172. The turbine blade 172 has a mean radius, $R_{av}$, defined as the mean radius of the four block points $P_{1-4}$. In other words, $R_{av}$ is a quarter of the sum of: the radial distance between the engine axis 9 and the first block point $P_1$, the radial distance between the engine axis 9 and the second block point $P_2$, the radial distance between the engine axis 9 and the third block point $P_3$, and the radial distance between the engine axis 9 and the fourth block point $P_4$.

Several parameters may be defined based on the mean radius, $R_{av}$. The mean blade speed, U, of a turbine blade (e.g., turbine blade 172) is the speed of the blade (measured in metres per second, $ms^{-1}$) at the mean radius, $R_{av}$. Thus, if the angular speed of rotation of the high pressure shaft is ω (measured in hertz, Hz), the mean blade speed $U=\omega\times R_{av}$. The blade pitch, s, of a turbine stage is defined as $s=2\pi\times R_{av}/N_T$, where $N_T$ is the total number of turbine blades of the turbine stage (e.g., the number of blades 172 secured to the turbine disc 177).

The inventors have identified a relationship between the thickness, t, of the turbine blades 172, 174 of the high pressure turbine 17, the blade pitch, s, of the turbine stage to which the blades belong and the rate at which components of the high pressure turbine 17 wear due to, e.g., stresses. The value of a ratio of the thickness, t, of the turbine blade and the blade pitch, s, may be selected to reduce wear. A product of the thickness to chord ratio, τ, of the turbine blade and the blade pitch, s, may also be selected to reduce wear.

To reduce wear of the first stage of the high pressure turbine 17, a ratio of the thickness of the turbine blades 172 at the 100 percent spanwise position and the blade pitch, $s_1$, of the first turbine stage may be selected to be between 0.13 and 0.21. Additionally or alternatively, a ratio of the thickness of the turbine blades 172 at the 50 percent spanwise position and the blade pitch, $s_1$, of the first turbine stage may be selected to be between 0.21 and 0.35. Additionally or alternatively, a ratio of the thickness of the turbine blades 172 at the 0 percent spanwise position and the blade pitch, $s_1$, of the first turbine stage may be selected to be between 0.24 and 0.42. Tables 14-16 illustrate exemplary values:

TABLE 14

| $t_{tip,\,1}$ | $N_{T1}$ | $R_{av,\,1}$ | $t_{tip,\,1}/s_1$ |
|---|---|---|---|
| 4.4 mm | 47 | 208 mm | 0.16 |
| 5.0 mm | 44 | 201 mm | 0.17 |
| 6.2 mm | 42 | 233 mm | 0.18 |

TABLE 15

| $t_{mid,\,1}$ | $N_{T1}$ | $R_{av,\,1}$ | $t_{mid,\,1}/s_1$ |
|---|---|---|---|
| 6.8 mm | 47 | 208 mm | 0.24 |
| 9.7 mm | 44 | 201 mm | 0.34 |
| 12.2 mm | 42 | 233 mm | 0.35 |

TABLE 16

| $t_{hub,\,1}$ | $N_{T1}$ | $R_{av,\,1}$ | $t_{hub,\,1}/s_1$ |
|---|---|---|---|
| 7.6 mm | 47 | 208 mm | 0.27 |
| 8.6 mm | 44 | 201 mm | 0.30 |
| 14.2 mm | 42 | 233 mm | 0.41 |

To reduce wear of the second stage of the high pressure turbine 17, a ratio of the thickness of the turbine blades 174 at the 100 percent spanwise position and the blade pitch, $s_2$, of the second turbine stage may be selected to be between 0.12 and 0.19. Additionally or alternatively, a ratio of the thickness of the turbine blades 174 at the 50 percent spanwise position and the blade pitch, $s_2$, of the second turbine stage may be selected to be between 0.17 and 0.27. Additionally or alternatively, a ratio of the thickness of the turbine blades 174 at the 0 percent spanwise position and the blade pitch, $s_2$, of the second turbine stage may be selected to be between 0.29 and 0.48. Tables 17-19 illustrate exemplary values:

TABLE 17

| $t_{tip,\,2}$ | $N_{T2}$ | $R_{av,\,2}$ | $t_{tip,\,2}/s_2$ |
|---|---|---|---|
| 3.5 mm | 54 | 251 mm | 0.12 |
| 4.9 mm | 49 | 255 mm | 0.15 |
| 5.5 mm | 60 | 292 mm | 0.18 |

TABLE 18

| $t_{mid,\,2}$ | $N_{T2}$ | $R_{av,\,2}$ | $t_{mid,\,2}/s_2$ |
|---|---|---|---|
| 5.0 mm | 54 | 251 mm | 0.17 |
| 6.4 mm | 49 | 255 mm | 0.20 |
| 8.2 mm | 60 | 292 mm | 0.27 |

TABLE 19

| $t_{hub,\,2}$ | $N_{T2}$ | $R_{av,\,2}$ | $t_{mid,\,2}/s_2$ |
|---|---|---|---|
| 9.1 mm | 54 | 251 mm | 0.31 |
| 9.4 mm | 49 | 255 mm | 0.29 |
| 13.7 mm | 60 | 292 mm | 0.45 |

As noted above, the first and second turbine stages of the high pressure turbine 17 are coupled, for example via a link member 179 that connects their respective discs 177, 178, such that they rotate together. Wear reduction of the high pressure turbine discs 177, 178 and blades 172, 174 may therefore be optimized by co-selecting the thicknesses and pitches of the first and second stages. In one group of embodiments, the thicknesses and pitches of the first and second stage turbine blades 172, 174 may be selected so that a ratio of the thickness to pitch ratio, $t_{tip,1}/s_1$, of the first stage at the 100 percent spanwise position and the thickness to pitch ratio, $\tau_{tip,2}/s_2$, of the second stage at the 100 percent spanwise position, is between 0.78 and 1.45. Additionally or alternatively, a ratio of the thickness to pitch ratio, $t_{mid,1}/s_1$, of the first stage at the 50 percent spanwise position and the thickness to pitch ratio, $t_{mid,2}/s_2$, of the second stage at the 50 percent spanwise position, is between 0.93 and 1.64, and/or a ratio of the thickness to pitch ratio, $t_{hub,1}/s_1$, of the first stage at the 0 percent spanwise position and the thickness to pitch ratio, $t_{hub,2}/s_2$, of the second stage at the 0 percent spanwise position, is between 0.60 and 1.10. Selecting blade thickness and pitch values so that one and, optionally, more than one of these ratios is satisfied may improve stresses in the disc 177, 178, particularly in the blade root region, while retaining good turbine performance. Table 20 illustrates exemplary values of the blade thicknesses, pitches and ratios for the first and second high pressure turbine stages.

TABLE 20

| | Example 1 | Example 2 |
|---|---|---|
| $t_{tip,\ 1}$ | 4.4 mm | 6.2 mm |
| $t_{tip,\ 2}$ | 3.5 mm | 5.5 mm |
| $t_{mid,\ 1}$ | 6.8 mm | 12.2 mm |
| $t_{mid,\ 2}$ | 5.0 mm | 8.2 mm |
| $t_{hub,\ 1}$ | 7.6 mm | 14.2 mm |
| $t_{hub,\ 2}$ | 9.1 mm | 13.7 mm |
| $s_1$ | 27.8 mm | 34.9 mm |
| $s_2$ | 29.2 mm | 30.6 mm |
| $(t_{tip,\ 1}/s_1)/(t_{tip,\ 2}/s_2)$ | 1.32 | 0.99 |
| $(t_{mid,\ 1}/s_1)/(t_{mid,\ 2}/s_2)$ | 1.43 | 1.30 |
| $(t_{hub,\ 1}/s_1)/(t_{hub,\ 2}/s_2)$ | 0.88 | 0.91 |
| $(t_{tip,\ 1}/s_1) + (t_{tip,\ 2}/s_2)$ | 0.28 | 0.36 |
| $(t_{mid,\ 1}/s_1) + (t_{mid,\ 2}/s_2)$ | 0.42 | 0.62 |
| $(t_{hub,\ 1}/s_1) + (t_{hub,\ 2}/s_2)$ | 0.59 | 0.85 |

As illustrated in Table 20, sums of the thickness to pitch ratios may also be constrained to improve the balance between high pressure turbine wear and performance. The sum of $t_{tip,1}/s_1$ and $t_{tip,2}/s_2$ may be constrained to be between 0.23 and 0.40, the sum of $t_{mid,1}/s_1$ and $t_{mid,2}/s_2$ may be constrained to be between 0.35 and 0.65, and/or the sum of $t_{hub,1}/s_1$ and $t_{hub,2}/s_2$ may be constrained to be between 0.50 and 0.93.

According to some embodiments, to reduce wear of the first stage of the high pressure turbine 17, a product of the thickness to chord ratio of the turbine blades 172 at the 100 percent spanwise position, $\tau_{tip,1}$, and the blade pitch, $s_1$, of the first turbine stage may be selected to be between 2.9 mm and 6.0 mm. Additionally or alternatively, a product of the thickness to chord ratio of the turbine blades 172 at the 50 percent spanwise position, $\tau_{mid,1}$, and the blade pitch, $s_1$, of the first turbine stage may be selected to be between 5.6 mm and 9.8 mm. Additionally or alternatively, a product of the thickness to chord ratio of the turbine blades 172 at the 0 percent spanwise position, $\tau_{hub,1}$, and the blade pitch, $s_1$, of the first turbine stage may be selected to be between 6.7 mm and 13.0 mm. Tables 21-23 illustrate exemplary values:

TABLE 21

| $\tau_{tip,\ 1}$ | $N_{T1}$ | $R_{av,\ 1}$ | $\tau_{tip,\ 1} \times s_1$ |
|---|---|---|---|
| 0.118 | 47 | 208 mm | 3.28 mm |
| 0.166 | 44 | 201 mm | 4.76 mm |
| 0.152 | 42 | 233 mm | 5.30 mm |

TABLE 22

| $\tau_{mid,\ 1}$ | $N_{T1}$ | $R_{av,\ 1}$ | $\tau_{mid,\ 1} \times s_1$ |
|---|---|---|---|
| 0.230 | 47 | 208 mm | 6.40 mm |
| 0.200 | 44 | 201 mm | 5.74 mm |
| 0.263 | 42 | 233 mm | 9.17 mm |

TABLE 23

| $\tau_{hub,\ 1}$ | $N_{T1}$ | $R_{av,\ 1}$ | $\tau_{hub,\ 1} \times s_1$ |
|---|---|---|---|
| 0.244 | 47 | 208 mm | 6.78 mm |
| 0.307 | 44 | 201 mm | 8.81 mm |
| 0.370 | 42 | 233 mm | 12.90 mm |

According to some embodiments, to reduce wear of the second stage of the high pressure turbine 17, a product of the thickness to chord ratio of the turbine blades 174 at the 100 percent spanwise position, $\tau_{tip,2}$, and the blade pitch, $s_2$, of the second turbine stage may be selected to be between 2.7 mm and 4.6 mm. Additionally or alternatively, a product of the thickness to chord ratio of the turbine blades 174 at the 50 percent spanwise position, $\tau_{mid,2}$, and the blade pitch, $s_2$, of the second turbine stage may be selected to be between 4.2 mm and 7.0 mm. Additionally or alternatively, a product of the thickness to chord ratio of the turbine blades 174 at the 0 percent spanwise position, $\tau_{hub,2}$, and the blade pitch, $s_2$, of the first turbine stage may be selected to be between 8.0 mm and 13.1 mm. Tables 24-26 illustrate exemplary values:

TABLE 24

| $\tau_{tip,\ 2}$ | $N_{T2}$ | $R_{av,\ 2}$ | $\tau_{tip,\ 2} \times s_2$ |
|---|---|---|---|
| 0.120 | 54 | 251 mm | 3.50 mm |
| 0.131 | 49 | 255 mm | 4.28 mm |
| 0.149 | 60 | 292 mm | 4.56 mm |

TABLE 25

| $\tau_{mid,\ 2}$ | $N_{T2}$ | $R_{av,\ 2}$ | $\tau_{mid,\ 2} \times s_2$ |
|---|---|---|---|
| 0.208 | 54 | 251 mm | 6.07 mm |
| 0.165 | 49 | 255 mm | 5.40 mm |
| 0.191 | 60 | 292 mm | 5.84 mm |

TABLE 26

| $\tau_{hub,\ 2}$ | $N_{T2}$ | $R_{av,\ 2}$ | $\tau_{hub,\ 2} \times s_2$ |
|---|---|---|---|
| 0.300 | 54 | 251 mm | 8.76 mm |
| 0.371 | 49 | 255 mm | 12.13 mm |
| 0.342 | 60 | 292 mm | 10.46 mm |

Another turbine blade parameter of interest is the blade solidity, σ, defined, for each respective spanwise position of the turbine blade, as the ratio of chord length, c, and the pitch, s, of the turbine stage to which the blade belongs. According to one group of embodiments, a ratio of the solidity of the first stage turbine blades 172 at the 100 percent spanwise position and the solidity of the second stage turbine blades 174 at the 100 percent spanwise position is constrained to be between 0.71 and 1.22. Additionally or alternatively, ratio of the solidity of the first stage turbine blades 172 at the 50 percent spanwise position and the solidity of the second stage turbine blades 174 at the 50 percent spanwise position is constrained to be between 0.73 and 1.27, and/or ratio of the solidity of the first stage turbine blades 172 at the 0 percent spanwise position and the solidity of the second stage turbine blades 174 at the 0 percent spanwise position is constrained to be between 0.68 and 1.23. Table 27 illustrates exemplary values:

TABLE 27

| | Example 1 | Example 2 |
|---|---|---|
| $c_{1,\ tip}$ | 38.1 mm | 41.1 mm |
| $c_{2,\ tip}$ | 33.8 mm | 38.4 mm |
| $c_{1,\ mid}$ | 34.9 mm | 39.2 mm |
| $c_{2,\ mid}$ | 32.2 mm | 38.0 mm |
| $c_{1,\ hub}$ | 34.2 mm | 36.3 mm |
| $c_{2,\ hub}$ | 29.9 mm | 35.1 mm |
| $s_1$ | 27.8 mm | 34.9 mm |
| $s_2$ | 29.2 mm | 30.6 mm |
| $\sigma_{tip,\ 1}/\sigma_{tip,\ 2}$ | 1.18 | 0.94 |

TABLE 27-continued

| | Example 1 | Example 2 |
|---|---|---|
| $\sigma_{mid,\,1}/\sigma_{mid,\,2}$ | 1.13 | 0.90 |
| $\sigma_{hub,\,1}/\sigma_{hub,\,2}$ | 1.20 | 0.91 |

As noted elsewhere herein, embodiments may increase the life of the high pressure turbine 17 by reducing the loading on the turbine blades 172, 174, which may reduce stresses in the blades, 172, 174, discs 177, 178 and blade roots. The blade loading for blades of a turbine stage may be expressed by a loading parameter, λ, which is defined by the equation $\lambda=dH/U^2$. As already described, U is the mean blade speed, equal to $U=\omega\times R_{av}$. dH is the total work done by the turbine stage per unit mass flow. In some embodiments, the value of λ is tuned to increase the life of the high pressure turbine. To accommodate, e.g., a reduction in the work done by the turbine stages as a result of the tuned blade loading, embodiments may also adjust a speed parameter, μ. The speed parameter, μ, is defined by the equation $\mu=U/\sqrt{T}$, where U is the mean blade speed and T is the inlet temperature of the turbine stage. As noted above, the inlet temperature of the turbine stage is the maximum stagnation temperature at a position immediately upstream of the rotating turbine blades of the turbine stage.

In some embodiments, for the first stage of the high pressure turbine 17, the value of the loading parameter, $\lambda_1$, is between 1.30 and 1.80, while the value of the speed parameter, $\mu_1$, is between 10.7 $ms^{-1}K^{-0.5}$ and 12.0 $ms^{-1}K^{-0.5}$, both measured at cruise conditions. In some specific embodiments, a particularly good balance between turbine life and operability may be achieved where the loading parameter, $\lambda_1$, may be between 1.45 and 1.65, while the value of the speed parameter, $\mu_1$, is between 11.2 $ms^{-1}K^{-0.5}$ and 11.8 $ms^{-1}K^{-0.5}$. Table 28 illustrates exemplary values:

TABLE 28

| | $\lambda_1 = dH/U^2$ | $\mu_1 = U/\sqrt{T}$ ($ms^{-1}K^{-0.5}$) |
|---|---|---|
| Example 1 | 1.37 | 11.3 |
| Example 2 | 1.46 | 11.4 |
| Example 3 | 1.65 | 11.7 |

In some embodiments, the values of the loading parameter, $\lambda_1$, and the speed parameter, $\mu_1$, are selected so that a ratio of the speed parameter and the loading parameter, $\mu_1/\lambda_1$, is between 6.1 $ms^{-1}K^{-0.5}$ and 9.3 $ms^{-1}K^{-0.5}$, such that, e.g., a reduction in blade loading to improve turbine life may be compensated a commensurate increase in the speed parameter. Table 29 illustrates exemplary values:

TABLE 29

Figure 10:
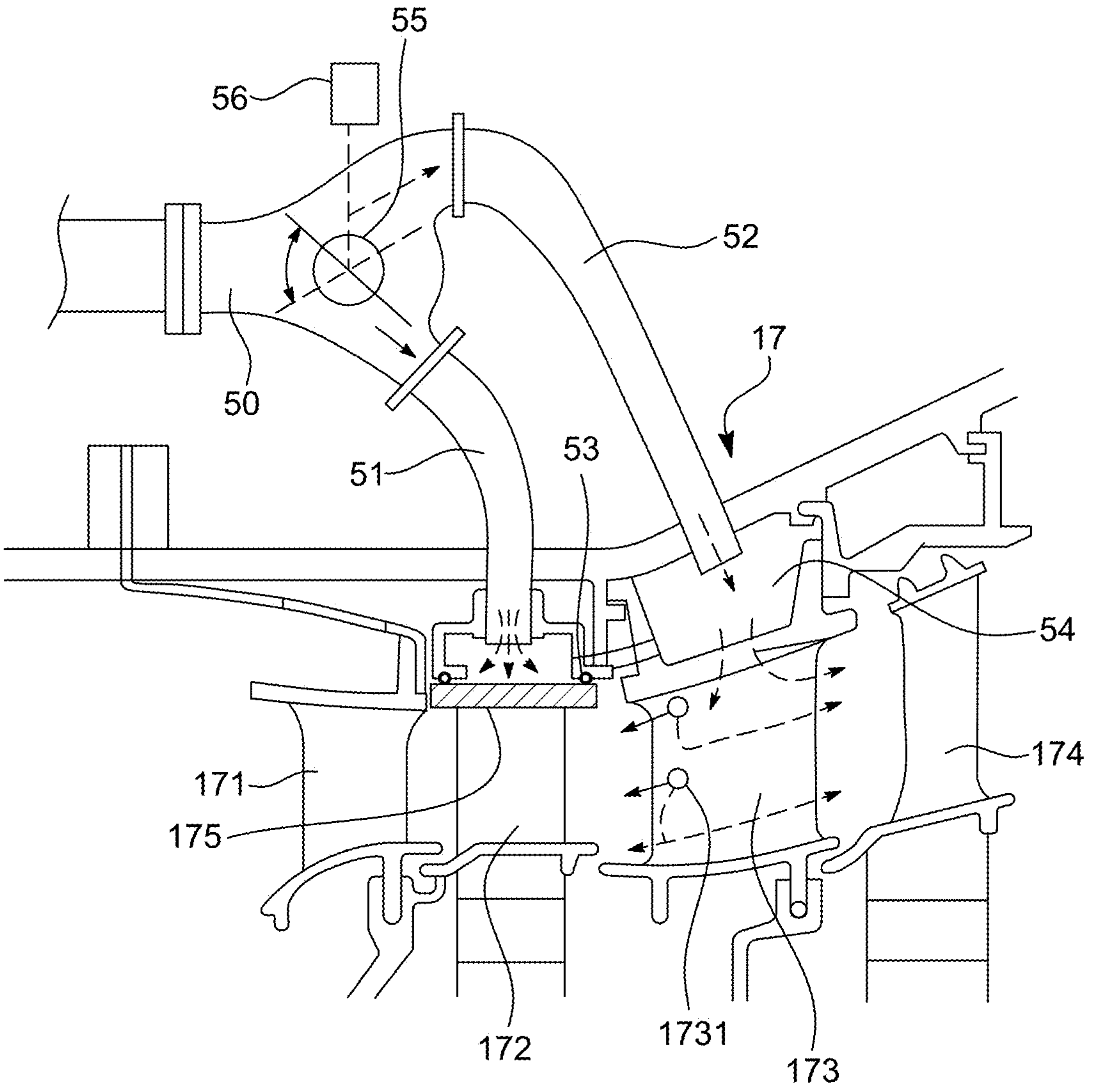
FIG. 10 is a close up sectional side view of a turbine section of the geared gas turbine engine of FIG. 1 showing the supply of cooling airflows to turbine blades and stator vanes of the turbine section.

| | $\lambda_1 = dH/U^2$ | $\mu_1 = U/\sqrt{T}$ ($ms^{-1}K^{-0.5}$) | $\mu_1/\lambda_1$ ($ms^{-1}K^{-0.5}$) |
|---|---|---|---|
| Example 1 | 1.37 | 11.3 | 8.2 |
| Example 2 | 1.70 | 10.5 | 6.2 |
| Example 3 | 1.30 | 12.1 | 9.3 |

Where the high pressure turbine 17 is a two-stage turbine, the blade loading parameter for the second turbine stage, $\lambda_2=dH_2/U_2^2$, may likewise be tuned to reduce stresses and improve turbine life. In some embodiments, the value of $\lambda_2$ is between 1.00 and 1.30. The speed parameter of the second turbine stage, $\mu_2=U_2/\sqrt{T_2}$ may be between 12.0 $ms^{-1}K^{-0.5}$ and 13.5 $ms^{-1}K^{-0.5}$. The values of the loading parameter, $\lambda_2$, and the speed parameter, $\mu_2$, of the second turbine stage may be selected so that a ratio of the speed parameter and the loading parameter, $\mu_2/\lambda_2$, is between 9.2 $ms^{-1}K^{-0.5}$ and 12.9 $ms^{-1}K^{-0.5}$, such that, e.g., a reduction in blade loading to improve turbine life may be compensated a commensurate increase in the speed parameter Returning to FIG. 4, as noted, a cooling airflow "C" may be supplied from the compressor section 14, 15 of the gas turbine engine 10 to the high pressure turbine 17 to cool the stator vanes 171, 173 and the turbine blades 172, 174. A more detailed example is shown in FIG. 10. Bleed air from the low pressure compressor 14 and/or the high pressure compressor 15 is transported to the high pressure turbine 17 via a duct 50, which, in this non-limiting example, is shown to branch into two smaller ducts 51, 52. The first duct 51 supplies cooling air to a plenum region adjacent the tips and/or sealing members 175 of the turbine blades 172 of the first stage, whereby the turbine blades 172 are cooled, after which the air may be exhausted from an outlet 53. The second duct 52 supplies cooling air to another plenum region 54 at the outer radius of the stator vanes, or nozzle guide vanes (NGVs) 173, of the second stage, whereby the NGVs 173 are cooled. The NGVs 173 may comprise internal cooling channels and surface holes 1731 to enhance the cooling effect. The mass flow of cooling air supplied to the high pressure turbine 17 through the duct 50 will depend, to some extent, on the operating point of the engine, though optionally some control may be provided by a flow controller 55, which in this example takes the form of a butterfly valve whose actuation is controlled by a controller 56.

Although FIG. 10 does not show cooling air being supplied to the NGVs 171 of the first stage of the high pressure turbine 17, or to the turbine blades 174 of the second stage of the high pressure turbine 17, it will be understood that these may also receive cooling air from the same or a different duct 50.

As discussed previously, reducing the loading of the turbine blades 172, 174 may reduce stresses in the blades 172, 173 and discs 177, 178 of the high pressure turbine 17, improving the life of the turbine. Adjustments to the blade loading may, additionally, impact the cooling mass flow rate of the high pressure turbine, and adjustments may be made to the cooling flows to improve turbine life. The cooling mass flows that are delivered the NGVs 171, 173 and to the turbine blades 172, 174 may be expressed as ratios with the throat mass flow of the first set of NGVs 171. The throat of the first set of NGVs 171 is the narrowest part of the NGV and is where the flow is choked. The throat mass flow is the total mass flowing per unit time through the throat.

According to some embodiments, a ratio, $\varepsilon_1$, of the mass flow of cooling air supplied to cool the turbine blades 172 of the first turbine stage and the throat mass flow is between 0.040 and 0.075, measured at cruise conditions. In other words, at cruise conditions, the total amount of air supplied to cool all the turbine blades 172 of the first stage of the high pressure turbine 17 is between 4.0 percent and 7.5 percent of the throat mass flow at the first set of NGVs 171. The inventors have found that a high pressure turbine supplied with this amount of cooling air, as a fraction of the throat mass flow, wears more slowly. Additionally or alternatively, a ratio $\varepsilon_2$, of the mass flow of cooling air supplied to cool the turbine blades 174 of the second turbine stage and the throat mass flow is between 0.010 and 0.025, measured at cruise conditions. In other words, at cruise conditions, the total amount of air supplied to cool all the turbine blades 174 of the second stage of the high pressure turbine is between 1.0 percent and 2.5 percent of the throat mass flow at the first set of NGVs 171. Additionally or alternatively, a ratio, $\nu_1$, of a cooling mass flow for cooling the first set of NGVs 171 and the throat mass flow of the first set of NGVs 171 is between 0.080 and 0.150, measured at cruise conditions. In other words, at cruise conditions, the total amount of air supplied to cool all the NGVs 171 of the first stage of the high pressure turbine 17 is between 8 percent and 15 percent of the throat mass flow at the first set of NGVs 171. Table 30 illustrates exemplary values:

TABLE 30

| | $\varepsilon_1$ | $\varepsilon_2$ | $\nu_1$ |
|---|---|---|---|
| Example 1 | 0.048 | 0.014 | 0.092 |
| Example 2 | 0.070 | 0.022 | 0.147 |
| Example 3 | 0.066 | 0.019 | 0.138 |

For completeness, Table 31 summarizes the configuration and properties of two example gas turbine engines 10. It is to be understood that these are merely examples and should not be construed as limiting.

TABLE 31

| | Example 1 | Example 2 |
|---|---|---|
| Engine Architecture | Geared, two-stage HPT | Geared, two-stage HPT |
| Static Thrust (Max.) | 130 kN | 130 kN |
| HP Shaft Speed (Cruise) | 17300 rpm | 18900 rpm |
| $N_{T1}$ | 50 | 44 |
| $N_{T2}$ | 56 | 49 |
| $R_{av, 1}$ | 261 mm | 235 mm |
| $R_{av, 2}$ | 263 mm | 238 mm |
| $s_1$ | 32.8 mm | 33.6 mm |
| $s_2$ | 29.5 mm | 30.5 mm |
| $R_{HT1}$ | 236 mm | 214 mm |
| $R_{HT2}$ | 229 mm | 208 mm |
| $R_{T1}$ | 280 mm | 260 mm |
| $R_{T2}$ | 294 mm | 275 mm |
| $R_{HT1}/R_{T1}$ | 0.84 | 0.82 |
| $R_{HT2}/R_{T2}$ | 0.78 | 0.76 |
| $h_1$ | 44 mm | 46 mm |
| $t_{tip, 1}$ | 4.9 mm | 5.8 mm |
| $t_{mid, 1}$ | 8.1 mm | 10.6 mm |
| $t_{hub, 1}$ | 10.0 mm | 12.2 mm |
| $C_{tip, 1}$ | 34.9 mm | 42.4 mm |
| $C_{mid, 1}$ | 32.9 mm | 43.3 mm |
| $C_{hub, 1}$ | 29.6 mm | 38.7 mm |
| $\tau_{tip, 1}$ | 0.14 | 0.14 |
| $\tau_{mid, 1}$ | 0.25 | 0.24 |
| $\tau_{hub, 1}$ | 0.33 | 0.32 |
| $\tau_{tip, 1} + \tau_{mid, 1}$ | 0.39 | 0.38 |
| $\tau_{tip, 1} + \tau_{hub, 1}$ | 0.48 | 0.45 |
| $\tau_{mid, 1} + \tau_{hub, 1}$ | 0.58 | 0.56 |
| $AR_1$ | 1.28 | 1.08 |
| $\Sigma_{tip, 1}$ | 1.06 | 1.26 |
| $\Sigma_{mid, 1}$ | 1.00 | 1.29 |
| $\Sigma_{hub, 1}$ | 0.90 | 1.15 |
| $t_{tip, 1}/s_1$ | 0.15 | 0.17 |
| $t_{mid, 1}/s_1$ | 0.25 | 0.32 |
| $t_{hub, 1}/s_1$ | 0.30 | 0.36 |
| $\tau_{tip, 1} \times s_1$ | 4.6 mm | 4.7 mm |
| $\tau_{mid, 1} \times s_1$ | 8.2 mm | 8.1 mm |
| $\tau_{hub, 1} \times s_1$ | 10.8 mm | 10.8 mm |
| $h_2$ | 65 mm | 67 mm |
| $t_{tip, 2}$ | 4.1 mm | 5.0 mm |
| $t_{mid, 2}$ | 5.8 mm | 7.3 mm |
| $t_{hub, 2}$ | 10.2 mm | 12.4 mm |
| $C_{tip, 2}$ | 33.3 mm | 41.5 mm |
| $C_{mid, 2}$ | 31.8 mm | 38.1 mm |
| $C_{hub, 2}$ | 29.8 mm | 37.0 mm |
| $\tau_{tip, 2}$ | 0.12 | 0.12 |
| $\tau_{mid, 2}$ | 0.18 | 0.19 |
| $\tau_{hub, 2}$ | 0.34 | 0.34 |
| $\tau_{tip, 2} + \tau_{mid, 2}$ | 0.31 | 0.31 |
| $\tau_{tip, 2} + \tau_{hub, 2}$ | 0.47 | 0.46 |
| $\tau_{mid, 2} + \tau_{hub, 2}$ | 0.52 | 0.53 |

TABLE 31-continued

| | Example 1 | Example 2 |
|---|---|---|
| $\tau_{tip, 1}/\tau_{tip, 2}$ | 1.08 | 1.17 |
| $\tau_{mid, 1}/\tau_{mid, 2}$ | 1.39 | 1.26 |
| $\tau_{hub, 1}/\tau_{hub, 2}$ | 0.97 | 0.94 |
| $\tau_{tip, 1} + \tau_{tip, 2}$ | 0.27 | 0.26 |
| $\tau_{mid. 1} + \tau_{mid, 2}$ | 0.43 | 0.43 |
| $\tau_{hub, 2} + \tau_{hub, 2}$ | 0.67 | 0.66 |
| $AR_2$ | 1.95 | 1.61 |
| $\sigma_{tip, 2}$ | 1.13 | 1.36 |
| $\sigma_{mid, 2}$ | 1.08 | 1.25 |
| $\sigma_{hub, 2}$ | 1.01 | 1.21 |
| $t_{tip, 2}/s_2$ | 0.14 | 0.16 |
| $t_{mid, 2}/s$ | 0.20 | 0.24 |
| $t_{hub, 2}/s_2$ | 0.35 | 0.41 |
| $\tau_{tip, 2} \times s_2$ | 3.5 mm | 3.7 mm |
| $\tau_{mid, 2} \times s_2$ | 5.3 mm | 5.8 mm |
| $\tau_{hub, 2} \times s_2$ | 10.0 mm | 10.4 mm |
| $AR_1/AR_2$ | 0.66 | 0.67 |
| $AR_1 + AR_2$ | 3.23 | 2.69 |
| $\sigma_{tip, 1}/\sigma_{tip, 2}$ | 0.94 | 0.93 |
| $\sigma_{mid, 1}/\sigma_{mid, 2}$ | 0.93 | 1.03 |
| $\sigma_{hub, 1}/\sigma_{hub, 2}$ | 0.89 | 0.95 |
| $\alpha_{1, mid}$ | 48.3° | 30.9° |
| $\alpha_{2, mid}$ | 28.9° | 7.8° |
| $\alpha_{2, mid}/\alpha_{1, mid}$ | 0.59 | 0.24 |
| $\alpha_{1, mid}/\alpha_{2, mid}$ | 1.67 | 3.96 |
| $\lambda_1$ | 1.37 | 1.65 |
| $\lambda_2$ | 1.11 | 1.18 |
| $\mu_1$ | 11.3 $ms^{-1}K^{-0.5}$ | 11.7 $ms^{-1}K^{-0.5}$ |
| $\mu_2$ | 12.4 $ms^{-1}K^{-0.5}$ | 13.1 $ms^{-1}K^{-0.5}$ |
| $\mu_1/\lambda_1$ | 8.2 $ms^{-1}K^{-0.5}$ | 7.1 $ms^{-1}K^{-0.5}$ |
| $\mu_2/\lambda_2$ | 11.2 $ms^{-1}K^{-0.5}$ | 11.1 $ms^{-1}K^{-0.5}$ |
| $\varepsilon_1$ | 0.048 | 0.070 |
| $\varepsilon_2$ | 0.014 | 0.022 |
| $\nu_1$ | 0.092 | 0.147 |

Whilst the described examples relate to a two-stage high pressure turbine 17, values for the first stage may also be applied to a single-stage high pressure turbine.

Whilst the described example relates to a turbofan engine, the disclosure may apply, for example, to any type of gas turbine engine, such as an open rotor (in which the fan stage is not surrounded by a nacelle) or turboprop engine, for example. In one such example, the engine comprises an open rotor, not surrounded by a nacelle, with a plurality of variable pitch stator blades provided downstream in open rotor flow.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A geared gas turbine engine comprising a high pressure turbine configured to drive a compressor and a low pressure turbine configured to drive a propulsor via a reduction gearbox, wherein:

the high pressure turbine comprises a turbine stage, the turbine stage comprising a set of nozzle guide vanes, NGVs, and a plurality of turbine blades downstream of the set of NGVs; and a ratio, $\varepsilon_1$, of a cooling mass flow for cooling the plurality of turbine blades of the turbine stage and a throat mass flow of the set of NGVs of turbine stage is between 0.040 and 0.075 at cruise conditions.

2. The geared gas turbine engine of claim 1, wherein $\varepsilon_1$ is between 0.040 and 0.070 at cruise conditions.

3. The geared gas turbine engine of claim 1, wherein a ratio, $\nu_1$, of a cooling mass flow for cooling the set of NGVs and the throat mass flow of the set of NGVs is between 0.080 and 0.150 at cruise conditions.

4. The geared gas turbine engine of claim 3, wherein $\nu_1$ is between 0.085 and 0.140 at cruise conditions.

5. The geared gas turbine engine of claim 1, wherein a number of turbine blades, $N_T$, of the turbine stage is between 35 and 62.

6. The geared gas turbine engine of claim 1, wherein:

the turbine stage if a first turbine stage, and the high pressure turbine comprises a second turbine stage downstream of the first turbine stage, the second turbine stage comprising a second set of NGVs and a second plurality of turbine blades downstream of the second set of NGVs;

a ratio, $\varepsilon_2$, of a cooling mass flow for cooling the second plurality of turbine blades and the throat mass flow of the first set of NGVs is between 0.010 and 0.025 at cruise conditions.

7. The geared gas turbine engine of claim 6, wherein $\varepsilon_2$ is between 0.011 and 0.022.

8. The geared gas turbine engine of claim 6, wherein a ratio, $\nu_2$, of a cooling mass flow for cooling the second set of NGVs and the throat mass flow of the first set of NGVs is between 0.015 and 0.030 at cruise conditions.

9. The geared gas turbine engine of claim 8, wherein $\nu_2$ is between 0.017 and 0.025 at cruise conditions.

10. The geared gas turbine engine of claim 6, wherein a number of turbine blades, $N_{T2}$, of the second turbine stage is between 39 and 70.

11. The geared gas turbine engine of claim 1, wherein a speed of rotation of the high pressure turbine is between 15000 rpm and 28000 rpm at cruise conditions.

12. The geared gas turbine engine of claim 1, wherein the cooling mass flow is bleed air bled from the compressor.

13. The geared gas turbine engine of claim 1, wherein the compressor driven by the high pressure turbine comprises between 7 and 12 compressor stages.

14. The geared gas turbine engine of claim 1, further comprising a lower pressure compressor driven by the low pressure turbine, wherein the cooling mass flow is bleed air bled from the low pressure compressor.

15. The geared gas turbine engine of claim 14, wherein the lower pressure compressor comprises 3 or 4 compressor stages.

16. The geared gas turbine engine of claim 1, wherein the propulsor is a fan comprising between 14 and 26 fan blades.

17. The geared gas turbine engine of claim 16, wherein the diameter of the fan is greater than 1.40 m.

18. The geared gas turbine engine of claim 1, further comprising an engine controller configured to operate the gas turbine engine at the cruise conditions.

19. A method of operating a geared gas turbine engine comprising a high pressure turbine configured to drive a compressor and a low pressure turbine configured to drive a propulsor via a reduction gearbox, wherein:

the high pressure turbine comprises a first turbine stage, the first turbine stage comprising a first turbine nozzle guide vane, NGV, and a first turbine blade downstream of the first turbine NGV; and the method comprises operating the geared gas turbine engine at cruise conditions, wherein a ratio, $\varepsilon_1$, of a cooling mass flow for cooling the first turbine blade and a throat mass flow of the first turbine NGV is between 0.040 and 0.075 at the cruise conditions.

20. A geared gas turbine engine comprising a high pressure turbine configured to drive a compressor and a low pressure turbine configured to drive a propulsor via a reduction gearbox, wherein:

the high pressure turbine comprises a first turbine stage, the first turbine stage comprising a first turbine nozzle guide vane, NGV, and a first turbine blade downstream of the first turbine NGV; and a ratio, $\nu_1$, of a cooling mass flow for cooling the first turbine NGV and a throat mass flow of the first turbine NGV is between 0.080 and 0.150 at cruise conditions.

* * * * *